(12) United States Patent
Limberg

(10) Patent No.: US 8,116,400 B2
(45) Date of Patent: Feb. 14, 2012

(54) APPARATUS FOR ADAPTING RECEPTION MODES OF A MOBILE DTV RECEIVER IN RESPONSE TO SIGNALING

(75) Inventor: Allen LeRoy Limberg, Port Charlotte, FL (US)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

(21) Appl. No.: 12/634,019

(22) Filed: Dec. 9, 2009

(65) Prior Publication Data

US 2010/0149427 A1 Jun. 17, 2010

Related U.S. Application Data

(60) Provisional application No. 61/201,539, filed on Dec. 11, 2008, provisional application No. 61/203,584, filed on Dec. 22, 2008.

(51) Int. Cl.
*H04L 27/02* (2006.01)
*H03C 1/52* (2006.01)
(52) U.S. Cl. ......... 375/270; 375/316; 375/320; 375/321
(58) Field of Classification Search .................. 375/270, 375/316, 320, 321
See application file for complete search history.

(56) References Cited

U.S. PATENT DOCUMENTS 7,953,157 B2 * 5/2011 Song et al. ............... 375/240.25
8,005,167 B2 * 8/2011 Lee et al. ...................... 375/316

* cited by examiner

Primary Examiner — Ted Wang
(74) Attorney, Agent, or Firm — Sughrue Mion, PLLC

(57) ABSTRACT

Implementation of Fast Information Channel (FIC) signaling when Chunks of FIC information span more than one sub-Frame of an M/H Frame is described. FIC signaling is advanced further at the digital television (DTV) transmitters than originally proposed, thereby eliminating need for substantial amounts of delay memory for coded M/H data in receivers for such data. Each FIC-Chunk includes a bit indicating when it is not applicable only to M/H Frames yet to be received but is also applicable to an M/H Frame being currently received. This facilitates reception being more quickly established after a change in DTV channel selection. Transmission Parameter Channel (TPC) signaling pertaining to the M/H Frame being currently received continues to the conclusion of the M/H Frame, so the total number of M/H Groups in each M/H sub-Frame is signaled to facilitate de-interleaving of the FIC signaling. Code combining of FIC Chunks is described.

20 Claims, 27 Drawing Sheets

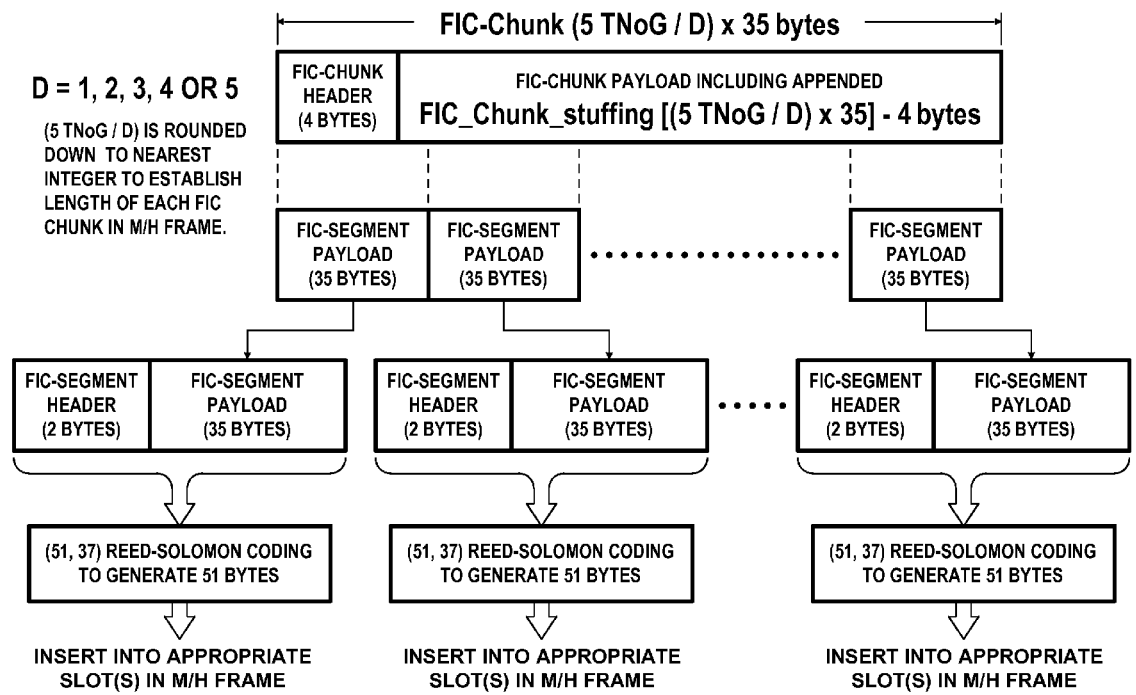
Fig. 5 Segmentation of FIC-Chunk

| SYNTAX | BITS | FORMAT |
|---|---|---|
| FIC_Segment_header { | | |
|   FIC_Segment_type | 1 - 2 | uimsbf |
|   FIC_Segment_num | 3 - 6 | uimsbf |
|   new_in_this_FIC_Chunk | 7 | bslbf |
|   error_indication | 8 | bslbf |
|   reserved | 9 | bslbf |
|   num_Segments_in_FIC_Chunk | 10 - 16 | uimsbf |
| } | | |

Fig. 6    Bit Syntax for FIC-Segment Header

| SYNTAX | BITS | FORMAT |
|---|---|---|
| FIC_Chunk_header { | | |
|   FIC_protocol_version | 1 - 5 | uimsbf |
|   reserved | 6 - 7 | 11 |
|   current_next_indicator | 8 | bslbf |
|   transport_stream_id | 9 - 24 | uimsbf |
|   num_ensembles | 25 - 32 | uimsbf |
| } | | |

Fig. 7    Bit Syntax for FIC-Chunk Header

| SYNTAX | NO. OF BITS | FORMAT |
| --- | --- | --- |
| FIC_Chunk_payload ( ) { | | |
|   for (i = 0, i < num_ensembles; i++){ | | |
|     ensemble_id | 8 | uimsbf |
|     reserved | 3 | 111 |
|     ensemble_protocol_version | 5 | uimsbf |
|     SLT_ensemble_indicator | 1 | bslbf |
|     GAT_ensemble_indicator | 1 | bslbf |
|     FIC_start_within_subFrame_indicator | 1 | bslbf |
|     MH_service_signaling_channel_version | 5 | uimsbf |
|     num_MH_services | 8 | uimsbf |
|     for (j= 0, j < num_ensembles; j++){ | | |
|       MH_service_id | 16 | uimsbf |
|       reserved | 3 | 111 |
|       multi_ensemble_service | 2 | uimsbf |
|       MH_service_status | 2 | uimsbf |
|       SP_indicator | 1 | bslbf |
|     } | | |
|   } | | |
|   FIC_chunk_stuffing | 89 & up | |
| } | | |

Fig. 8 Bit Syntax for FIC-Chunk Payload

| SYNTAX | BITS | FORMAT |
|---|---|---|
| TPC_data { | | |
|   sub-Frame_number | 1 - 3 | uimsbf |
|   Slot_number | 4 - 7 | uimsbf |
|   Parade_id * | 8 - 14 | uimsbf |
|   starting_Group_number * | 15 - 18 | uimsbf |
|   number_of_Groups_minus_1 * | 19 - 21 | uimsbf |
|   Parade_Repetition_Cycle_minus_1 | 22 - 24 | uimsbf |
|   RS_frame_mode * | 25 - 26 | bslbf |
|   RS_code_mode_primary * | 27 - 28 | bslbf |
|   RS_code_mode_secondary * | 29 - 30 | bslbf |
|   SCCC_block_mode * | 31 - 32 | bslbf |
|   SCCC_outer_code_mode_a * | 33 - 34 | bslbf |
|   SCCC_outer_code_mode_b * | 35 - 36 | bslbf |
|   SCCC_outer_code_mode_c * | 37 - 38 | bslbf |
|   SCCC_outer_code_mode_d * | 39 - 40 | bslbf |
|   FIC_version * | 41 - 45 | uimsbf |
|   Parade_continuity_counter * | 46 - 49 | uimsbf |
|   total_number_of_Groups | 50 - 54 | uimsbf |
|   iterative_diversity_mode * | 55 - 56 | bslbf |
|   TPC_discontinuity_in_Slot | 57 | bslbf |
|   reserved | 62 - 75 | all 1's |
|   TPC_protocol_version_major_update | 76 - 77 | bslbf |
|   TPC_protocol_version_minor_update | 78 - 80 | bslbf |
| } | | |
|   * signaled for next M/H Frame in PRC | | |

Fig. 9      Bit Syntax for TPC

| SYNTAX | BITS | FORMAT |
|---|---|---|
| TPC_data in initial 2 M/H sub-Frames { | | |
|   sub-Frame_number | 1 - 3 | uimsbf |
|   Slot_number | 4 - 7 | uimsbf |
|   Parade_id | 8 - 14 | uimsbf |
|   current_starting_Group_number | 15 - 18 | uimsbf |
|   current_number_of_Groups_minus_1 | 19 - 21 | uimsbf |
|   Parade_Repetition_Cycle_minus_1 | 22 - 24 | uimsbf |
|   current_RS_frame_mode | 25 - 26 | bslbf |
|   current_RS_code_mode_primary | 27 - 28 | bslbf |
|   current_RS_code_mode_secondary | 29 - 30 | bslbf |
|   current_SCCC_block_mode | 31 - 32 | bslbf |
|   current_SCCC_outer_code_mode_a | 33 - 34 | bslbf |
|   current_SCCC_outer_code_mode_b | 35 - 36 | bslbf |
|   current_SCCC_outer_code_mode_c | 37 - 38 | bslbf |
|   current_SCCC_outer_code_mode_d | 39 - 40 | bslbf |
|   FIC_version | 41 - 45 | uimsbf |
|   Parade_continuity_counter | 46 - 49 | uimsbf |
|   current_total_number_of_Groups | 50 - 54 | uimsbf |
|   previous_total_number_of_Groups | 55 - 59 | uimsbf |
|   reserved | 60 - 75 | all 1's |
|   TPC_protocol_version_major_update | 76 - 77 | bslbf |
|   TPC_protocol_version_minor_update | 78 - 80 | bslbf |
| } | | |

Fig. 10A    Bit Syntax of TPC in M/H Sub-Frames #0 & #1

| SYNTAX | BITS | FORMAT |
|---|---|---|
| TPC_data in initial 2 M/H sub-Frames { | | |
|   sub-Frame_number | 1 - 3 | uimsbf |
|   Slot_number | 4 - 7 | uimsbf |
|   Parade_id | 8 - 14 | uimsbf |
|   next_starting_Group_number | 15 - 18 | uimsbf |
|   next_number_of_Groups_minus_1 | 19 - 21 | uimsbf |
|   Parade_Repetition_Cycle_minus_1 | 22 - 24 | uimsbf |
|   next_RS_frame_mode | 25 - 26 | bslbf |
|   next_RS_code_mode_primary | 27 - 28 | bslbf |
|   next_RS_code_mode_secondary | 29 - 30 | bslbf |
|   next_SCCC_block_mode | 31 - 32 | bslbf |
|   next_SCCC_outer_code_mode_a | 33 - 34 | bslbf |
|   next_SCCC_outer_code_mode_b | 35 - 36 | bslbf |
|   next_SCCC_outer_code_mode_c | 37 - 38 | bslbf |
|   next_SCCC_outer_code_mode_d | 39 - 40 | bslbf |
|   FIC_version | 41 - 45 | uimsbf |
|   Parade_continuity_counter | 46 - 49 | uimsbf |
|   next_total_number_of_Groups | 50 - 54 | uimsbf |
|   current_total_number_of_Groups | 55 - 59 | uimsbf |
|   reserved | 60 - 75 | all 1's |
|   TPC_protocol_version_major_update | 76 - 77 | bslbf |
|   TPC_protocol_version_minor_update | 78 - 80 | bslbf |
| } | | |

Fig. 10B  Bit Syntax of TPC in M/H Sub-Frames #2, #3 & #4

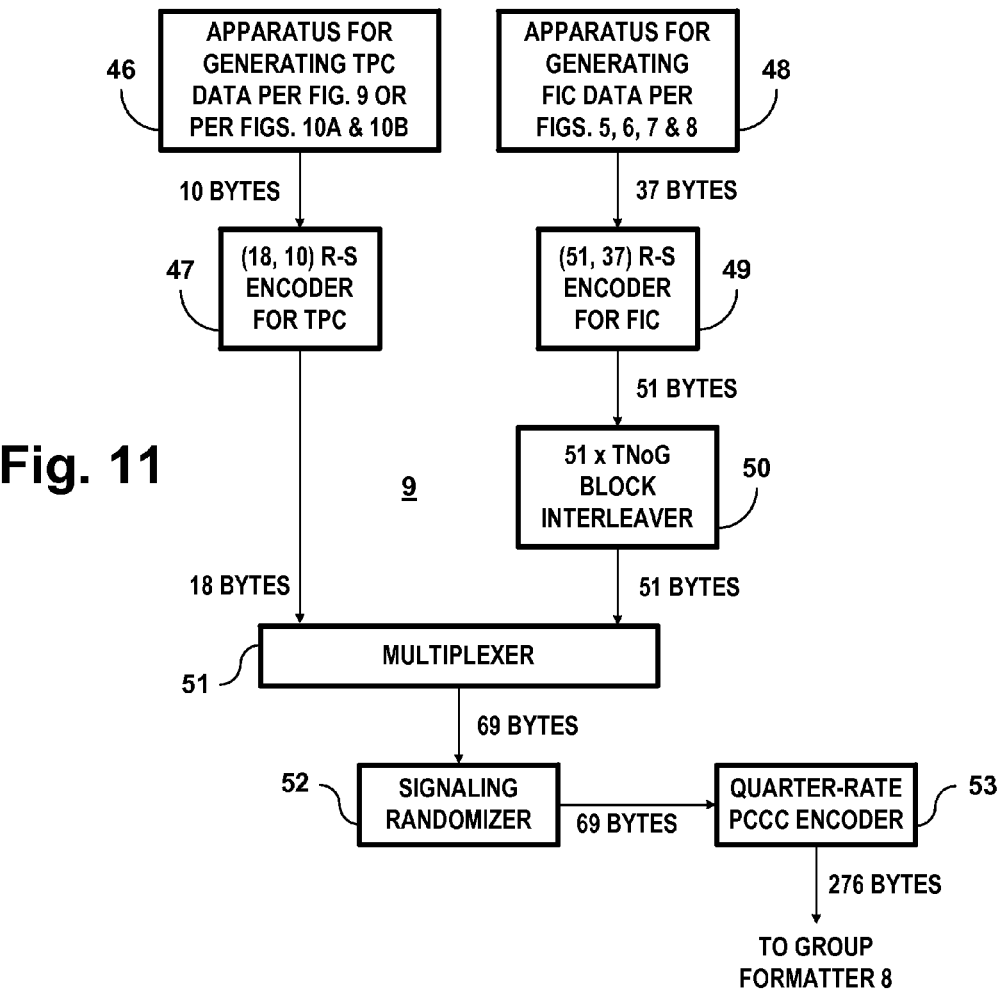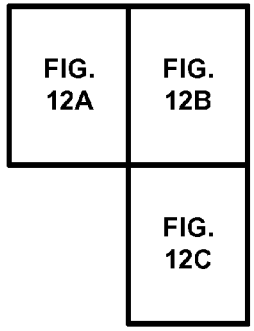

APPARATUS FOR ADAPTING RECEPTION MODES OF A MOBILE DTV RECEIVER IN RESPONSE TO SIGNALING

This application claims priority from U.S. Provisional Applications Ser. Nos. 61/201,539 and 61/203,584 filed on Dec. 11, 2008 and on Dec. 22, 2008, respectively, the disclosures of which are incorporated in their entirety herein by reference.

BACKGROUND

1. Field

Methods and apparatuses consistent with the present inventive concept relate to receivers for digital television (DTV) signals transmitted by over-the-air broadcasting, which DTV signals include M/H signal components designed for reception by mobile receivers and hand-held receivers collectively referred to as "M/H receivers".

2. Related Art

The Advanced Television Systems Committee (ATSC) published a DTV Standard in 1995 as Document A/53, hereinafter referred to simply as "A/53". A/53 describes vestigial-sideband (VSB) amplitude modulation of the radio-frequency (RF) carrier wave using an eight-level modulating signal, which type of over-the-air DTV broadcasting is called "8-VSB". In the beginning years of the twenty-first century, efforts were made by some in the DTV industry to provide for more robust transmission of data over broadcast DTV channels without unduly disrupting the operation of so-called "legacy" DTV receivers already in the field. Samsung Electronics Company, Ltd. (SEC) and LG Electronics (LGE) fielded robust transmission systems referred to as "A-VSB" and "MPH", respectively, and each company vied for its system being accepted by ATSC as the basis for a TV-industry-wide standard robust transmission system. Robust transmission of data for reception by M/H receivers will be provided for in successive versions of an ATSC Standard for DTV broadcasting to M/H receivers, referred to more briefly as the M/H Standard. The initial version of this standard is the ATSC Mobile DTV Standard published by the ATSC in 2009 as Document A/153, hereinafter referred to simply as "A/153", Parts 2 and 3 of which are incorporated herein by reference.

The operation of nearly all legacy DTV receivers is disrupted if 2/3 trellis coding is not preserved throughout every transmitted data field. Also, the average modulus of the transmitted DTV signal should be the same as for 8-VSB signal as specified in the 1995 version of A/53, so as not to disrupt adaptive equalization in those legacy receivers using the constant modulus algorithm (CMA).

Another problem concerning legacy DTV receivers is that a large number of such receivers were sold that were designed not to respond to broadcast DTV signals unless de-interleaved data fields recovered by trellis decoding were preponderantly filled with (207, 187) Reed-Solomon (RS) forward-error-correction (FEC) codewords of a specific type or correctable approximations to such codewords. Accordingly, in order to accommodate continuing DTV signal reception by such legacy receivers, robust transmissions are constrained in the following way. Before convolutional byte interleaving, data fields should be preponderantly filled with (207, 187) RS FEC codewords of the type specified in A/53.

This constraint has led to the M/H data encoded for reception by M/H receivers being encapsulated within (207, 187) RS FEC codewords of the general type specified in A/53, differing in that they are not necessarily systematic with the 20 parity bytes located at the conclusions of the codewords. The 20 parity bytes of some of these (207, 187) RS FEC codewords appear earlier in the codewords to accommodate the inclusion of training signals in the fields of interleaved data. The 207-byte RS FEC codewords invariably begin with a three-byte header similar to the second through fourth bytes of an MPEG-2 packet (as defined by the Moving Pictures Expert Group), with a 13-bit packet-identification (PID) code in the fourth through sixteenth bit positions of the header. Except for the three-byte header and the 20 parity bytes in each (207, 187) RS FEC codeword, the remainder of the codeword has been considered to be available for encapsulating 184 bytes of a robust transmission. (In actuality, the inventor notes, the last byte of the three-byte header of a 207-byte RS FEC codeword could also be replaced by another byte of M/H data, so a 207-byte RS FEC codeword could encapsulate 185 bytes of a robust transmission.)

In A/153, successive equal lengths of the M/H data stream are subjected to transversal Reed-Solomon (TRS) coding, and then to periodic cyclic redundancy check (CRC) coding to develop indications of the possible locations of byte errors in the TRS coding. These procedures are designed to correct byte errors caused by protracted burst noise, particularly as may arise from loss of received signal strength, and are performed in an apparatus called an "M/H Frame encoder". An M/H Frame is a time interval that, at least usually, is of the same 968-millisecond duration as 20 8-VSB Frame intervals. The M/H Frame is sub-divided into five equal-length M/H Sub-Frames, each composed of sixteen successive Groups of M/H data, thereby defining eighty Slots for M/H data in each M/H Frame. The related M/H data within a selected set of the eighty Slots in an M/H Frame is referred to as a "Parade". Each Parade is composed of one "Ensemble" or of two Ensembles located in different portions of Groups. Each Ensemble is TRS and CRC coded independently of every other Ensemble.

The output signal from the M/H frame encoder is supplied for subsequent serial concatenated convolutional coding (SCCC) of the general sort described by Valter Benedetto in U.S. Pat. No. 5,825,832 issued Oct. 20, 1998 and titled "Method and Device for the Reception of Symbols Affected by Inter-symbol Interference". The encoder for the SCCC comprises an outer convolutional encoder, an interleaver for two-bit symbols generated by the outer convolutional encoder, and an inner convolutional encoder constituting the precoder and 2/3 trellis coder prescribed by A/53. Six sequences of known symbols are introduced into the SCCC within in each Group. This is done to help adaptive channel-equalization filtering in receivers for the M/H signals.

MPH was designed by LGE engineers to transmit an MPEG-2-compatible stream of 187-byte transport packets. However, in the ATSC subcommittees, it was decided to transmit indeterminate-length Internet-Protocol (IP) Transport Stream (TS) packets instead. The indeterminate-length IP packets cannot be parsed by simply referring to the beginnings of rows of bytes in the TRS frame. Accordingly, each of the rows of bytes in TRS frames begins with a 16-bit, two-byte header that includes an indication of where in the row an IP packet begins, if an IP packet begins in that row and is the first IP packet to begin in that row. If more than one IP packet begins in a row, the beginning of each further IP packet is reckoned from the packet length information contained in the header of the preceding IP packet. The header of each IP packet contains a 16-bit, two-byte checksum for CRC coding of that particular IP packet.

The IP signal supplied to the later stages of an M/H receiver includes SMT-MH packets, each transmitting a respective Service Map Table (SMT) for each Ensemble included in an M/H signal transmission. These SMT-MH packets are used for assembling an Electronic Service Guide (ESG) that is made available on a viewscreen for guiding a user of the M/H receiver in the user's selection of a sub-Channel to be received and the mode of reception of that sub-Channel. After such selection by the user, stored SMT-MH data is used for conditioning the operation of the receiver accordingly. Each SMT-MH packet includes indications therewithin as to whether the SMT-MH packet repeats the previous SMT-MH packet for the Ensemble or updates the previous SMT-MH packet. The repetition of SMT-MH packets was designed to make available an additional degree of protection of the SMT-MH data against corruption by noise.

In MPH, the SCCC was accompanied by two kinds of signaling channels. One is the Transmission Parameter Channel (TPC), and the other is the Fast Information Channel (FIC). TPC signaling immediately followed by FIC signaling is transmitted in every M/H Group—that is, twice in each 8 VSB data field, beginning in its 17th data segment and in its 173rd data segment. TPC and FIC information used 12-phase, quarter-rate parallelly concatenated convolutional coding (PCCC) as outer coding, followed by inner coding that continues the 2/3 trellis coding used in other portions of the DTV signal. TPC and FIC signaling continues to be specified in A/153 although modifications of such signaling have been made in regard to the specifics of its PCCC and to the specific syntaxes of the TPC data and the FIC data.

The TPC signaling conveys M/H transmission parameters such as various FEC modes and M/H frame information. The TPC information is (18, 10) Reed-Solomon coded, but is not interleaved. MPH used advanced TPC signaling, in which the TPC information for the next M/H Frame was transmitted in the final three sub-Frames of the current M/H Frame and in the initial two sub-Frames of that next M/H Frame.

The principal purpose of FIC signaling is to foretell the M/H Ensemble configuration, so the receiver can acquire the specific RS-Frame(s) associated with a particular broadcast service. The FIC information is (51, 37) Reed-Solomon coded, and the resulting 51-byte codewords are matrix block interleaved for transmission within the Groups in each sub-Frame. In order to de-interleave the block interleaving of the 51-byte FIC codewords, a receiver has to know the total number of Groups (TNoG) transmitted within each M/H sub-Frame. In MPH, as originally proposed, the receiver had to calculate TNoG by detecting and counting the occurrences of the training signal included in each Group within an M/H sub-Frame. Later on, however, TNoG information was incorporated into the syntax for TPC signals.

In MPH, each Chunk of FIC signaling descriptive of an entire M/H frame was limited to 560 bytes so it could be transmitted within a single sub-Frame. Each FIC-Chunk was divided into FIC-Segments that were transmitted within respective Groups of the sub-Frame. MPH used advanced FIC signaling, in which the FIC information for the next M/H Frame was transmitted in each of the final three sub-Frames #2, #3 and #4 of the current M/H Frame. The FIC information was also transmitted in each of the initial two sub-Frames #0 and #1 of that next M/H Frame. It was subsequently pointed out in an ATSC ad hoc group that FIC signaling may require more than 560 bytes when a broadcaster transmits more than 140 or so M/H services. In such case FIC signaling cannot be completed within a single M/H sub-Frame. Coherent Logix, Inc. proposed remedying this shortcoming by transmitting additional FIC information as part of the IP signals encoding M/H data transmitted by SCCC.

LGE and SEC made a joint counterproposal that FIC Chunks be extended to span plural sub-Frames, up to five in number, rather than just a single sub-Frame. LGE and SEC proposed that the header of the FIC-Chunk be located either in the penultimate sub-Frame of an M/H Frame or in its final sub-Frame. Then, if possible, the FIC-Chunk would be repeated with a header in the first, second or third sub-Frame of the succeeding M/H Frame. This joint proposal of LGE and SEC presumed the FIC-Chunk to be provided with a header containing a current_next_indicator bit indicating when set to '1' that the FIC-Chunk would be currently applicable. The current_next_indicator bit when set to '0' indicates that the FIC-Chunk would be applicable for the M/H Frame beginning next after the conclusion of the FIC-Chunk. In the latter case, the most recently occurring FIC-Chunk transmitted with the current_next_indicator bit set to '1' should be currently applicable. The joint proposal further specified that the initial two bits of the header of each FIC-Segment which specify FIC_type would be 00 when the FIC-Segment contained a portion of an FIC-Chunk as proposed and would be 11 when the FIC-Segment was empty of FIC-Chunk data.

SUMMARY

The various aspects of the inventive concept address faults and shortcomings that the inventor discerned in the joint proposal for permitting extended-FIC-Chunks. Many of these aspects concern enabling M/H receivers to begin to decode M/H data encoded in SCCC without as much delay after initially tuning to an M/H broadcast service.

The inventor discerned that the joint proposal caused an M/H receiver to suffer unnecessarily long delay in regard to the acquisition of an extended-FIC-Chunk after initially tuning to an M/H broadcast service. Accordingly, the receiver had to provide temporary storage for M/H sub-Frames of SCCC signal encoding the M/H data, while awaiting the complete reception of an entire extended-FIC-Chunk that controlled the processing of that SCCC signal. The extended-FIC-Chunk had to be received completely because of being transmitted with block de-interleaving that had to be de-interleaved in order to use the extended FIC-Chunk to control the processing of SCCC signal. An aspect of the inventive concept concerns advancing the transmission of the extended-FIC-Chunks by an M/H transmitter apparatus so as to reduce the amount of temporary storage for M/H sub-Frames of SCCC signal required in an M/H receiver. This improvement is implemented in the version of FIC specified in A/153 as finally drafted. A closely related aspect of the inventive concept concerns an M/H receiver apparatus with a reduced amount of temporary storage for M/H sub-Frames of SCCC signal encoding the M/H data.

Another aspect of the inventive concept is alteration of the syntax of the current_next_indicator bit in the header of each FIC-Chunk and each extended-FIC-Chunk to that prescribed by the version of FIC specified in A/153 as finally drafted. The syntax of the current_next_indicator bit is altered better to accommodate the use of extended-FIC-Chunks. If the current_next_indicator bit is a ZERO (0), this indicates that the instructions contained in the FIC-Chunk are inapplicable to the M/H Frame currently being received, but will begin to be applicable in the M/H Frame next to be received. If the current_next_indicator bit is a ONE (1), this indicates that the instructions contained in the FIC-Chunk are also applicable to the M/H Frame currently being received. The logic of the current_next_indicator bit was arbitrarily chosen and could alternatively have been made opposite to that described. A related aspect of the inventive concept is an M/H receiver apparatus that detects the current_next_indicator bit and uses the ONE condition to apply the instructions in the FIC-Chunk for processing the encoded M/H data received within the same M/H Frame. This avoids a 0.968-second M/H-Frame-interval delay for beginning to turbo-decode M/H data encoded in SCCC, that would otherwise be suffered after initially tuning to an M/H broadcast service.

Yet another aspect of the inventive concept was alteration of the initial two bits of the header of each FIC-Segment which specify FIC_type, so as to signal which FIC-Segments are at the beginning of an FIC-Chunk. This aspect of the inventive concept is not implemented by the version of FIC specified in A/153 as finally drafted; instead FIC_segment num(ber) being '0000' is relied on to signal which FIC-Segments are at the beginning of an FIC-Chunk. A related aspect of the inventive concept is an M/H receiver apparatus that detects the signaling of which FIC-Segments are at the beginning of an FIC-Chunk and uses the information for parsing FIC-chunks transmitted via the FIC.

Still another aspect of the inventive concept is providing Total Number of Groups (TNoG) information for each sub-Frame of the M/H Frame currently being received as a current_TNoG field in all the TPC signals included within respective M/H Groups of that M/H Frame. In an exemplary embodiment of this aspect of the inventive concept, the TNoG fields of the TPC signals included within respective M/H Groups of the first two sub-Frames of the M/H Frame currently being received are re-named as current_TNoG fields. The TNoG fields of the TPC signals included within respective M/H Groups of the last three sub-Frames of the M/H Frame currently being received are re-named as next_TNoG fields. However, the re-named fields continue to provide TNoG information for each sub-Frame of the M/H Frame next to be received. The TPC signals included within respective M/H Groups of the last three sub-Frames of the M/H Frame currently being received are each modified to include a respective current_TNoG field. This field replaces four of the reserved bits specified in a version of TPC signaling previous to that version specified in A/153 as finally drafted. These characteristics of the version of TPC signaling syntax were introduced into the version of TPC signaling specified in A/153 as finally drafted. A related aspect of the inventive concept is an M/H receiver apparatus that utilizes current_TNoG as transmitted within respective M/H Groups of the last three sub-Frames of the M/H Frame currently being received to facilitate de-interleaving of FIC-Chunks received within those M/H Groups.

BRIEF DESCRIPTION OF THE DRAWINGS

FIG. 5 is a diagram showing how a Chunk of FIC data is split up into FIC Segments for (51, 37) Reed-Solomon forward-error-correction coding and subsequent insertion into appropriate Slots (or one appropriate Slot) in an M/H Frame.

FIG. 6 is a table showing exemplary bit syntax of the headers of FIC-Segments within the Fast Information Channel. FIG. 7 is a table showing exemplary bit syntax of the headers of FIC-Chunks conveyed by segments of the FIC.

FIG. 8 is a table showing exemplary bit syntax of the payload portions of FIC-Chunks conveyed by FIC-Segments of the FIC.

FIG. 9 is a table showing a syntax of bits of the TPC in each M/H Group, which syntax was an early embodiment of an aspect of the inventive concept.

FIGS. 10A and 10B are tables showing an exemplary syntax of bits for the TPC in each M/H Group, which syntax embodies an aspect of the inventive concept and was suggested to ATSC by the inventor in early 2009.

FIG. 11 is a schematic diagram of an exemplary embodiment of the signaling encoder in the FIG. 1 DTV transmitter apparatus.

Figure 1:
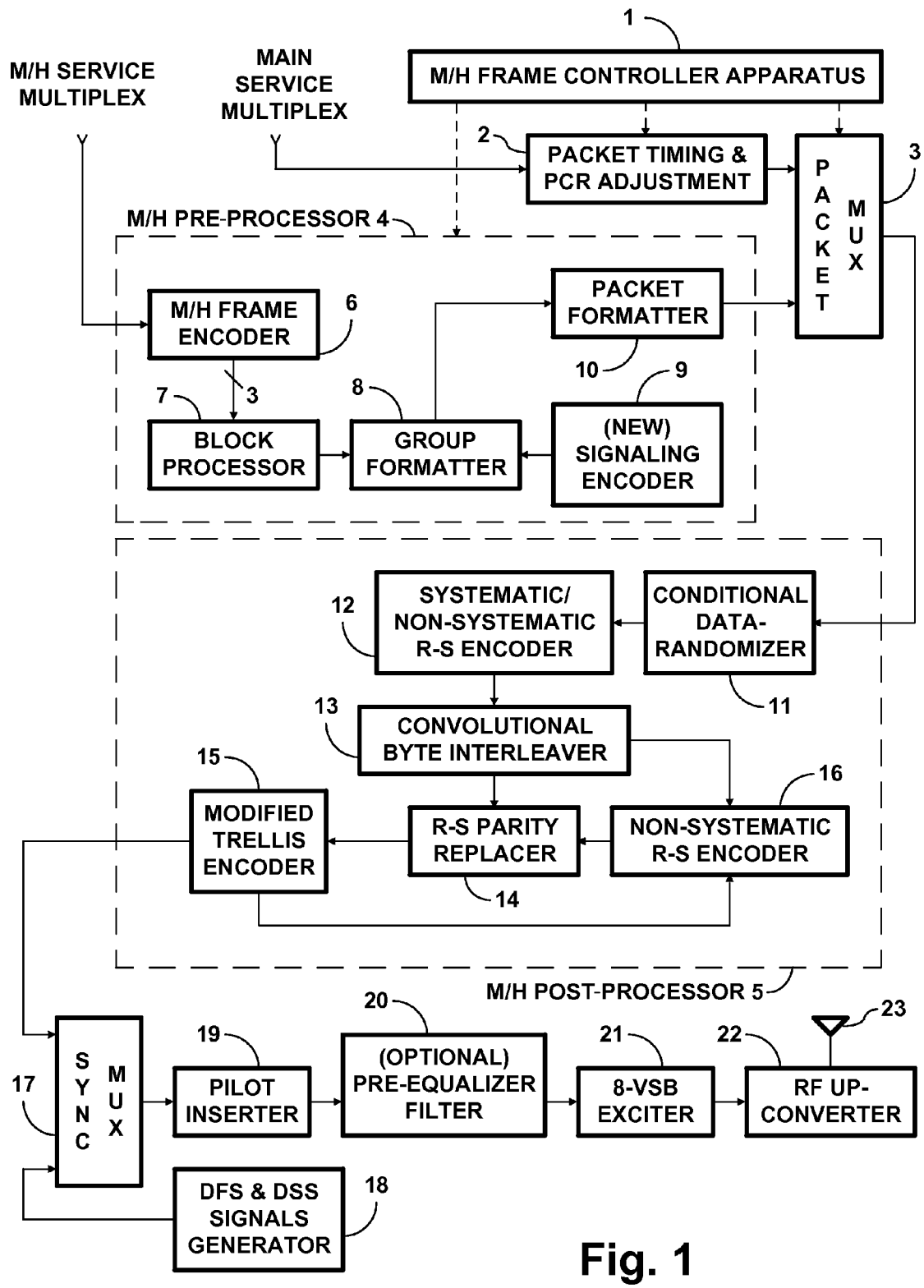
FIG. 1 is a schematic diagram of an exemplary embodiment of DTV transmitter apparatus for broadcasting signals to mobile and handheld (M/H) receivers, differing from the DTV transmitter apparatus prescribed by A/153 in regard to Fast Information Channel (FIC) and Transmission Parameter Channel (TPC) signaling generated by a signaling encoder therewithin.

Connections for control signals are indicated by successions of short dashes. Shim delays that a person skilled in the art would customarily introduce to make signal timings precisely correct may in some instances be omitted in the drawings, to conform to drafting limitations while keeping the drawings easy to understand.

DETAILED DESCRIPTION OF EXEMPLARY EMBODIMENTS

Certain exemplary embodiments of the present inventive concept are described in greater detail, following, with reference to the accompanying drawings. The matters defined in the following descriptions, such as detailed construction and elements, are provided to assist in a comprehensive understanding of the inventive concept. Further embodiments of the present inventive concept can be constructed and operated using equivalents of those specifically defined matters. Functions or constructions familiar to those skilled in the art and acquainted with the M/H system are not described in detail, to avoid obscuring the invention with unnecessary detail. The M/H system specified in A/153 provides M/H broadcasting services using a portion of the 19.39 Mbps ATSC 8-VSB transmission, while the remainder is still available for high-definition or multiple standard-definition television services. The M/H system specified in A/153 is a dual-stream system comprising the ATSC service multiplex for existing digital television services and the M/H-service multiplex for one or more mobile, pedestrian and hand-held services. Variants of the M/H System that reduce or eliminate existing digital television services in favor of additional M/H service are currently under consideration by ATSC, and the inventive concept extends to such variants when applicable.

FIG. 1 shows a transmitter apparatus for broadcast DTV signals using SCCC of an M/H type. The transmitter apparatus receives two sets of input streams: one includes MPEG transport stream (TS) packets of main-service data and the other includes M/H-service data. The M/H-service data are encapsulated in MPEG-like TS packets before emission, which MPEG-like TS packets have been called "M/H encapsulating packets" or more simply "MHE packets". This avoids disrupting the reception of the main-service data by legacy 8-VSB receivers. M/H-service data could be carried in MPEG transport streams, such as MPEG-2 video/audio or MPEG-4 video/audio, but the decision within ATSC is that it be carried by Internet-Protocol (IP) packets. The FIG. 1 transmitter apparatus combines the MPEG TS packets of the main-service data and the IP TS packets of the M/H-service data within one stream of MPEG or MPEG-like TS packets. Then, the FIG. 1 transmitter apparatus processes the combined stream for transmission as an ATSC trellis-coded 8-VSB signal.

An M/H Frame controller apparatus 1 controls these procedures. The main-service multiplex stream of data is supplied to a packet timing and PCR adjustment circuitry 2 before the packets of that stream are routed to a packet multiplexer 3 to be time-division multiplexed with MHE packets. (PCR is the acronym for "Program Clock Reference".) Because of their time-division multiplexing with the MHE packets, changes have to be made to the time of emission of the main-service stream packets compared to the timing that would occur with no M/H stream present. The packet timing and PCR adjustment circuitry 2 makes these timing changes responsive to control signals supplied thereto from the M/H Frame controller apparatus 1. The packet multiplexer 3 time-division multiplexes the main-service TS packets with TS packets encapsulating M/H-service data, as directed by control signals from the M/H Frame controller apparatus 1. The operations of the M/H transmission system on the M/H data are divided into two stages performed respectively by an M/H pre-processor 4 and by an M/H post-processor 5.

The function of the pre-processor 4 is to rearrange the M/H-service data into an M/H data structure, to enhance the robustness of the M/H-service data by additional FEC processes, to insert training sequences, and subsequently to encapsulate the processed enhanced data within MHE packets, thereby to generate the ancillary transport stream (TS). The operations performed by the pre-processor 4 include M/H Frame encoding, block processing, Group formatting, packet formatting and M/H signaling encoding. The M/H Frame controller apparatus 1 provides necessary transmission parameters to the pre-processor 4 and controls multiplexing of the main-service data packets and the M/H-service data packets by the packet multiplexer 3 to organize the M/H Frame.

The function of the post-processor 5 is to process the main-service data by normal 8-VSB encoding and to re-arrange the pre-processed M/H-service data in the combined stream to ensure backward compatibility with ATSC 8-VSB. The main-service data in the combined stream are processed exactly the same way as for normal 8-VSB transmission: randomizing, systematic Reed-Solomon (RS) encoding, convolutional byte interleaving and trellis encoding. The M/H-service data in the combined stream are processed differently from the main-service data, with the pre-processed M/H-service data bypassing data randomization. The pre-processed M/H-service data is subjected to non-systematic Reed-Solomon encoding, which re-arranges the bytes of that data. The non-systematic RS encoding allows the insertion of the regularly spaced long training sequences without disturbing legacy receivers. Additional operations are done on the pre-processed M/H-service data to initialize the trellis encoder memories at the beginning of each training sequence included in the pre-processed M/H-service data.

More specifically, the M/H-service multiplex stream of data is supplied to the M/H pre-processor 4 for processing and subsequent encapsulation in the payload fields of MHE transport packets. The MHE transport packets are supplied to the packet multiplexer 3 after data encapsulation within their payload fields is completed.

Still more specifically, the M/H-service multiplex stream of data is supplied to an M/H Frame encoder 6 which provides transverse Reed-Solomon (TRS) coding of data packets. The data packets are also subjected to periodic cyclic-redundancy-check (CRC) coding to locate byte errors for the TRS coding. Each M/H Frame includes one or more Frames of the TRS coding, and the data in each Frame of the TRS-CRC coding are randomized independently from each other and from the data of the main-service multiplex.

The M/H Frame encoder 6 is connected for supplying packets of M/H-service data to a block processor 7, as an input signal thereto. The block processor 7 includes encoders for each type of single-phase outer convolutional coding used in the SCCC and respective subsequent interleavers for successive two-bit nibbles of each type of single-phase outer convolutional coding.

A Group formatter 8 is connected for receiving the interleaved outer convolutional coding from the block processor 7 as an input addressing signal. The Group formatter 8 includes an interleaved Group format organizer that operates on the Group format as it will appear after the ATSC data interleaver. The interleaved Group format organizer maps the FEC coded M/H-service data from the block processor into the corresponding M/H blocks of a group, adding pre-determined training data bytes and data bytes to be used for initializing the trellis encoder memories. The interleaved Group format organizer inserts 3-byte headers for the MHE packets. The interleaved Group format organizer also inserts place-holder bytes for main-service data and for non-systematic RS parity. The interleaved Group format organizer adds some dummy bytes to complete construction of the intended Group format. The interleaved Group format organizer assembles a group of 118 consecutive TS packets. Some of these TS packets include the interleaved outer convolutional coding supplied by the block processor 7. Others of these TS packets are prescribed training signals stored in a read-only memory within the Group formatter 8 and inserted at prescribed intervals within the group. Still others of these TS packets are generated by a signaling encoder 9.

The M/H transmission system has two kinds of signaling channels generated by the signaling encoder 9, and they are transmitted using quarter-rate PCCC coding. One of these signaling channels is the Transmission Parameter Channel (TPC), and the other is the Fast Information Channel (FIC). The signaling encoder 9 differs from the types previously proposed in regard to both the TPC bit syntax and the FIC bit syntax, as will be described in detail further along in this specification. The signaling encoder 9 differs in some respects from the exact type subsequently adopted for inclusion in A/153, too.

The Transmission Parameter Channel (TPC) is for signaling the M/H transmission parameters such as various FEC modes and M/H Frame information. TPC signaling is transmitted in every M/H Group—that is, as often as twice in each 8-VSB data field. The initial TPC signaling begins in the 17th data segment of the 8-VSB data field, and the final TPC signaling begins in the 173rd data segment of the 8-VSB data field. The TPC information is (18, 10) Reed-Solomon coded, but is not interleaved. The M/H system as originally proposed by LGE used advanced TPC signaling, in which the TPC information for the next M/H Frame is transmitted in the final three sub-Frames of the current M/H Frame and in the initial two sub-Frames of that next M/H Frame. The signaling encoder 9 modifies advanced TPC signaling so the TPC information for the next M/H Frame is transmitted throughout the current M/H Frame. As will be explained in more detail further on in this specification, this permits rapid acquisition of new extended-FIC-Chunk information when an M/H receiver is powered up after a period of rest, or when a different major Channel is selected for reception.

The Fast Information Channel (FIC) is provided to enable the fast service acquisition of receivers, and it contains cross-layer information between the physical layer of receivers and their upper layers realized in software. A respective coded segment of the FIC immediately follows the coded segment of the TPC in each M/H Group. The FIC identifies the Groups within each M/H Frame that combine to provide a Parade of information about a specific broadcast service. The FIC and TPC together supply information that the physical layer of an M/H receiver uses to control turbo decoding of the SCCC portions of an M/H signal. The FIC information is (51, 37) Reed-Solomon coded and is matrix block interleaved for transmission within the Groups in each sub-Frame. In the M/H system as originally proposed by LGE, FIC signaling descriptive of an entire M/H Frame could be transmitted within a single sub-Frame. The M/H system as originally proposed by LGE used advanced FIC signaling, in which the FIC information for the next M/H Frame is transmitted in the final three sub-Frames of the current M/H Frame and in the initial two sub-Frames of that next M/H Frame. The signaling encoder 9 modifies advanced FIC signaling such that all the FIC information transmitted during an M/H Frame applies to the next M/H Frame to be transmitted.

Within the Group formatter 8, the interleaved Group format organizer is followed in cascade connection by a byte de-interleaver that complements the ATSC convolutional byte interleaver. The Group formatter 8 is connected for supplying the response of this de-interleaver as its output signal, which is applied as an input signal to a packet formatter 10. Initially, the packet formatter 10 expunges the main-service data place holders and the RS parity place holders that were inserted by the interleaved Group format organizer for proper operation of the byte de-interleaver in the Group formatter 8. The packet formatter 10 inserts an MPEG TS sync byte before each 187-byte data packet as a prefix thereof. The packet formatter 10 supplies 118 M/H-data-encapsulating TS packets per group to the packet multiplexer 3, which time-division multiplexes the M/H-service TS packets and the main-service TS packets to construct M/H Frames.

The M/H Frame controller apparatus 1 controls the packet multiplexer 3 in the following way when the packet multiplexer schedules the 118 TS packets from the packet formatter 10. Thirty-seven packets immediately precede a data-field-sychronization (DFS) segment in a 313-segment VSB field of data, and another eighty-one packets immediately succeed that DFS segment. The packet multiplexer 3 reproduces next-in-line main-service TS packets in place of MPEG null packets that contain place-holder bytes for main-service data in their payload fields. The packet multiplexer 3 is connected to supply the TS packets it reproduces to the post-processor 5 as an input signal thereto.

More specifically, the packet multiplexer 3 is connected to apply the TS packets it reproduces to a conditional data randomizer 11 as the input signal thereto. The conditional data randomizer 11 suppresses the sync bytes of the 188-byte TS packets and randomizes the remaining data in accordance with conventional 8-VSB practice, but only on condition that it is not encapsulated M/H-service data. The encapsulated M/H-service data bypass data randomization. The other remaining data are randomized per A/53, Annex D, §4.2.2.

An encoder 12 for systematic and non-systematic (207, 187) Reed-Solomon codes is connected to receive, as its input signal, the 187-byte packets that the conditional data randomizer 11 reproduces with conditional data randomization. The RS parity generator polynomial and the primitive field generator for the RS encoder 12 are the same as those A/53, Annex D, FIG. 5 prescribes for (207, 187) RS coding. When the RS encoder 12 receives a main-service data packet, the RS encoder 12 performs the systematic RS coding process prescribed in A/53, Annex D, §4.2.3, appending the twenty bytes of RS parity data to the conclusion of the 187-byte packet. When the RS encoder 12 receives an M/H-service data packet, the RS encoder 12 performs a non-systematic RS encoding process. The 20 bytes of RS parity data obtained from the non-systematic RS encoding process are inserted in a prescribed parity byte location within the M/H data packet.

A convolutional byte interleaver 13 is connected for receiving as its input signal the 207-byte RS codewords that the RS encoder 12 generates. The byte interleaver 13 is generally of the type specified in A/53, Annex D, §4.2.4. The byte interleaver 13 is connected for supplying byte-interleaved 207-byte RS codewords via a RS parity replacer 14 to a modified trellis encoder 15. The basic trellis encoding operation of the modified trellis encoder 15 is similar to that specified in A/53, Annex D, §4.2.4. The trellis encoder 15 converts the byte-unit data from the byte interleaver 13 to symbol units and performs a 12-phase trellis coding process per Section 6.4.1.4 Main Service Trellis Coding of A53-Part-2-2007. In order for the output data of the trellis encoder 15 to include pre-defined known training data, initialization of the memories in the trellis encoder 15 is required. This initialization is very likely to cause the RS parity data calculated by the RS encoder 12 prior to the trellis initialization to be erroneous. The RS parity data must be replaced to ensure backward compatibility with legacy DTV receivers. Accordingly, the trellis encoder is connected for supplying the changed initialization byte to an encoder 16 for non-systematic (207, 187) Reed-Solomon codes, which encoder 16 re-calculates the Reed-Solomon parity bytes of the affected MHE packets. The encoder 16 is connected for supplying the re-calculated RS parity bytes to the RS parity replacer 14, which substitutes the re-calculated RS parity bytes for the original RS parity bytes before they can be supplied to the modified trellis encoder 15. That is, the RS parity replacer 14 reproduces the output of the byte interleaver 13 as the data bytes for each packet in its output signal, but reproduces the output of the non-systematic RS encoder 16 as the RS parity for each packet in its output signal. The RS parity replacer 14 is connected to supply the resulting packets in its output signal to the modified trellis encoder 15 as the input signal thereto.

A synchronization multiplexer 17 is connected for receiving as the first of its two input signals the 2/3 trellis-coded data generated by the modified trellis encoder 15. The sync multiplexer 17 is connected for receiving its second input signal from a generator 18 of synchronization signals comprising the data segment sync (DSS) and the data field sync (DFS) signals. The DSS and DFS are time-division multiplexed with the 2/3 trellis-coded data per custom in the output signal from the sync multiplexer 17, which is supplied to a pilot inserter 19 as an input signal thereto. The pilot inserter 19 introduces a direct-component offset into the signal for the purpose of generating a pilot carrier wave during subsequent balanced modulation of a suppressed intermediate-frequency (IF) carrier wave. The output signal from the pilot inserter 19 is a modulating signal, which optionally is passed through a pre-equalizer filter 20 before being supplied as an input signal to an 8-VSB exciter 21 to modulate the suppressed IF carrier wave. The 8-VSB exciter 21 is connected for supplying the suppressed IF carrier wave to a radio-frequency up-converter 22 to be converted upward in frequency to repose within the broadcast channel. The up-converter 22 also amplifies the power of the radio-frequency (RF) signal that it applies to the broadcast antenna 23.

Figure 2:
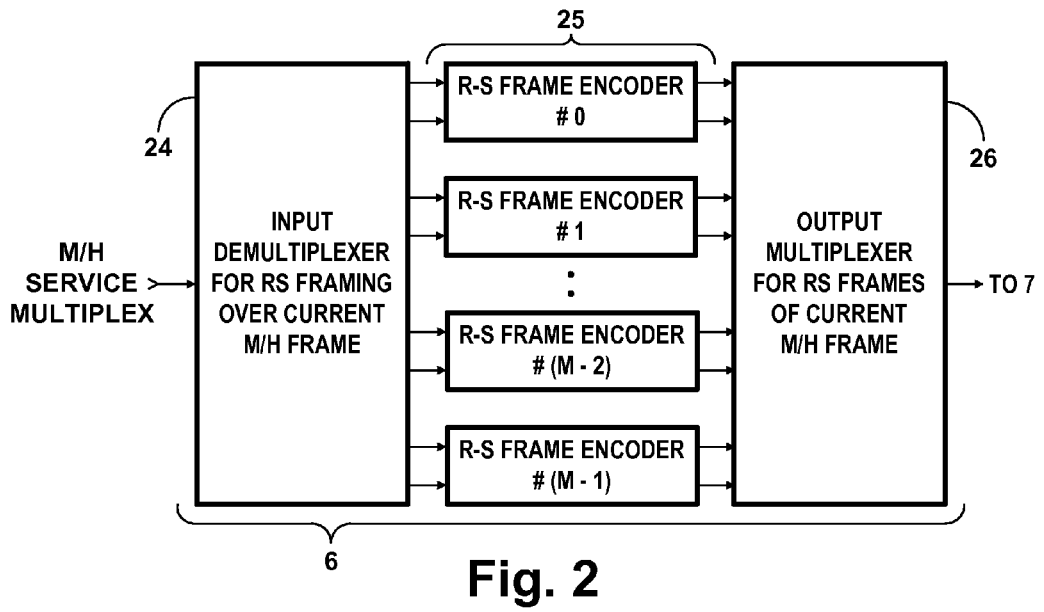
FIG. 2 is a schematic diagram of an exemplary embodiment of the M/H Frame encoder in the FIG. 1 DTV transmitter apparatus.

FIG. 2 shows the M/H Frame encoder 6 of the FIG. 1 DTV transmitter apparatus in some detail. The Ensembles of M/H Service Multiplex data are applied as input signals to an input de-multiplexer 24. The input de-multiplexer 24 is further connected for distributing those M/H Ensembles to a set 25 of R-S Frame encoders, M in number, as their respective input signals. An output multiplexer 26 for RS Sub-Frames is connected for time-division multiplexing Sub-Frame responses from the set 25 of R-S Frame encoders for application to the block processor 7. This multiplexing by the output multiplexer 26 and the de-multiplexing by the input de-multiplexer 24 are controlled by control signals generated by a controller not shown in FIG. 2.

Figure 3:
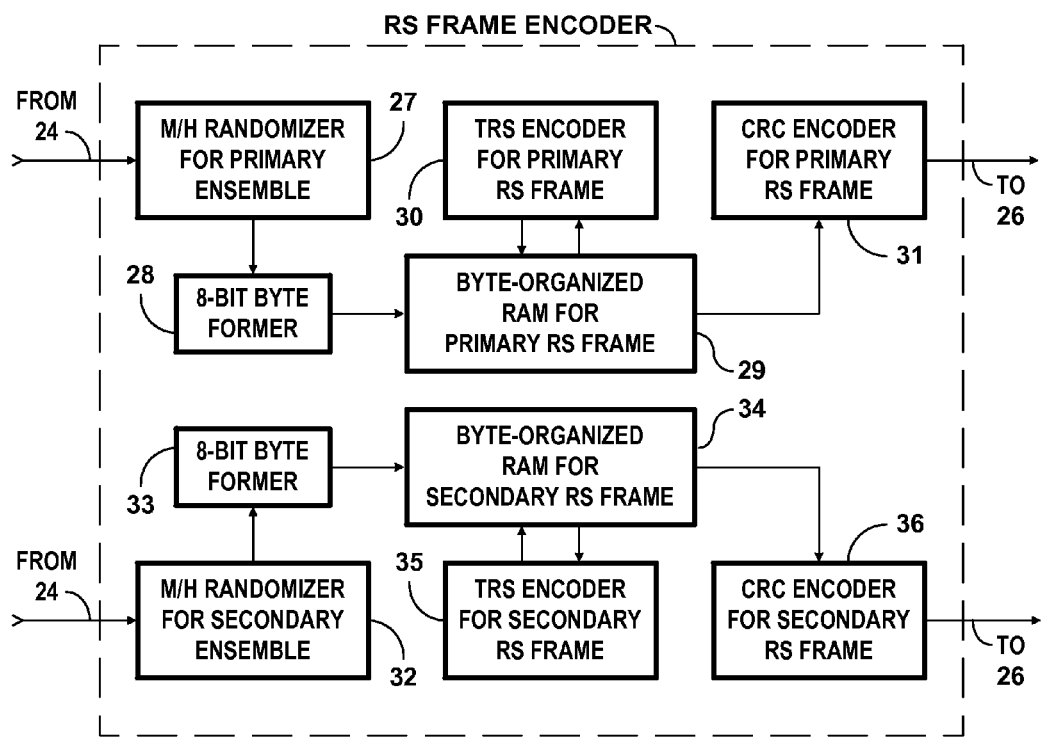
FIG. 3 is a schematic diagram of an exemplary embodiment of a component RS Frame encoder in the FIG. 2 M/H frame encoder.

FIG. 3 shows in more detail the structure of a representative one of the R-S Frame encoders included in the set 25 of R-S Frame encoders. An M/H data randomizer 27 is connected for receiving as an input signal thereto a primary Ensemble from the input multiplexer 24 of the M/H Frame encoder 6. The M/H data randomizer 27 is further connected for supplying its response to an 8-bit byte former 28 which forms 8-bit bytes of randomized M/H data to be written into rows of byte-storage locations in a byte-organized random-access memory (RAM) 29. Thereafter, the byte-storage locations in the RAM 29 are read one partial column at a time to an encoder 30 for transversal Reed-Solomon (TRS) coding which generates parity bytes to write the remaining byte-storage locations in the column. This completes the primary RS Frame stored within the RAM 29 and its byte-storage locations are subsequently read a row at a time to provide input signal for a cyclic-redundancy-check (CRC) encoder 31. The response of the CRC encoder 31 reproduces each row of bytes read from the RAM 29 and appends a respective 2-byte checksum to each of them. The response of the CRC encoder 31 is supplied to the output multiplexer 26 of the M/H Frame encoder 6 as shown in FIG. 2.

An M/H data randomizer 32 is connected for receiving as an input signal thereto a secondary Ensemble from the input multiplexer 24 of the M/H Frame encoder 6. The M/H data randomizer 32 is further connected for supplying its response to an 8-bit byte former 33 which forms 8-bit bytes of randomized M/H data to be written into rows of byte-storage locations in a byte-organized random-access memory 34. Thereafter, the byte-storage locations in the RAM 34 are read one partial column at a time to an encoder 35 for transversal RS coding which generates parity bytes to write the remaining byte-storage locations in the column. This completes the secondary RS Frame stored within the RAM 34 and its byte-storage locations are subsequently read a row at a time to provide input signal for a cyclic-redundancy-check encoder 36. The response of the CRC encoder 36 reproduces each row of bytes read from the RAM 34 and appends a respective 2-byte checksum to each of them. The response of the CRC encoder 36 is supplied to the output multiplexer 26 of the M/H Frame encoder 6 as shown in FIG. 2.

Figure 4:
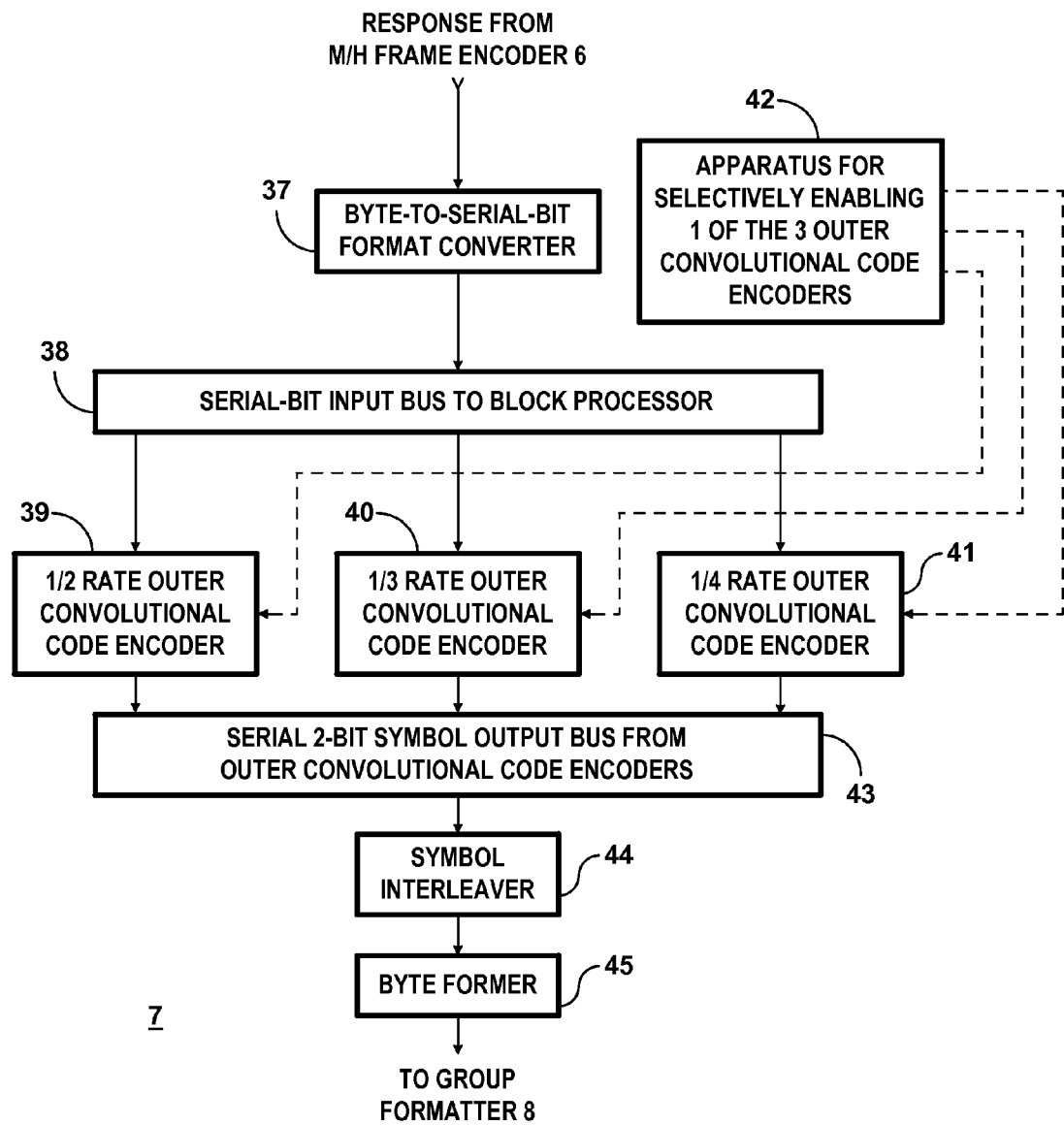
FIG. 4 is a schematic diagram of an exemplary embodiment of the Block processor in the FIG. 1 DTV transmitter apparatus, which Block processor performs the outer convolutional coding done as a preliminary step of generating serially concatenated convolutional coding (SCCC).

FIG. 4 shows a representative embodiment of the block processor 7 in the FIG. 1 DTV transmitter apparatus. The M/H Frame encoder 6 is connected for supplying its output signal in 8-bit byte format as an input signal to a byte-to-serial-bit format converter 37. The format converter 37 is connected for supplying the M/H Frame encoder 6 response as converted to serial-bit format to a serial-bit input bus 38 of the block processor 7. The input bus 38 is connected to convey the M/H Frame encoder 6 response as converted to serial-bit format to encoders 39, 40 and 41 as their respective input signals. The encoders 39, 40 and 41 shown in FIG. 4 generate one-half-rate outer convolutional coding, one-third-rate outer convolutional coding and one-quarter outer convolutional coding, respectively. FIG. 4 shows an apparatus 42 for selectively enabling operation of the encoders 39, 40 and 41 one at a time. If the encoders 39, 40 and 41 have separate physical structures, the apparatus 42 for selectively enabling operation can, by way of example, be such as to supply operating power to only a selected one of the three encoders. In actual practice, the encoders 39, 40 and 41 will probably use elements in common. In such case, the apparatus 42 will comprise selective connection circuitry for selecting the outer convolutional coding with desired rate. FIG. 4 shows the encoders 39, 40 and 41 connected for supplying serial two-bit symbols to an output bus 43 for subsequent application to a symbol interleaver 44. The symbol interleaver 44 is connected for supplying its response to a byte former 45, which converts the symbol interleaver response into eight-bit bytes for application to the Group formatter 8 as one of the input signals thereto.

In MPH each FIC Chunk was completely transmitted within the M/H Groups within one sub-frame of an M/H Frame. Those FIC Chunks in the initial two sub-Frames #0 and #1 of an M/H Frame pertained to the M/H Frame being currently received. Those FIC Chunks in the final three sub-Frames #2, #3 and #4 of an M/H Frame pertained to the M/H Frame next to be received. LGE and SEC jointly proposed extending FIC Chunks, when necessary, to span plural sub-Frames, up to five in number, rather than just a single sub-Frame. LGE and SEC proposed that the header of the FIC-Chunk be located either in the penultimate sub-Frame of an M/H Frame or in its final sub-Frame. Then, if possible, the FIC-Chunk would be repeated with a header in the first, second or third sub-Frame of the succeeding M/H Frame.

The inventor pointed out to members of ATSC ad hoc groups that the joint proposal presented problems in the design of an M/H receiver, if the extended FIC Chunk spanned four or five M/H sub-Frames. An extended FIC Chunk that began in the third sub-Frame #2 of an M/H Frame and spanned four sub-Frames would not be completely available until the beginning of the second sub-Frame, #1, of the subsequent M/H Frame to which that FIC Chunk pertains. Accordingly, the M/H receiver would have to store at least one complete sub-Frame of received SCCC data temporarily while waiting for an update of FIC information, so selective turbo decoding of M/H Groups in each successive Frame could commence with assurance of being correct. An extended FIC Chunk that began in the third sub-Frame #2 of an M/H Frame and spanned five sub-Frames would not be completely available until the beginning of the third sub-Frame, #2, of the subsequent M/H Frame to which that FIC Chunk pertained. Accordingly, the M/H receiver would have to store at least two complete sub-Frames of received SCCC data temporarily while waiting for an update of FIC information, so selective turbo decoding of M/H Groups in each successive Frame could commence with assurance of being correct. It is undesirable to have to provide so much temporary storage for SCCC data. To avoid having to provide temporary storage for SCCC data that will not subsequently be turbo decoded, the inventor observed, any FIC Chunk(s) pertaining to an M/H Frame should be completely available or essentially so before that M/H Frame begins to be received. That is, advanced signaling should be further advanced than earlier proposed, such that the FIC signaling in regard to an M/H Frame is completed before that M/H Frame is received.

Advanced FIC signaling that begins in the third sub-Frame #2 of an M/H Frame previous to the M/H Frame the signaling pertains to and that concludes in that latter Frame can also require excessive temporary storage for SCCC data even though the FIC Chunks are not extended or are extended to only span two sub-Frames. Such FIC Chunks and shorter extended FIC Chunks are repeated so that FIC-segment errors can be weeded out of the repeated set of FIC-Chunk information. When reception conditions are unfavorable, this weeding out of FIC-Segment errors may be completed when the final FIC Chunk or extended FIC Chunk in the set has been received, and not before. Accordingly, SCCC data will have to be temporarily stored until after such time as the final repetition of the FIC Chunk or shorter extended FIC Chunk occurs. The inventor expressed his opinion within an ATSC ad hoc group that an extended-FIC-Chunk should always be completed before the next M/H Frame in which that FIC-Chunk would be applicable.

The inventor suggested transmissions of FIC-Chunks could begin as early as at the outsets of M/H Frames—i. e., with the FIC-Chunk headers in the initial sub-Frames #0 of the M/H Frames—repeating FIC-Chunks that spanned no more than two and a half sub-Frames. The amount of memory, if any, then required for delaying the FIC information until that next M/H Frame would be much smaller than the amount of memory required for delaying the SCCC encoding M/H data until later-transmitted FIC information would be received. Beginning extended-FIC-Chunks so early would, however, compromise the capability of a receiver to acquire a complete extended-FIC-Chunk following a change in channel selection made soon after an M/H Frame began.

In its final draft as published, A/153 arranges for an extended-FIC-Chunk to be received in its entirety before the next M/H Frame in which that extended-FIC-Chunk would be applicable, but specifies it to be located as close to the conclusion of the M/H Frame as possible. So, the locations of extended-FIC-Chunks other than those spanning five M/H sub-Frames are somewhat later per A/153 than if the FIC-Chunk headers are located in the initial sub-Frames #0 of the M/H Frames.

FIG. 5 depicts the procedure for dividing an extended FIC Chunk into 37-byte FIC Segments and (51, 37) RS FEC coding those FIC Segments for insertion into appropriate Slots (or Slot) within an M/H Frame. The FIC Chunk is $(5/D) \times (35 \times TNoG)$ bytes long. The initial four bytes of the FIC Chunk are its header having bit syntax as shown in FIG. 9. The rest of the bytes of the FIC Chunk are its payload having bit syntax as shown in FIG. 10 followed by shim bytes to make up the full length of the FIC Chunk if it would otherwise be shorter than $(5/D) \times (35 \times TNoG)$ bytes long. The divisor D can have a value of 1, 2, 4 or 5 and indicates the number of FIC Chunks that will fit evenly within a single M/H Frame. The divisor D could have a value of 3 if desired, but the three FIC Chunks will fit evenly within 78 Slots, rather than the 80 Slots within a single M/H Frame. The FIC Chunk is divided up into $(5 \times TNoG)/D$ successive 35-byte FIC-Segment payloads, each to be preceded by a respective two-byte FIC-Segment header having a bit syntax as shown in FIG. 8. The resulting 37-byte FIC Segments are each (51, 37) R-S FEC coded for insertion into appropriate Slots (or a single such Slot) within an M/H Frame.

FIG. 6 shows a bit syntax for the headers of segments of the Fast Information Channel (FIC) that was preferred by the inventor, but which differs from that adopted for inclusion in A/153. The meaning of FIC_Segment_type in the initial bits 1 and 2 in the first byte of the header is altered to take into account the fact that FIC Chunks may have extended length. An M/H receiver can use these initial bits 1 and 2 to aid in parsing of FIC Chunks that can vary as to the number of bytes they include. The initial bits 1 and 2 are both ONEs only if each FIC Chunk within an M/H Frame includes just a single FIC segment. Otherwise, the bits 1 and 2 indicate what portion of an FIC Chunk is conveyed by the FIC Segment, and suggested values for such indications are as follow. The bits 1 and 2 are ONE and ZERO respectively if the FIC Segment contains the very beginning of the FIC Chunk including its four-byte header. The bits 1 and 2 are ZERO and ONE respectively if the FIC Segment contains the ultimate conclusion of the FIC Chunk including any shim bytes to bring the FIC Chunk up to specified length. The bits 1 and 2 are both ZERO if the FIC Segment contains an intermediate portion of the FIC Chunk that is of no particular interest with regard to parsing the FIC Chunk.

The FIG. 6 FIC-Segment header places the FIC_Segment_number in bits 3-6 within the first byte of the header, rather than placing it in the second byte of the header as done in A/153. This earlier position of the FIC_Segment_number in the header facilitates write addressing the memory needed for storing extended FIC Chunks.

The new_in_this_FIC_Chunk bit 7 of the FIG. 6 FIC-Segment header is a ONE if the portion of the FIC Chunk contained in the FIC Segment differs from the corresponding FIC Segment in the immediately preceding M/H Frame in the Parade repetition cycle (PRC) containing a portion of an FIC Chunk. This information is useful to a receiver that averages FIC information to suppress the effects of noise.

Bit 8 of the FIG. 6 FIC-Segment header is a error_indication bit that was a ZERO-valued bit before signaling randomization at the transmitter. In some M/H receiver designs, this bit will be toggled to ONE by the decoder of the (51, 37) RS FEC coding when an FIC Segment is found to contain byte error incapable of correction. This may help routing this Signaling Error Indication (SEI) bit to portions of the M/H receiver further on from the decoder of the (51, 37) RS FEC coding.

FIG. 6 shows bit 9 of the FIC-Segment header to be reserved for possible future use. This bit 9 should be set to ONE until such time as that future use materializes.

FIG. 6 shows the final seven bits 10-16 of the 2-byte FIC-Segment header containing num_Segments_in_FIC_Chunk indication of the length of the FIC Chunk being currently received. The M/H receiver apparatus needs information concerning the number of FIC Segments in each FIC Chunk, and the inventor found this has to be signaled when extended-length FIC Chunks of different lengths are transmitted in the FIC. The candidate M/H Standard 1.0 as proposed at the time of the invention did not signal this critical parameter in the FIC.

FIG. 7 shows a bit syntax for the headers of FIC Chunks previously proposed by the inventor in which all the FIC Chunks transmitted within an M/H Frame each contain information concerning the next M/H Frame in the Parade repetition cycle. Otherwise, the inventor observed, the various possible lengths of the FIC Chunks complicate implementation of "signaling in advance". Furthermore, the meaning of the current_next_indicator datum was changed from what it was in MPH to what is specified in the current version of FIC signaling specified by A/153. The current_next_indicator bit has one value—e.g., ONE—if the FIC information relates to the M/H Frame it is received in as well as the next M/H Frame, and has another value—e.g., ZERO—if the FIC information relates only to the next M/H Frame. The rest of the FIG. 7 bit syntax for the headers of FIC Chunks corresponds to the bit syntax for FIC-Chunk headers set forth in A/153. FIG. 8 shows the bit syntax for the payloads of FIC Chunks, which corresponds to that specified by A/153.

FIG. 9 is a table showing a syntax of bits in the TPC data similar to the table disclosed in provisional U.S. Patent Application Ser. No. 61/203,584 filed Dec. 22, 2008, but corrected to show the SCCC_code_mode field that was inadvertently omitted from the table. There are eighty bits in the TPC data transmitted with each Group, and in this specification they are referred to by number according to the order of their transmission within the Group. Bits 1-3 specifying sub_Frame_number and bits 4-7 specifying Slot_number always apply to the Slot being currently received, as well as to the corresponding Slot in the next M/H Frame in the Parade repetition cycle (PRC). Bits 8-14 specifying the Parade_ID, bits 15-18 specifying the starting_Group_number, bits 19-21 specifying the number_of_Groups_minus_one assigned to the Parade in each M/H sub-Frame, and bits 22-24 specifying the Parade_repetition_cycle_minus_one apply to the next M/H Frame in the PRC. The Parade_repetition_cycle_minus_one number appearing in bits 22-24 of the TPC bit syntax ranges from zero to seven. It signals the number of M/H Frames skipped over from one M/H Frame containing parts of a Parade to the next Frame containing parts of the Parade.

Bits 25-40 describing forward-error-correction coding, bits 41-45 specifying the FIC_version, and bits 46-49 specifying Parade_continuity_counter count apply to the next M/H Frame in the PRC. The particulars of the bits 25-40 describing FEC coding are the same as A/153 specifies for those bits in the final three sub-Frames #2, #3 and #4 of an M/H Frame. Bits 46-49 specify the Parade_continuity_counter count to be expected in the next M/H Frame in the Parade repetition cycle. (Specification of zero Parade_continuity_counter count rather than an expected consecutive count other than zero can be used to signal the beginning of a new Parade.)

Bits 50-54 specify the total_number_of Groups to be expected in each sub-frame of the next M/H Frame in the Parade repetition cycle. Bits 55-59 specify the total_number_of Groups_this_Frame. An M/H receiver can use the total_number_of Groups_this_Frame for faster acquisition of a channel newly selected for reception. The M/H receiver can use the total_number_of Groups_this_Frame to control the de-interleaver for FIC signal during the M/H Frame that is initially received after change in the channel selected for reception. Accordingly, FIC Chunks can be received an M/H Frame earlier than would otherwise be the case, to furnish the information needed to control turbo decoding of selected M/H data during the succeeding M/H Frame.

M/H signals may be transmitted using iterative diversity in which earlier and later transmissions of the same data are designed to be combined during turbo decoding procedures. When such transmissions are received by an M/H receiver capable of combining earlier and later transmissions of the same data during turbo decoding procedures, the M/H receiver needs to know whether the currently received Group belongs to the earlier transmission or to the later transmission. If the currently received Group belongs to the earlier transmission, it is diverted to a digital delay line. The digital delay line delays the earlier transmission so its turbo decoding takes place concurrently with the turbo decoding of the later transmission of the same data. The TPC bit syntax in A/153 does not provide for signaling iterative diversity transmissions. The FIG. 9 table shows bits 60 and 61 being used as an iterative_diversity_mode datum. The iterative_diversity_mode being 11 signals that the Group is one not being iteratively transmitted. Other values of the iterative_diversity_mode datum signal whether the Group currently being received is an initial one or a final one of a pair of iteratively transmitted Groups. The following other values of the iterative_diversity_mode datum signals are suggested by way of example. The iterative_diversity_mode datum being 01 signals that the Group currently being received is an initial one of a pair of iteratively transmitted Groups designed for being combined during turbo decoding procedures. The iterative_diversity_mode datum being 10 signals that the Group currently being received is an initial one of a pair of iteratively transmitted Groups designed for their respective data being combined later on in the receiver using procedures that combine transport stream packets. The iterative_diversity_mode datum being 00 signals that the Group currently being received is a final one of a pair of iteratively transmitted Groups.

Bit 55 of the FIG. 9 Table of Bit Syntax for TPC is a TPC_discontinuity_in_Slot indicator. If the "normally continuing" TPC information is applicable to the M/H Frame it is received in, as well as to the next M/H Frame in the Parade repetition cycle, this bit is ZERO. If there is a change updating the TPC information applicable to the next M/H Frame in the Parade repetition cycle, this bit is ONE. This bit is useful to an M/H receiver when a change occurs in regard to selection of the major channel for reception.

Decisions were made in ATSC to use the last five bits of the TPC data to signal the version of that data that was being used. Bits 76 and 77 signal major changes in the TPC data used in the M/H Standard. These major changes cause the TPC data to be indecipherable to receivers designed for receiving transmissions made in accordance with earlier versions of the M/H Standard. Bits 78, 79 and 80 signal minor changes in the TPC data used in the M/H Standard. These minor changes leave parts of the TPC data decipherable to receivers designed for receiving transmissions made in accordance with earlier versions of the M/H Standard. In A/153 all the bits 78, 79 and 80 in TPC are ONEs, each of them rolling to ZERO when the first change in TPC version is adopted by ATSC. In A/153 the both bits 76 and 77 in TPC are ONEs, each of them rolling to ZERO when the initial major change in TPC version is adopted by ATSC.

FIGS. 10A and 10B are tables showing a syntax of bits for the TPC, which syntax the inventor suggested to ATSC in early 2009. FIG. 10A shows the TPC bit syntax for the initial two sub-Frames #0 and #1 of an M/H Frame. FIG. 10B shows the TPC bit syntax for the final three sub-Frames #2, #3 and #4 of an M/H Frame. The syntax of TPC bits shown in the FIG. 10A and 10B tables is an exemplary embodiment of an aspect of the inventive concept—namely, that the total_number_of Groups_this_Frame is transmitted in each and every sub-Frame of the M/H Frame. This information is transmitted in fields in each and every sub-Frame of the M/H Frame in the bit syntax shown in FIGS. 10A and 10B, but in fields that are denominated current_total_number_of Groups rather than total_number_of Groups_this_Frame. To avoid having to scrap monolithic integrated circuits already designed, bits 50-54 specify the current_total_number_of Groups in the TPC bit syntax for the initial two sub-Frames #0 and #1 shown in FIG. 10A. However, in the TPC bit syntax for the final three sub-Frames #2, #3 and #4 shown in FIG. 10B, bits 55-59 specify the current_total_number_of Groups instead, to permit bits 50-54 to specify the next_total_number_of Groups applicable to the sub-Frames of the M/H Frame next to be received. ATSC members agreed to use this arrangement of current_total_number_of Groups fields and next_total_number_of Groups field in A/153.

FIG. 10A shows bits 55-59 specifying the previous_total_number_of Groups in the TPC bit syntax for the initial two sub-Frames #0 and #1. Some ATSC members insisted, however, that these bits be maintained as reserve bits in A/153. Otherwise, the syntax of bits for the TPC shown in the tables of FIGS. 10A and 10B corresponds to that specified in A/153.

FIG. 11 is a detailed schematic diagram of a representative embodiment of the signaling encoder 9 in the FIG. 1 DTV transmitter apparatus. An apparatus 46 for generating Transmission Parameter Channel (TPC) data using the bit syntax shown in FIGS. 10A and 10B is connected for supplying that TPC data to an encoder 47 for (18, 10) Reed-Solomon coding bytes of that TPC data. An apparatus 48 for generating Fast Information Channel (FIC) data using the bit syntax shown in FIGS. 6, 7, 8 and 9 is connected for supplying that FIC data to an encoder 49 for (51, 37) Reed-Solomon coding FICbytes. The encoder 49 encodes 37 bytes per Group and is connected for supplying the resulting 51 bytes of RS-coded FIC to a matrix-type block interleaver 50. A time-division multiplexer 51 is connected for supplying a response that interleaves 51 bytes of block interleaver 50 response as received at a first input port of the multiplexer 51 between each 18-byte RS codeword received from the encoder 47 at a second input of the multiplexer 51. The multiplexer 51 is connected for supplying its response to a signaling randomizer 52. The signaling randomizer 52 is connected for supplying its response as an input signal to a quarter-rate PCCC encoder 53, which is in turn connected to supply the quarter-rate PCCC that it generates to the Group formatter 8. The apparatus 46 for generating TPC data using the bit syntax shown in FIGS. 10A and 10B and the apparatus 48 for generating FIC data using the bit syntax shown in FIGS. 6, 7, 8 and 9 differ from what was previously proposed. The elements 47, 49. 50, 51, 52 and 53 correspond to those previously proposed and subsequently specified for implementing A/153.

Figure 12A:
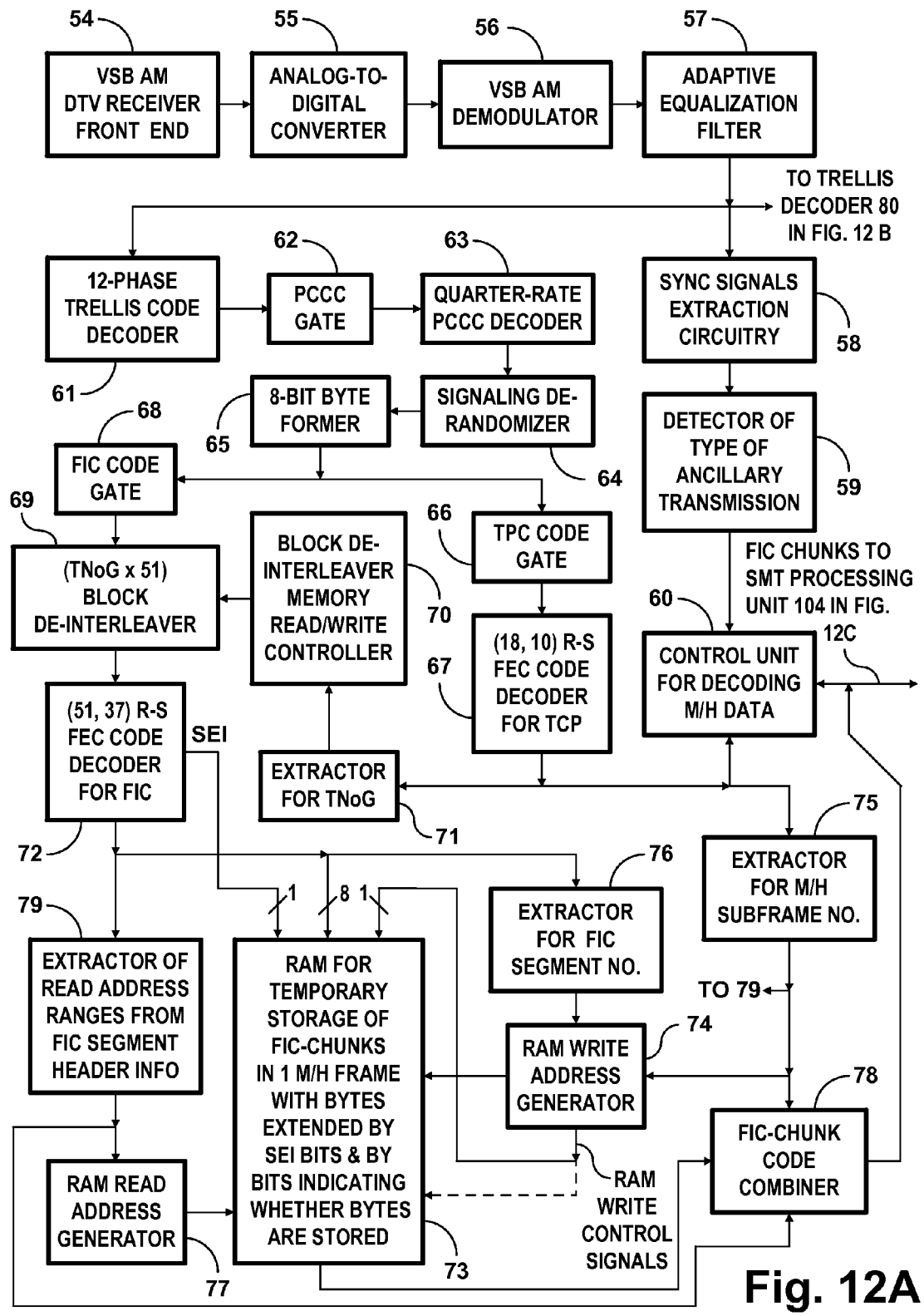
FIG. 12 is an assembly drawing that shows how ensuing FIGS. 12A, 12B and 12C combine to provide a detailed schematic diagram of an exemplary embodiment of M/H receiver apparatus constructed in accordance with aspects of the inventive concept for receiving M/H transmissions sent over the air from the FIG. 1 DTV transmitter apparatus.
Figure 12B:
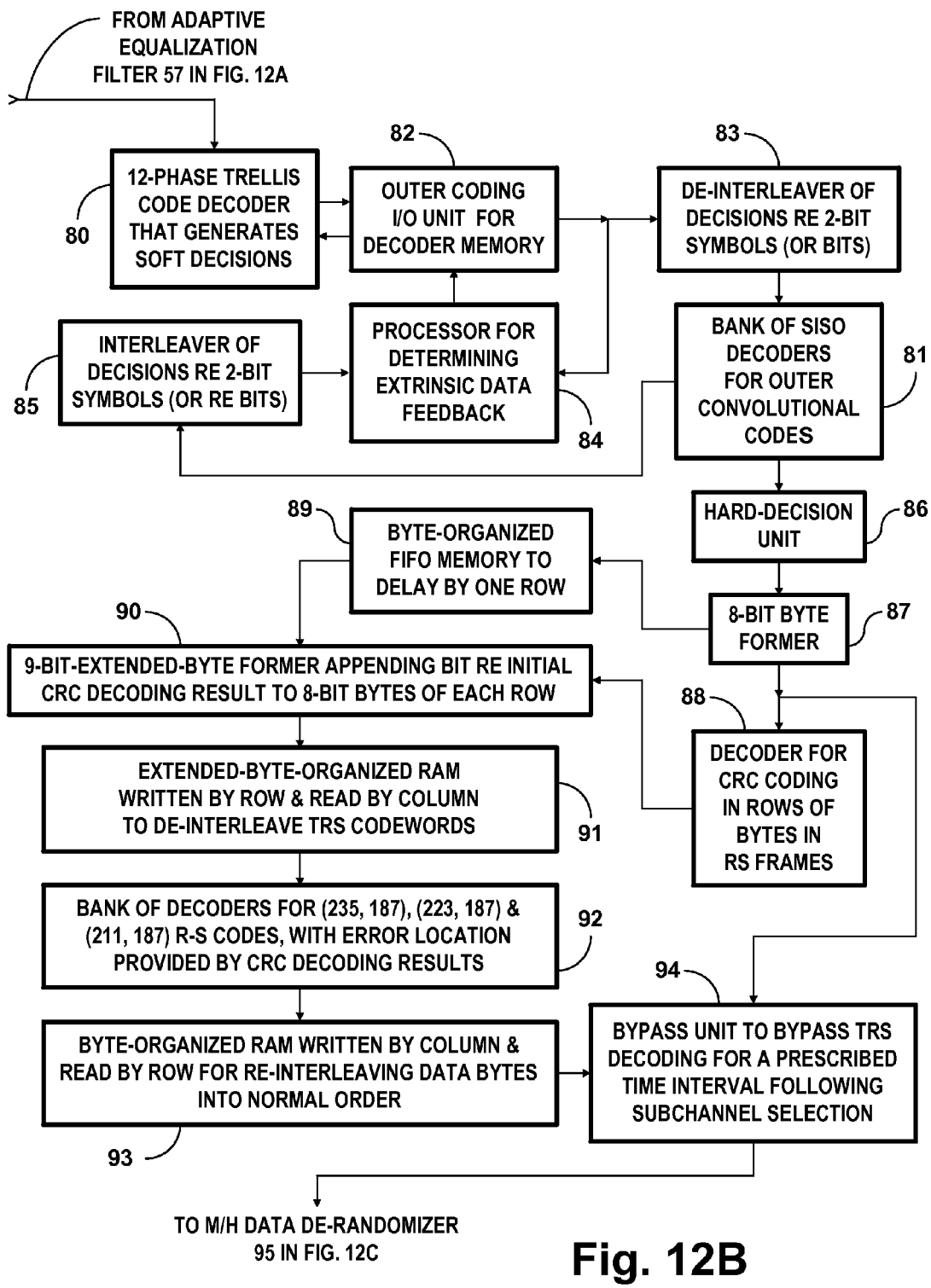
Figure 12C:
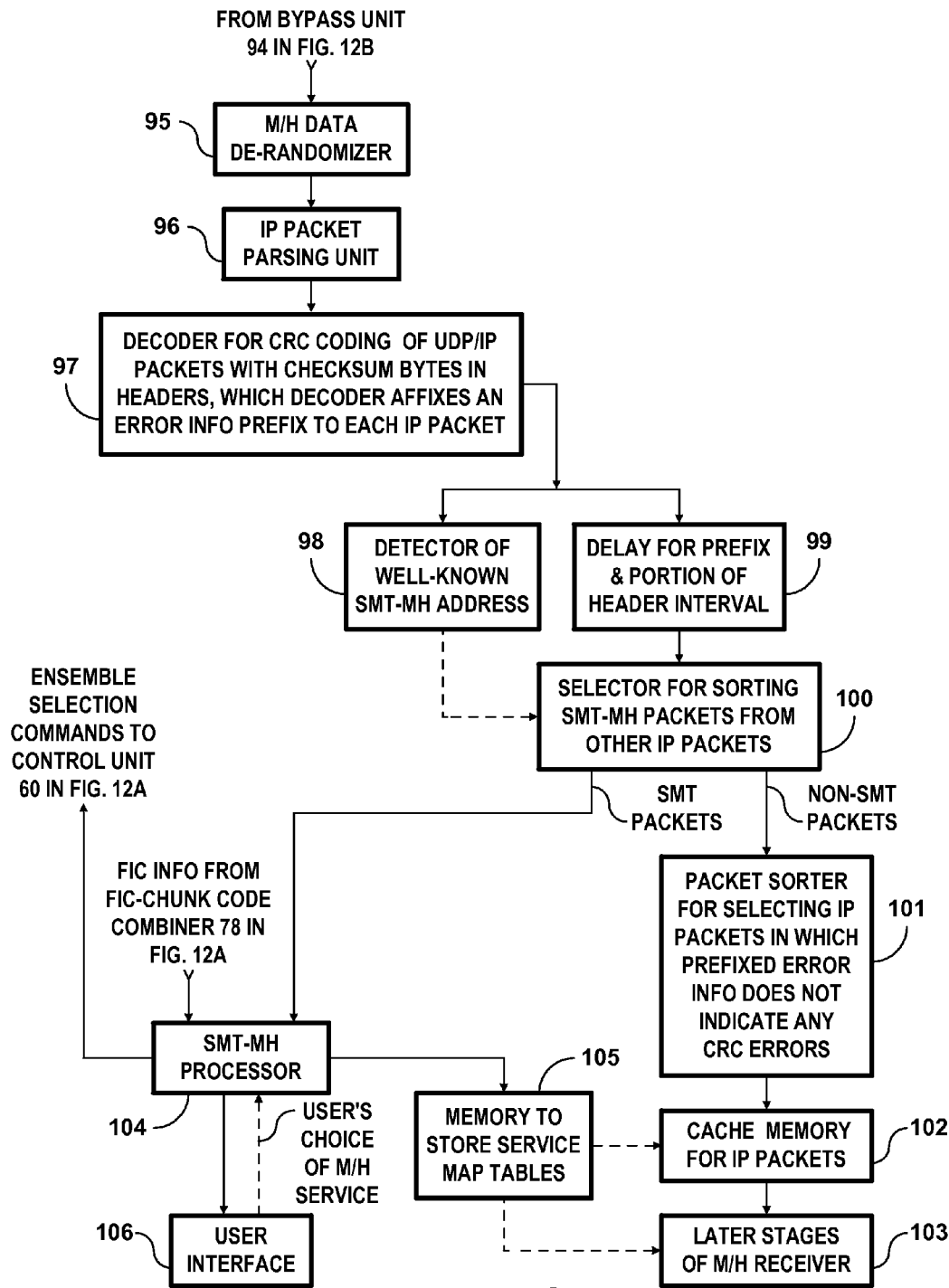

FIG. 12 is an assembly drawing that shows how FIGS. 12A, 12B and 12C combine to provide a detailed schematic diagram of a DTV receiver apparatus for receiving M/H transmissions sent over the air from the FIG. 1 DTV transmitter apparatus. The FIG. 12A portion of the DTV receiver apparatus includes a vestigial-sideband amplitude-modulation (VSB AM) DTV receiver front-end 54 for selecting a radio-frequency (RF) DTV signal for reception, converting the selected RF DTV signal to an intermediate-frequency DTV signal, and for amplifying the IF DTV signal. An analog-to-digital converter (ADC) 55 is connected for digitizing the amplified IF DTV signal supplied from the DTV receiver front-end 54. A demodulator 56 is connected for demodulating the digitized VSB AM IF DTV signal to generate a digitized baseband DTV signal. The receiver front-end 54, the ADC 55, and the VSB AM demodulator 56 combine to provide a conversion apparatus for receiving a selected 8-VSB signal as transmitted in 8-VSB modulation of an RF carrier wave within a respective frequency channel and converting it to digital samples of a baseband signal. (Equivalent circuitry that digitizes the baseband signal after analog demodulation of the VSB AM signal is used in alternative embodiments of the DTV receiver apparatus.) The VSB AM demodulator 56 is connected to supply digital samples of a baseband signal to an adaptive equalization filter 57 for optimizing a channel response. Synchronization signals extraction circuitry 58 is connected for receiving the equalization filter 57 response. Responsive to data-field-synchronization (DFS) signals, the sync extraction circuitry 58 detects the beginnings of data Frames and fields. Responsive to data-segment-synchronization (DSS) signals, the sync extraction circuitry 58 detects the beginnings of data segments. The FIG. 12 DTV receiver apparatus uses the DSS and DFS signals for controlling its operations similarly to the way this is done in legacy DTV receivers. None of FIGS. 12A, 12B and 12C explicitly shows the circuitry for effecting these operations.

A decoder 59 for detecting the type of ancillary transmission responds to eight-bit sequences contained in final portions of the reserved portions of DFS signals separated by the sync extraction circuitry 58. The decoder 59 is connected for indicating the type of ancillary transmission to a decoding control unit 60 that controls turbo decoding of SCCC and subsequent two-dimensional decoding of RS Frames in the FIG. 12 DTV receiver apparatus. The type of ancillary transmission that the decoder 59 detects may be one that conditions the decoder 59 to extract further information concerning the ancillary transmission from the initial portions of the reserved portions of DFS signals separated by the sync extraction circuitry 58. The decoder 59 is connected for supplying such further information to the decoding control unit 60. Most of the connections of the decoding control unit 60 to the elements involved in decoding the SCCC are not explicitly shown in FIGS. 12A, 12B and 12C, so as to keep those figures from being too cluttered to be understood readily.

FIG. 12A shows a 12-phase trellis decoder 61 connected for receiving the response of the equalization filter 57. The 12-phase trellis decoder 61 is connected for supplying trellis-decoding results to a PCCC gate 62 connected for extracting the PCCC'd signaling within each Group and reproducing the PCCC'd signaling for application as an input signal to a decoder 63 for quarter-rate PCCC. The decoder 63 reproduces randomized signaling decoded (possibly with some errors) from the quarter-rate PCCC supplied thereto and is connected for supplying that randomized signaling as an input signal to a signaling de-randomizer 64. The signaling de-randomizer 64 is connected for supplying de-randomized signaling to an 8-bit byte former 65. A TPC code gate 66 is connected for extracting bytes of TPC code from bytes of the de-randomized signaling supplied by the byte former 65 and supplying those extracted bytes of TPC code as an input signal to a decoder 67 for (18, 10) Reed-Solomon coding. The decoder 67 recovers TPC information and is connected for supplying the TPC information to the decoding control unit 60 and to other elements of the receiver apparatus. Because A/153 specifies current TPC information being transmitted in every M/H Group as urged by the inventor, the decoding control unit 60 is able to respond to the TPC information to control selection of the type of outer convolutional decoding to be used on SCCC portions of the M/H Group.

FIG. 12A shows an FIC code gate 68 connected for extracting byte-interleaved FIC code bytes from the bytes of de-randomized signaling supplied by the byte former 65 and reproducing those extracted bytes for application as an input signal to a block de-interleaver 69. The block de-interleaver 69 is of a matrix type and complements the block interleaving done by the block interleaver 50 described supra with reference to FIG. 11. In this specification, (over)writing refers both to memory writing procedures in which storage locations are empty of content when written by new content and to memory writing procedures in which storage locations have their original contents overwritten by new content. The block de-interleaver 69 is essentially a byte-organized random access memory (RAM) with byte-storage locations arrayed in rows and columns to be (over)written and read in accordance with addressing and read/write control signals supplied from a block de-interleaver memory read/write controller 70. The byte-storage locations are arrayed in 51-byte rows for being (over)written by RS coded FIC data from respective Groups within each M/H sub-Frame. The memory read/write controller 70 needs to know the total number of Groups, TNoG, within each M/H sub-Frame in order to know the number of these 51-byte rows. The memory read/write controller 70 uses this knowledge to control the addressing of successive columns of TNoG byte-storage locations when writing to them. An extractor 71 is connected to extract TNoG for the current M/H sub-Frame from the response of the decoder 67 of the (18, 10) RS coded TPC data. The value of TNoG for a current M/H sub-Frame appears 5 NoG times in the TPC data recovered by the decoder 67 from the previous M/H Frame. The extractor 71 selects from the TPC data those bit sequences descriptive of TNoG estimates and decides the value of TNoG based on the majority of concurring estimates. The extractor 71 is connected to supply that value of TNoG, if available, to the memory read/write controller 70. When there has just been a change in channel selection, TNoG received during the previous M/H Frame may not be available. In accordance with an aspect of the inventive concept, preferably such case is accommodated by the extractor 71 being constructed with capability for extracting TNoG from the current total_number_of_Groups portion of the TPC signal.

After the final Group of each M/H subFrame concludes, the read/write controller 70 generates read addresses for reading rows of 35×TNoG bytes from the RAM in the block de-interleaver 69. The reading is completed before the initial Group of the next M/H sub-Frame begins and the contents of the RAM in the block de-interleaver 69 will be overwritten. The block de-interleaver 69 is connected for supplying its de-interleaved FIC code response as an input signal to a decoder 72 for (51, 37) Reed-Solomon coding. The decoder 72 recovers FIC information and is connected for supplying that FIC information to be written into addressed temporary-storage locations within a random-address memory (RAM) 73. The decoder 72 generates a Signaling Error Indication (SEI) bit whenever a (51, 37) RS codeword is found to contain byte error(s) that cannot be corrected. An SEI bit is likely to be generated if there is a momentary fade in received RF signal strength, for example.

The RAM 73 provides temporary storage for the bytes of the FIC information for one entire M/H Frame, plus two-bit extensions of those bytes. One of these extension bits is the SEI bit from the decoder 72 for (51, 37) R-S coding. A further one of these extension bits is used for signaling whether or not byte-storage locations in the RAM 73 contain FIC information content. When the M/H receiver is initially powered up, or when there is a change in selection of the major reception channel, the contents of the RAM 73 are erased in bulk. This erasure sets the further one-bit extensions to signal the erasure—e.g., the further one-bit extensions are all set to ZERO.

A write address generator 74 is connected for supplying write addressing to the RAM 73 such that FIC information is stored at appropriate locations within the M/H Frame, even if that FIC information begins to be furnished part way through the M/H Frame. An extractor 75 extracts the current M/H sub-Frame number from the response of the decoder 67 of the (18, 10) RS coded TPC data and supplies that M/H sub-Frame number to the write address generator 74. The current M/H sub-Frame number appears NoG times in the TPC data recovered by the decoder 67 from the current M/H sub-Frame. The extractor 75 selects from the TPC data those bit sequences descriptive of current M/H sub-Frame number estimates and decides the value of current M/H sub-Frame number based on the majority of concurring estimates. An extractor 76 is connected for extracting the current FIC-Segment number from the header of the FIC Segment being currently written into the RAM 73 and supplying that current FIC-Segment number to the write address generator 74. The write address generator 74 combines the current M/H sub-Frame number supplied from the extractor 75 with the current FIC-Segment number supplied from the extractor 76 to generate each write address that the write address generator 74 supplies to the RAM 73.

The write addresses that the write address generator 74 supplies to the RAM 73 are accompanied by write control signals, which write control signals are also supplied as the further extension bits of the extended bytes supplied for being written into storage locations of the RAM 73. The value of these write control signals is the opposite—e.g., ONE—of the value indicating that a byte-storage location is empty of content. Accordingly, the further extension bits temporarily stored in respective extended-byte-storage locations of the RAM 73 are indicative of whether or not those locations store bytes of FIC information.

A read address generator 77 is connected for supplying read addressing to the RAM 73 when the RAM 73 reads its stored FIC information to provide input signal for an FIC-Chunk code combiner 78 at the conclusion of each M/H Frame interval. The FIC-Chunk code combiner 78 is connected for supplying processed FIC Chunks to the decoding control unit 60. (FIG. 12C shows processed FIC Chunks from the FIC-Chunk code combiner 78 being supplied to SMT-MH processing unit 104 to be integrated with SMT-MH information during the generation of Service Map Data written into memory 105 for temporary storage therewithin.)

The decoder 72 for (51, 37) RS coding is connected for supplying FIC-Segments to a read-address-ranges extractor 79 for extracting information from their headers concerning the location of FIC Chunks within each M/H Frame. This information is temporarily stored in memory within the read-address-ranges extractor 79 to be used for controlling the operation of the read address generator 77 so each FIC Chunk can be read from the RAM 73 shortly after its having been stored therein. If the M/H Frame contains five FIC Chunks, each contained entirely within a single M/H sub-Frame, the FIC_Segment_type indication in the header of the FIC-Segment payload being currently written into the RAM 73 is 11. Responsive to this 11 indication, the read address generator 77 arranges for the payload of each of these five FIC Chunks to be read to the FIC-Chunk code combiner 78 immediately following the conclusion of the M/H sub-Frame it is received within.

The read address generator 77 temporarily stores the FIC_Segment_number of each FIC Segment including an FIC_Segment_type indication '10' in its header that that FIC Segment includes the very beginning of an extended FIC Chunk. The read addressing of the RAM 73 will proceed from that temporarily stored FIC_Segment_number when the extended FIC Chunk is read from the RAM 73 to the FIC-Chunk code combiner 78.

The read address generator 77 also temporarily stores the FIC_Segment_number of each FIC Segment including an FIC_Segment_type indication '01' in its header that that FIC Segment includes the ultimate conclusion of an FIC Chunk. The FIC_Segment_type indication that that FIC Segment includes the ultimate conclusion of an FIC Chunk signals when reading of the FIC Chunk from the RAM 73 to the FIC-Chunk code combiner 78 can begin. The read addressing of the RAM 73 proceeds from the temporarily stored FIC_Segment_number concerning the very beginning of the FIC Chunk to the temporarily stored FIC_Segment_number concerning the ultimate conclusion of the FIC Chunk.

FIG. 12B shows a further portion of the FIG. 12 receiver apparatus that includes a further 12-phase trellis decoder 80 connected for receiving the response of the equalization filter 57. The trellis decoder 80 is further connected as a soft-input, soft-output (SISO) inner decoder in a turbo decoding loop that also includes a SISO outer decoder within a bank 81 of SISO outer decoders. The decoder 80 for a 12-phase trellis code, the selected one of the bank 81 of SISO decoders for outer convolutional codes connect together with elements 82-86 in an SCCC decoder apparatus for responding to digital samples of a baseband signal that comprise SCCC descriptive of IP data packets. This SCCC decoder apparatus reproduces segments of data-randomized IP data packets in its response, some of which are data-randomized SMT-MH packets. The turbo decoding procedures carried out in this SCCC decoder apparatus often involve iterations of decoding the inner convolutional code and the outer convolutional code of the SCCC. The SISO trellis decoder 80 is used for decoding the inner convolutional code of the SCCC, and a selected one of the bank 81 of SISO outer decoders is used for decoding the outer convolutional code of the SCCC. The bank 81 of SISO outer decoders comprises decoders for one-half-rate, one-third-rate and one-quarter-rate outer convolutional coding. Only a selected one of these decoders is conditioned for current decoding by a control signal received from the decoding control unit 60 via a connection not explicitly shown in FIGS. 12A and 12B. The trellis decoder 80 includes memory for storing the response from the equalization filter 57, for updating by the extrinsic information. The decoding operations of the decoders 80 and 81 are staggered in time. The decoder 80 and the decoders in the bank 81 of them may be of types that use the soft-output Viterbi algorithm (SOVA) for evaluating code trellises, but types that use the logarithmic maximum a posteriori algorithm (log-MAP) for such evaluations are currently preferred. In any case, the decoder 80 and the decoders in the bank 81 of them each comprise a respective memory for temporary storage of the soft-decisions that they respectively generate.

An input/output unit 82 is used for accessing selected portions of the memory for temporary storage of soft-decisions in the trellis decoder 80 that contain soft-decisions related to the interleaved outer convolutional coding of the SCCC. This input/output unit 82 includes a memory address generator, the operation of which is controlled by the decoding control unit circuitry 60. Responsive to control by the decoding control unit 60, the input/output unit 82 reads soft-decisions related to the reproduced interleaved outer convolutional coding of the SCCC to the input port of a 2-bit-symbol (or bit) de-interleaver 83. These soft-decisions are also supplied to a first input port of a processor 84 for determining interleaved extrinsic information to be fed back for turbo decoding procedures. These soft-decisions are temporarily stored in the processor 84 for later comparison with the response of a 2-bit-symbol (or bit) interleaver 85 supplied to a second input port of the processor 84.

The de-interleaver 83 is connected for de-interleaving the interleaved outer convolutional coding of the SCCC and supplying soft-decisions related to the de-interleaved outer convolutional coding to the selected one of the bank 81 of SISO outer decoders. The selected one of the bank 81 of SISO outer decoders is connected for supplying soft decisions concerning its decoding results to the 2-bit-symbol (or bit) interleaver 85, which is complementary to the de-interleaver 83. The processor 84 compares the interleaved decoding results from the interleaver 85 with the temporarily stored trellis decoder 80 decoding result to generate extrinsic information. This extrinsic information is fed back through the input/output unit 82 to update the trellis-coded response from the equalization filter 57, which is temporarily stored in selected portions of the memory in the trellis decoder 80 that hold the Group or portion of a Group that is being turbo decoded.

FIG. 12B shows the bank 81 of SISO outer decoders connected for supplying soft decisions to a hard-decision unit 86 that generates hard decisions responsive to the soft decisions supplied thereto. The hard-decision unit 86 is connected for supplying its response to a byte former 87 that forms the bits from the hard-decision unit 86 into eight-bit bytes. Rows of these 8-bit bytes that will be used to reproduce RS Frames are supplied to a decoder 88 for cyclic-redundancy-check (CRC) coding and to a byte-organized first-in, first-out memory 89. At the conclusion of each row of 8-bit bytes the decoder 88 generates a bit indicating whether or not it found the row probably to contain error. The FIFO memory 89 reproduces each row of 8-bit bytes it receives as delayed by a row interval and supplies those 8-bit bytes to a nine-bit-extended-byte former 90. The extended-byte former 90 appends to each of the 8-bit bytes the bit indicating whether or not the decoder 88 found the row probably to contain error.

The resulting 9-bit extended bytes are written row by row into respective rows of extended-byte storage locations in a random-access memory (RAM) 91 operated to perform the matrix-type block de-interleaving procedure that is a first step of the TRS decoding routine. The RAM 91 is subsequently read one column of 9-bit extended bytes at a time to a selected one of a bank 92 of decoders for (235, 187), (223, 187) and (211, 187) Reed-Solomon codes, respectively. The appropriate decoder is selected by the decoding control unit 60 responsive to information extracted from the TPC. The extension bits accompanying the eight-bit bytes of the TRS code are used to help locate byte errors for the TRS code. This permits the use of an error-correction algorithm capable of correcting more byte errors in Reed-Solomon codewords than an algorithm that must locate byte errors as well as correct them. The eight-bit data bytes that have been corrected insofar as possible by the selected one of the RS decoders in the bank 92 are written, column by column, into respective columns of byte-storage locations of a random-access memory (RAM) 93. The RAM 93 is operated to perform the matrix-type block re-interleaving procedure for data in further steps of the TRS decoding routine. In a final step of the TRS decoding routine, the byte-storage locations in the RAM 93 are read from row by row for supplying reproduced randomized M/H data to a bypass unit 94 to be relayed to a M/H data de-randomizer 95 shown in FIG. 12C. The bypass unit 94 is connected to bypass TRS decoding for a prescribed time interval following selection of a new sub-channel for reception, supplying the data de-randomizer 95 with bytes of randomized M/H data taken directly from the response of the byte former 87.

Transversal RS coding can correct drop-outs in received signal strength of a few hundred milliseconds in duration. TRS allows the TS packets to be immediately available so long as there is no drop-out in received signal strength. The CRC checksums on the rows of bytes in the RS framestore can locate rows afflicted by drop-out of received signal strength, doubling the capability of the RS code of given word-length to correct byte errors. When the M/H system was being developed, MPEG-2 packets were used in the transport stream (TS), and the CRC checksums at the ends of rows were used to validate TS packets in the rows of bytes in the RS Frames. Internet Protocol (IP) will be the TS used in the M/H Standard rather than MPEG-2 TS. When IP is used, the CRC checksums at the ends of rows are not used to validate TS packets.

TRS coding is used primarily to benefit mobile receivers when traveling a route containing drop-outs in received signal strength. TRS coding will not provide much benefit to a stationary receiver that is in a region of low received signal strength. TRS decoding can be skipped in a receiver designed primarily for stationary use, such as a laptop computer. That is, the elements 87, 88, 89, 90, 91, 92 and 93 can be omitted in a receiver designed primarily for stationary use. The randomized data supplied from the hard-decision unit 86 are then applied directly to the M/H de-randomizer 95 as input data thereto. Omission of the elements 87, 88, 89, 90, 91, 92 and 93 eliminates the latent delay associated with these elements, which will speed acquisition time of a newly selected sub-Channel.

Referring now to FIG. 12B, the M/H data de-randomizer 95 de-randomizes the contents of the data bytes by exclusive-ORing them with the prescribed PRBS. The M/H data de-randomizer 95 is connected for supplying the de-randomized bytes of M/H data and their accompanying extension bits to an IP-packet parsing unit 96 for parsing the data stream into internet-protocol (IP) packets. The IP-packet parsing unit 96 performs this parsing responsive to two-byte row headers respectively transmitted at the beginning of each row of IP data in the RS Frame. This row header indicates where the earliest start of an IP packet occurs within the row of IP data bytes within the RS Frame. If a short IP packet is completely contained within a row of the RS Frame, the IP-packet parsing unit 96 calculates the start of a later IP packet proceeding from the packet length information contained in the earlier IP packet within that same row of the RS Frame.

The IP-packet parsing unit 96 is connected for supplying IP packets to a decoder 97 for cyclic-redundancy-check (CRC) coding in IP packets, which are UDP/IP datagrams that use User Datagram Protocol (UDP). Each IP packet contains a two-byte, 16-bit checksum for CRC coding of that UDP/IP datagram. The decoder 97 is constructed to preface each IP packet that it reproduces with a prefix bit indicating whether or not an error has been detected in that IP packet. The decoder 97 is connected to supply these IP packets as so prefaced to a detector 98 of a "well-known" SMT-MH address and to a delay unit 99. The delay unit 99 delays the IP packets supplied to a selector 100 for sorting SMT-MH packets from other IP packets. The delay unit 99 provides delay of a part of an IP packet header interval, which delay is long enough for the detector 98 to ascertain whether or not the "well-known" SMT-MH address is detected.

If the detector 98 does not detect the "well-known" SMT-MH address in the IP packet, the detector 98 output response conditions the selector 100 to reproduce the IP packet for application to a packet sorter 101 as an input signal thereto. The packet sorter 101 sorts out those IP packets in which the preface provides no indication of CRC code error for writing to a cache memory 102 for IP packets. The prefatory prefix bit before each of the IP packets that indicates whether there is CRC code error in its respective bytes is omitted when writing the cache memory 102. The cache memory 102 temporarily stores at least those IP packets not determined to contain CRC code error for possible future reading to later stages 103 of the receiver.

If the detector 98 does detect the "well-known" SMT-MH address in the IP packet, establishing it as an SMT-MH packet, the detector 98 output response conditions the selector 100 to reproduce the SMT-MH packet for application to an SMT-MH processor 104, which has capability for generating control signals for the later stages 103 of the M/H receiver. FIG. 12B shows the SMT-MH processor 104 connected for receiving FIC information from the FIC-Chunk code combiner 78 in FIG. 12A. The SMT-MH processor 104 integrates this FIC information with information from SMT-MH packets during the generation of Service Map Data. The Service Map Data generated by the SMT-MH processor 104 is written into memory 105 for temporary storage therewithin and subsequent application to the later stages 103 of the M/H receiver. The SMT-MH processor 104 relays those SMT-MH packets that have bit prefixes that do not indicate an error in the packets to a user interface 106, which includes an Electronic Service Guide (ESG) and an apparatus for selectively displaying the ESG on the viewing screen of the M/H receiver. A user will select the M/H service that he or she desires to get, and the user interface transmits an indication of that selection to the SMT-MH processor 104. The SMT-MH processor 104 responds to this indication per FIC information from the FIC-Chunk code combiner 78 to determine the Ensembles to be decoded by the turbo decoding apparatus for SCCC. The SMT-MH processor 104 is connected for commanding the control unit 60 to control the decoding of the SCCC in selected M/H Groups, the selection of which is made according to those determinations of the Ensembles to be decoded made within the SMT-MH processor 104. U.S. patent application Ser. No. 12/555,248 filed Sep. 8, 2009 for Allen LeRoy Limberg and titled "Sub-channel Acquisition in a Digital Television Receiver Designed to Receive Mobile/Handheld Signals" provides more detailed descriptions of the operations of the portion of an M/H receiver as shown in FIG. 12C. The description with reference to FIGS. 12, 13 and 14 of that application describe operations relying on the SMT-MH tables available in A/153. That description and the drawings it refers to are incorporated herein by reference.

Figure 13:
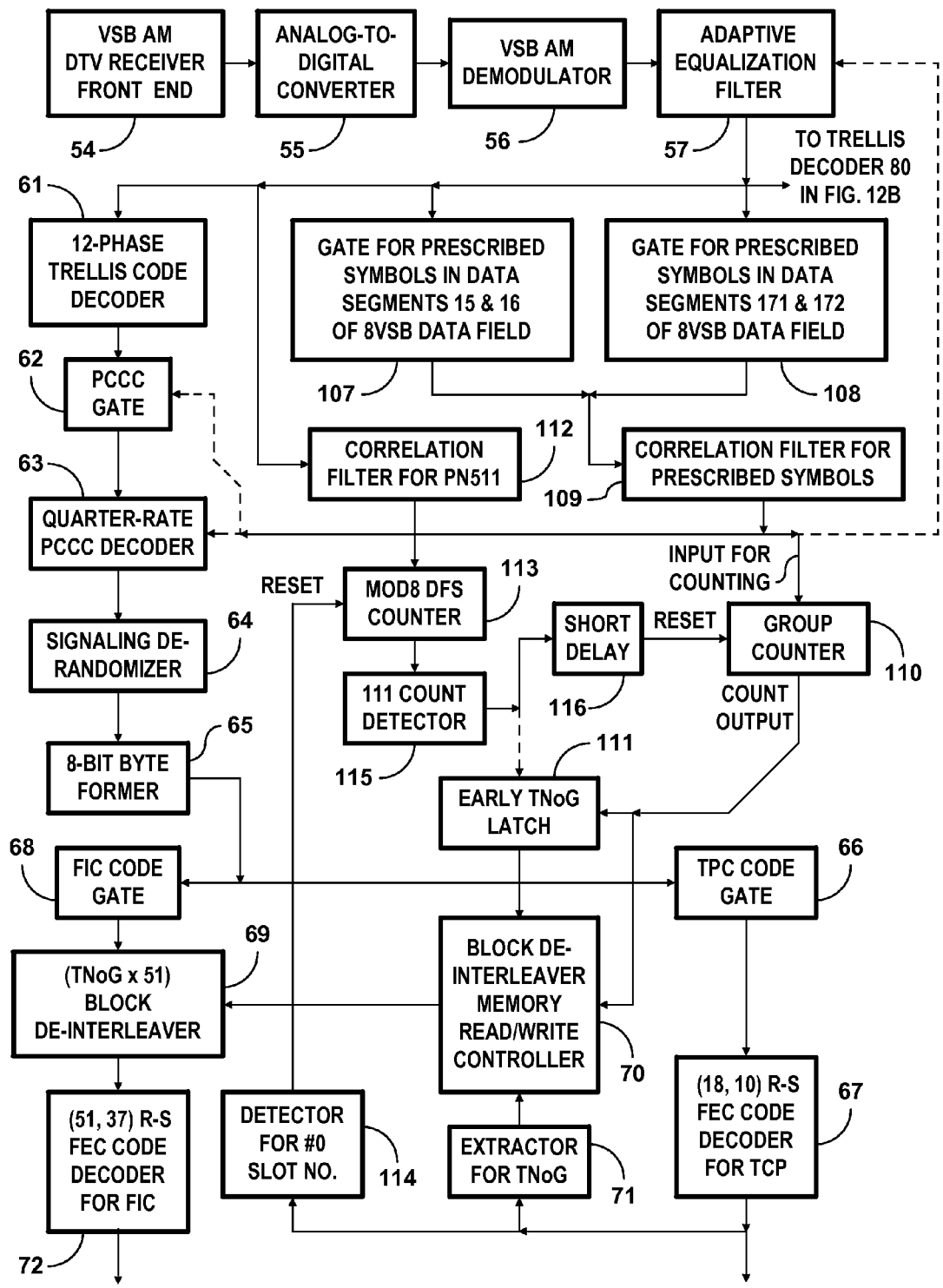
FIG. 13 is a schematic diagram of an exemplary embodiment of circuitry for determining the total number of Groups in an M/H sub-Frame by counting sequences of prescribed 8-VSB signals.

FIG. 13 shows how early TNoG information can be derived from the current M/H subFrame and supplied to the memory read/write controller 70 for directing its operations when the extractor 71 fails to supply TNoG information for the current M/H sub-Frame. The basic idea for doing this is to detect and count the sequences of prescribed symbols that precede the TPC and FIC signaling in each Group within an M/H sub-Frame. FIG. 12 shows the adaptive equalization filter 57 connected for supplying its response, equalized baseband 8-VSB DTV signals, as respective input signals for gates 107 and 108. In its response to this baseband 8-VSB DTV signal, the gate 107 selectively reproduces symbols in the portions of the 15th and 16th data segments of each 8-VSB data field that may have prescribed values. In its response to this baseband 8-VSB DTV signal, the gate 108 selectively reproduces symbols in the portions of the 171st and 172nd data segments of each 8-VSB data field that may have prescribed values. These responses are applied in time-division multiplex as the input signal of a correlation filter 109 for the sequence of prescribed symbols that should precede the TPC and FIC signaling in each Group within an M/H sub-Frame. The correlation filter 109 determines when that sequence of prescribed symbols occurs, furnishing a ONE response indicative of such occurrence rather than its usual ZERO response. The correlation filter 109 is connected for supplying in its response to a Group counter 110 for counting the ONEs in that response, thereby indirectly counting the occurrences of Groups in the baseband 8-VSB signal. The Group counter 110 is reset to zero count at the beginning of each M/H Frame. The Group counter 110 is connected to supply its count output as a latch input signal to a latch 111, which is operated to latch the count output at the conclusion of each M/H Frame and to hold it in its output response as early TNoG. The latch 111 is connected to supply the latched count output as early TNoG to the block de-interleaver memory read/write controller 70. Alternatively, the Group counter 110 can count the number of ONEs in the response from the correlation filter 109 that occur in an M/H sub-Frame interval, after which the count is multiplied by five to determine TNoG.

The generation of the signals for resetting the Group counter 110 and controlling the latch 111 will be described next. The adaptive equalization filter 57 is connected for supplying its response, an equalized baseband 8-VSB DTV signal, as an input signal to a correlation filter 112 for a PN511 sequence included in the data field synchronization (DFS) signal of each 8-VSB data field. The correlation filter 112 determines, when a PN511 sequence occurs, furnishing a ONE response indicative of such occurrence rather than its usual ZERO response. The correlation filter 112 is connected for supplying in its response to a modulo-eight DFS counter 113 for counting the ONEs in that response. A detector 114 for the Slot_number being '0000' in the response of the decoder 67 for TPC (18, 10) RS FEC coding furnishing a ONE response indicative of such occurrence, rather than its usual ZERO response, providing an indication of when the M/H Frame has begun. The detector 114 is connected for supplying its response as a reset signal for the DFS counter 113, each ONE in the detector 114 response resetting the DFS counter 113 modulo-eight count output to '000'. The DFS counter 113 is connected to supply its count output to a 111 count detector 115 that generates a ZERO response to all values of that count output except '111'. The 111 count detector 115 responds to the count output being '111' to generate a ONE response that indicates eight 8-VSB data fields have been completed since the detector 114 detected the Slot_number being '0000'. The decoder 66 for TPC signal is likely to generate a '0000' Slot_number in the 17th data segment of the new 8-VSB data field. The 111 count detector 115 is connected to supply its response to the latch 111 as a control signal. The latch 111 responds to a ONE response from the 111 count detector 115 to sample the then current count from the Group counter 110 and hold that count in the latch 111 response throughout the ensuing M/H sub-Frame, to be used as early TNoG. The 111 count detector 115 response is subjected to a short delay in a delay unit 116, and the delayed 111 count detector 115 response from the delay unit 116 is applied to the Group counter 110 as a reset signal. The count output from the Group counter 110 is reset to 0000 responsive to a ONE in the delayed 111 count detector 115 response. The delay provided by the delay unit 116 is long enough for the latch 111 to store the Group count at the conclusion of the M/H sub-Frame before the Group counter 110 is reset. However, this delay is short enough that the Group counter 110 is reset before the correlation filter 109 might respond with a ONE to a sequence of prescribed symbols in the 15th and 16th segments of the new 8-VSB data field.

The selection of the symbols in the portions of the 15th and 16th data segments of each 8-VSB data field that the gate 107 selectively reproduces is controlled by a decoder responding to a prescribed range of count from a symbol counter in the M/H receiver. The selection of the symbols in the portions of the 171st and 172nd data segments of each 8-VSB data field that the gate 108 selectively reproduces is controlled by decoder responding to a prescribed range of count from the same symbol counter. The symbol counter for counting 8-VSB symbols and the decoders for controlling the gates 107 and 108 are not explicitly shown in FIG. 13. The symbol counter can count 8-VSB symbols in each successive 8-VSB data field interval, in which case it is convenient to synchronize the symbol counter with a response from the correlation filter 112 that determines when a PN511 sequence occurs in a DFS signal.

FIG. 13 depicts the response of the correlation filter 109 to the sequence of prescribed symbols that should precede the TPC and FIC signaling in each Group within an M/H sub-Frame being utilized for other things besides providing a count input signal to the Group counter 110. The response of the correlation filter 109 indicating that an M/H Group is present in a Slot is used as an enabling signal for other operations in the M/H receiver. The operations of the PCCC gate 62 and the quarter-rate PCCC decoder 63 occur at times determined by the symbol count from the symbol counter referred to in the previous paragraph. Such operations are conditional, however, taking place only when the correlation filter 109 indicates that an M/H Group is currently being received in a Slot. FIGS. 12A and 13 show the PCCC gate 62 and the PCCC decoder 63 as cascaded elements, to facilitate understanding M/H receiver operations. In alternative implementations, the PCCC decoder 63 receives its input signal directly from the trellis decoder 61, and the PCCC gating function is provided by selectively energizing the PCCC decoder 63.

The adaptive equalization filter 57 is connected to receive the response of the correlation filter 109 indicating that an M/H Group is present in a Slot. Such indication enables the adaptive equalization filter 57 to compare the symbols of training signals received within M/H Groups with ideal symbols stored within a read-only memory to provide a determination of equalization errors to be used in adaptation of weighting coefficients of the filter 57. The adaptive equalization filter 57 responds to the indication that an M/H Group is present in a Slot to substitute this determination for a less dependable determination of the equalization errors by blind-equalization techniques.

Figure 14:
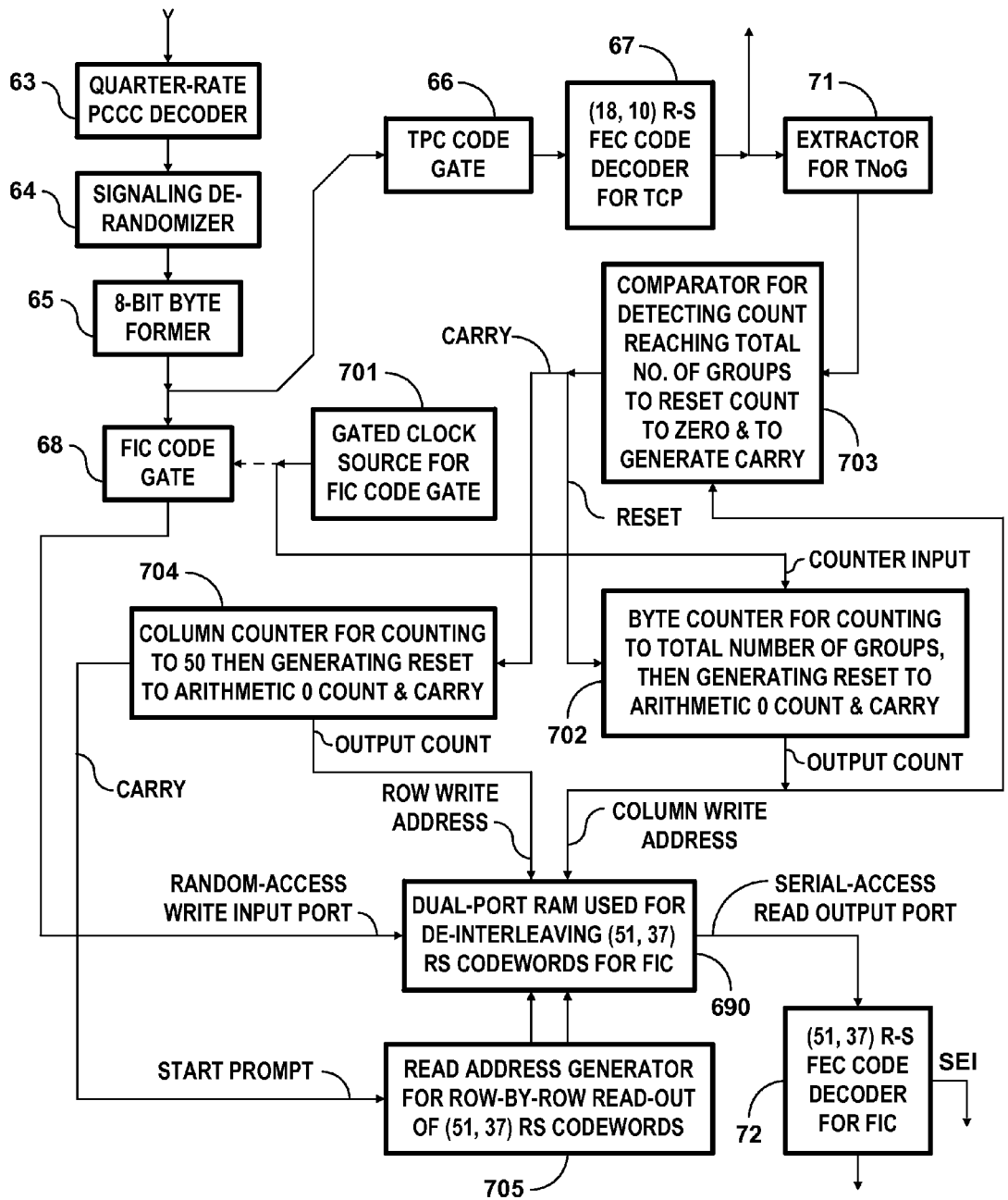
FIG. 14 is a more detailed schematic diagram of an exemplary embodiment of a portion of the FIG. 12A receiver apparatus that is associated with de-interleaving the interleaved Reed-Solomon encoded FIC.

FIG. 14 shows in greater detail a portion of the FIG. 12A receiver apparatus that is associated with de-interleaving the interleaved RS-encoded Fast Information Channel. FIG. 14 shows a dual-port random-access memory (RAM) 690 that is the core of the FIC de-interleaver 69 in FIG. 12A. Byte-storage locations in the RAM 690 are written column by column and subsequently read row by row to perform block de-interleaving of matrix type. The random-access port of the dual-port RAM 690 is connected for receiving the FIC code gate 68 response as a write-input signal. The serial-access read-output port of the dual-port RAM 690 is connected for supplying de-interleaved RS codewords as a read-output signal to the decoder 72 for (51, 37) RS FEC coding.

The bytes in the FIC code gate 68 response are clocked from a source 701 of a gated clocking signal. A counter 702 is connected for responding to this gated clocking signal to count the bytes of interleaved RS codewords coding FIC data to generate the write addresses for each successive one of the column byte-storage locations in the RAM 690. A comparator 703 is connected for comparing the output count from the counter 702 to the value of TNoG extracted from the TPC by the extractor 71. The response of the comparator 703 is supplied to the reset input connection of the counter 702 and to the carry input connection of a counter 704. The comparator 703 responds with a ZERO so long as the counter 702 output count is smaller than the value of TNoG, and responds with a ONE to the output count from the counter 702 reaching the value of TNoG. This ONE resets the output count from the counter 702 to arithmetic zero, and advances the output count from the counter 704 to select the next column of byte-storage locations in the RAM 690 for being written to.

When all 51 of the columns of byte-storage locations in the RAM 690 have been written to, the ONE response from the comparator 703 supplied as carry to the counter 704 is counted by the counter 704 to cause a roll-over of its output count to arithmetic zero. This is accompanied by the counter 704 generating an output carry supplied to a read address generator 705 to prompt it to start generating read addressing for the dual-port RAM 690. The read address generator 705 supplies the dual-port RAM 690 with successive row addresses for the (51, 37) RS FEC codewords stored in respective ones of the rows of byte-storage locations in the RAM 690. The read address generator 705 also supplies the clocking to read the codewords from those rows of byte-storage locations to the decoder 72 for the (51, 37) RS FEC codewords. Alternative arrangements using a RAM with a single input/output port, rather than the RAM being dual-ported, are easily designed by one of ordinary skill in the art of designing digital circuitry.

Ideally, the memory 690 in the FIC de-interleaver 69 is written to during the entirety of a complete M/H sub-Frame. Sometimes, just after initial selection of the radio-frequency (RF) Channel to be received or change in such selection, only the concluding portion of an M/H sub-Frame is received. This leaves unwritten byte-storage locations in the memory 690 if an erasure of the memory contents accompanies the event. If there is no such erasure, byte-storage locations may contain old contents not over-written during the partially received M/H sub-Frame. When the decoder 72 for (51, 37) RS FEC coding is read to from the partially (over)written memory 690, the decoder 72 will find most of the supposed (51, 37) RS FEC codewords to contain uncorrected byte errors if too little of the partial M/H sub-Frame was received. The loss of a single group may be withstood by the (51, 37) R-S FEC coding, but the loss of two groups cannot be withstood. As a practical matter, then, FIC usually cannot be decoded until a complete M/H sub-Frame has been received.

Figure 15:
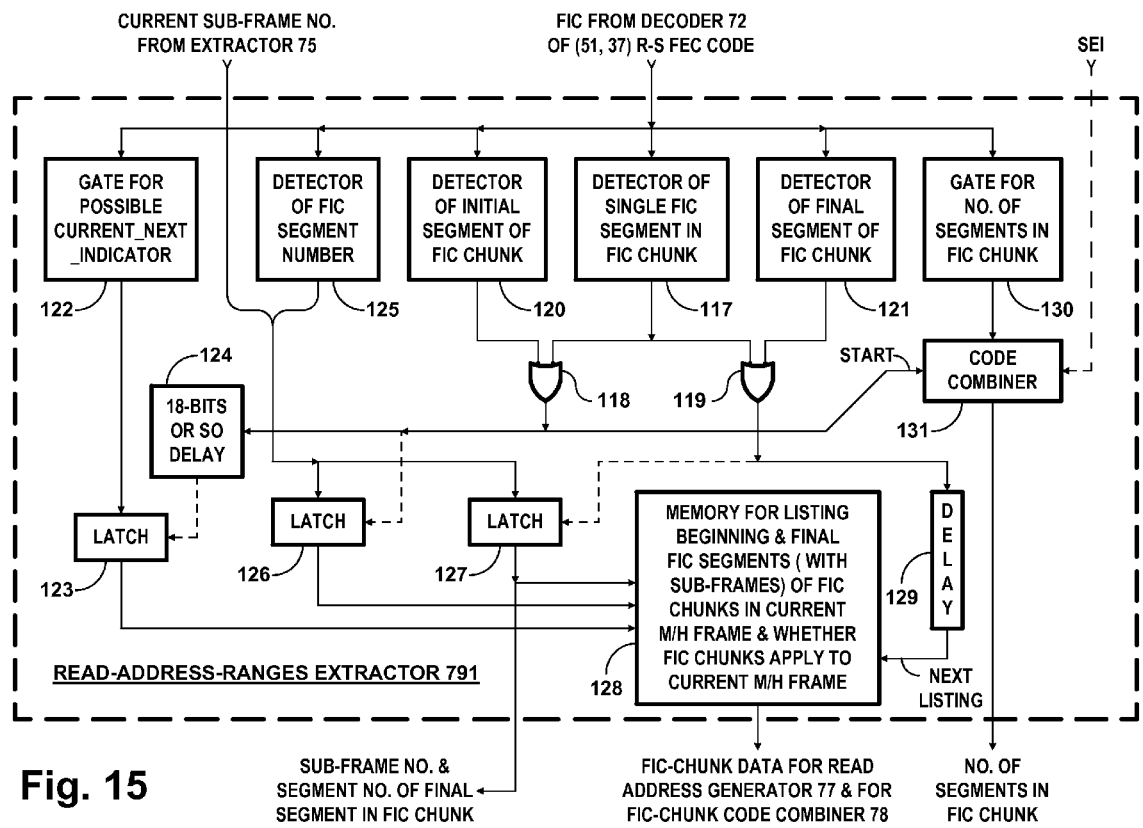
FIGS. 15, 16, 17 and 18 are schematic diagrams showing in more detail alternative exemplary embodiments of read-address-range extractor used for extracting information concerning extended-length FIC-Chunks from the decoded FIC in the FIG. 12A portion of M/H receiver apparatus, according to FIG. 19 is a schematic diagram of novel circuitry for more rapidly recovering extended-length FIC Chunks, according to an exemplary embodiment of an aspect of the inventive concept.

FIG. 15 shows in more detail one exemplary embodiment 791 of the read-address-ranges extractor 79 used in the FIG. 12A M/H receiver apparatus for extracting information concerning extended-length FIC Chunks from the decoded Fast Information Channel (FIC). The embodiment 791 of the read-address-ranges extractor 79 depends on the bit syntax for FIC being as shown in FIGS. 6, 7 and 8. The decoder 72 for (51, 37) RS FEC coding is connected for supplying an FIC input signal to a detector 117 that responds to the initial two bits of the FIC Segment header specifying the FIC_Segment_type being "11" to supply a ONE response and that otherwise supplies a ZERO response. The ONE response to the FIC_Segment_type being "11" signals that each FIC Chunk in the current M/H Frame consists of just a single FIC Segment, which is both the beginning FIC Segment and the concluding FIC Segment of the FIC Chunk. The detector 117 is connected for applying its response to the first input ports of OR gates 118 and 119.

The decoder 72 (51, 37) for RS FEC coding is connected for supplying an FIC input signal to a detector 120 that responds to the initial two bits of the FIC Segment header specifying the FIC_Segment_type being "10" to supply a ONE response and that otherwise supplies a ZERO response. The ONE response to the FIC_Segment_type being "10" signals that the currently decoded FIC Segment is the just beginning FIC Segment of an FIC Chunk. The detector 120 is connected for applying its response to the second input port of OR gate 118. The response of the OR gate 118 is a ONE if the currently decoded FIC Segment is the beginning FIC Segment of an FIC Chunk, whether or not that FIC Segment is also the concluding FIC Segment of the same FIC Chunk. The response of the OR gate 118 is a ZERO if the currently decoded FIC Segment is not the beginning FIC Segment of an FIC Chunk.

The decoder 72 for (51, 37) for RS FEC coding is connected for supplying an FIC input signal to a detector 121 that responds to the initial two bits of the FIC Segment header specifying the FIC_Segment_type being "01" to supply a ONE response and that otherwise supplies a ZERO response. The ONE response to the FIC_Segment_type being "01" signals that the currently decoded FIC Segment is just the concluding FIC Segment of an FIC Chunk. The detector 121 is connected for applying its response to the second input port of OR gate 119. The response of the OR gate 119 is a ONE if the currently decoded FIC Segment is the concluding FIC Segment of an FIC Chunk, whether or not that FIC Segment is also the beginning FIC Segment of the same FIC Chunk. The response of the OR gate 119 is a ZERO if the currently decoded FIC Segment is not the concluding FIC Segment of an FIC Chunk.

The decoder 72 for (51, 37) RS FEC coding is connected for supplying an FIC input signal to a gate 122 for reproducing the final bits of the third byte of the FIC Segment which bits will be the current_next_indicator of an FIC-Chunk header provided that the currently received FIC Segment contains the beginning of the FIC Chunk. The gate 122 is connected for supplying the reproduced final bits of the third byte of the FIC Segment to the input port of a latch 123. A delay unit 124 is connected for generating a delayed response to the momentary ONE that the OR gate 118 supplies responsive to detecting the initial segment of an FIC Chunk. The delay unit 124 is connected for applying this delayed response to the latch 123 as a control signal. This control signal conditions the latch 123 to temporarily store the current_next_indicator that occurs some 18 bits later than the initial two bits of the FIC-Segment header signal the imminent beginning of the FIC Chunk. The latch 126 reproduces that temporarily stored current_next_indicator at its output port.

The decoder 72 for (51, 37) RS FEC coding is connected for supplying an FIC input signal to a detector 125 that responds to the FIC_Segment_number appearing in the third through sixth bits of the FIC-Segment header. The FIC_Segment_number augments the current sub-Frame_number extracted from the first through third bits TPC signal by the extractor 74 shown in FIG. 12A in the complete current FIC-Segment address applied as respective input signals to the input ports of latches 126 and 127. The momentary ONE that the OR gate 118 supplies responsive to detecting the initial segment of an FIC Chunk conditions the latch 126 to temporarily store the complete current FIC-Segment address of that initial segment of the FIC Chunk. The latch 126 reproduces that temporarily stored complete current FIC-Segment address at its output port. The momentary ONE that the OR gate 119 supplies responsive to detecting the final segment of an FIC Chunk conditions the latch 127 to temporarily store the complete current FIC-Segment address of that final segment of the FIC Chunk. The latch 127 reproduces that temporarily stored FIC-Segment address at its output port.

A memory 128 is operated for listing the full addresses including M/H sub-Frame numbers of the beginning and concluding FIC segments of each successive FIC Chunk in the current M/H Frame, together with indications of whether those FIC segments are applicable to the current M/H Frame as well as the next one. The output port of the latch 123 is connected for writing the temporarily stored current_next_indicator to the memory 128. The output port of the latch 126 is connected for writing the temporarily stored FIC-Segment addresses of initial segments of FIC Chunks to the memory 128. The output port of the latch 127 is connected for writing the temporarily stored FIC-Segment addresses of final segments of FIC Chunks to the memory 128. A delay unit 129 is connected for generating a delayed response to the momentary ONE that the OR gate 119 supplies responsive to detecting the final segment of an FIC Chunk. The delay unit 129 supplies the delayed ONE, possibly stretching its duration, to be applied to the memory 128 as a NEXT LISTING command. This NEXT LISTING command is delayed sufficiently so that the latch 127 has time to store and reproduce the updated FIC-Segment address of the final segment of the concluded FIC Chunk before the memory 128 is written into from the latches 123, 126 and 127. After the memory 128 is written responsive to the NEXT LISTING command, the internal addressing within the memory advances one step forward in the listing address in a delayed response to the NEXT LISTING command. This prepares the memory 128 for the next writing into it. Shortly after the conclusion of each M/H sub-Frame the full addresses including M/H sub-Frame numbers of the beginning and concluding FIC segments of each successive FIC Chunk as thus far listed in the memory 128 are read. These addresses are supplied to the read-address generator 77 as limits for controlling the range of read addresses generated by the generator 77. These addresses can also be used by the FIC-Chunk code combiner 78 to aid in parsing FIC Chunks.

The decoder 72 for (51, 37) RS FEC coding is connected for supplying an FIC input signal to a gate 130 for reproducing the num_Segments_in_FIC-Chunk appearing in the tenth through 16th bits of the FIC-Segment header. The input port of a code combiner 131 is connected for receiving successive reproductions of the num_Segments_in_FIC-Chunk from the output port of the gate 130. Responsive to a momentary ONE received from the OR gate 118 as a start signal, the code combiner 131 begins to combine the successive reproductions of the num_Segments_in_FIC-Chunk in a polling process performed for suppressing any corruption caused by noise. The code combiner 131 is connected for receiving the SEI indications of errors in (51, 37) RS codewords. The code combiner 131 excludes from its combining procedures reproductions of the num_Segments_in_FIC-Chunk from erroneous (51, 37) RS codewords. In some designs for the code combiner 131, the number of successive reproductions of the num_Segments_in_FIC-Chunk that are combined is adjusted responsive to the number of FIC Segments in the FIC Chunk. The code combiner 131 is connected for supplying its determination of the number of FIC Segments in the FIC Chunk to later circuitry in the M/H receiver, such as the circuitry shown in FIG. 19.

Figure 16:
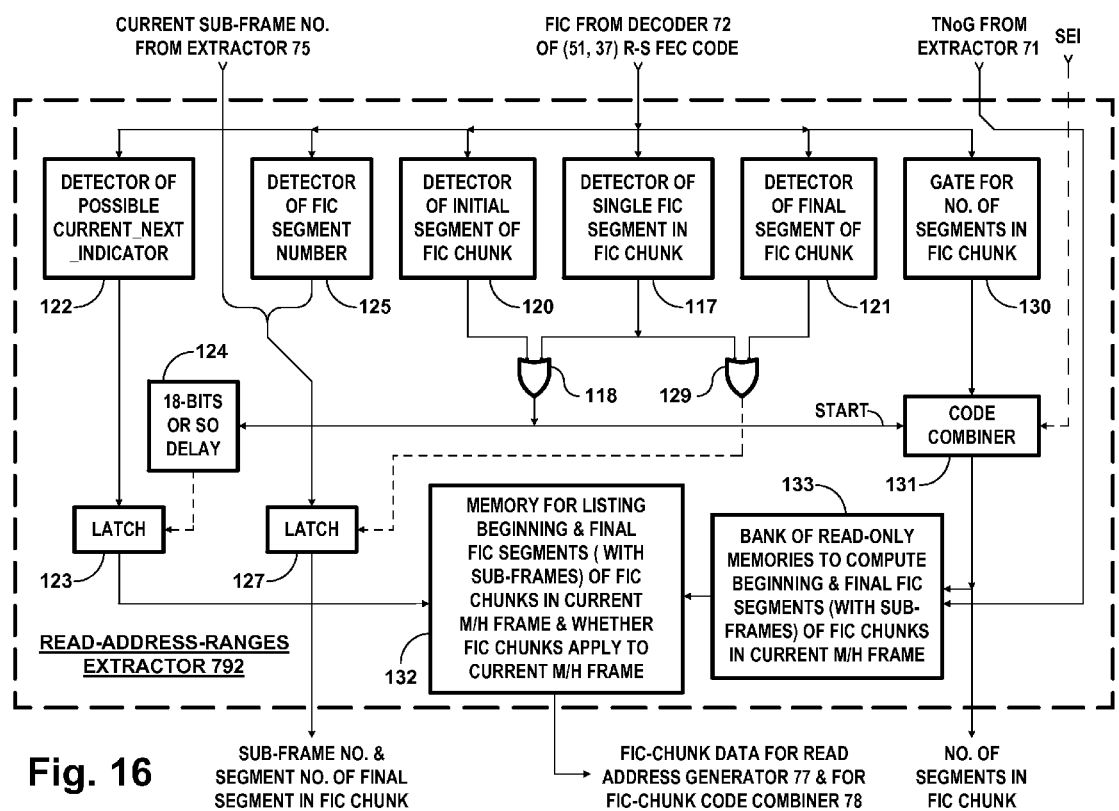

FIG. 16 shows in detail another exemplary embodiment 792 of the read-address-ranges extractor 79 used in the FIG. 12A M/H receiver apparatus for extracting information concerning extended-length FIC Chunks from the decoded Fast Information Channel. The embodiment 792 of the read-address-ranges extractor 79 depends on the bit syntax for FIC being as shown in FIGS. 6, 7 and 8. The memory 128 is replaced by a memory 132 that temporarily stores similar information as the memory 128. However, the memory 132 differs from the memory 128 in the way that it is written. A bank 133 of read-only memories (ROMs) is connected for supplying the full addresses of the beginning and final FIC Segments of each FIC Chunk to the memory 132 to be listed therein. The ROMs in the bank 133 are each addressed in part by the TNoG from the extractor 71 shown in FIG. 12A. They are each addressed in further part by the number of segments in the currently received FIC Chunk, as supplied by the code combiner 131. Since the pattern of Group allocation within an M/H sub-Frame is standardized, these two components of the addressing for the ROMs in the bank 133 can define the full addresses of the beginning and final FIC Segments of each FIC Chunk in the M/H Frame being currently received. The ROMs in the bank 133 are polled for writing these full addresses into the listing within the memory 132, rather than these full addresses being supplied from latches 126 and 127. The output port of the latch 123 is connected for writing the temporarily stored current_next_indicator to the memory 132.

Figure 17:
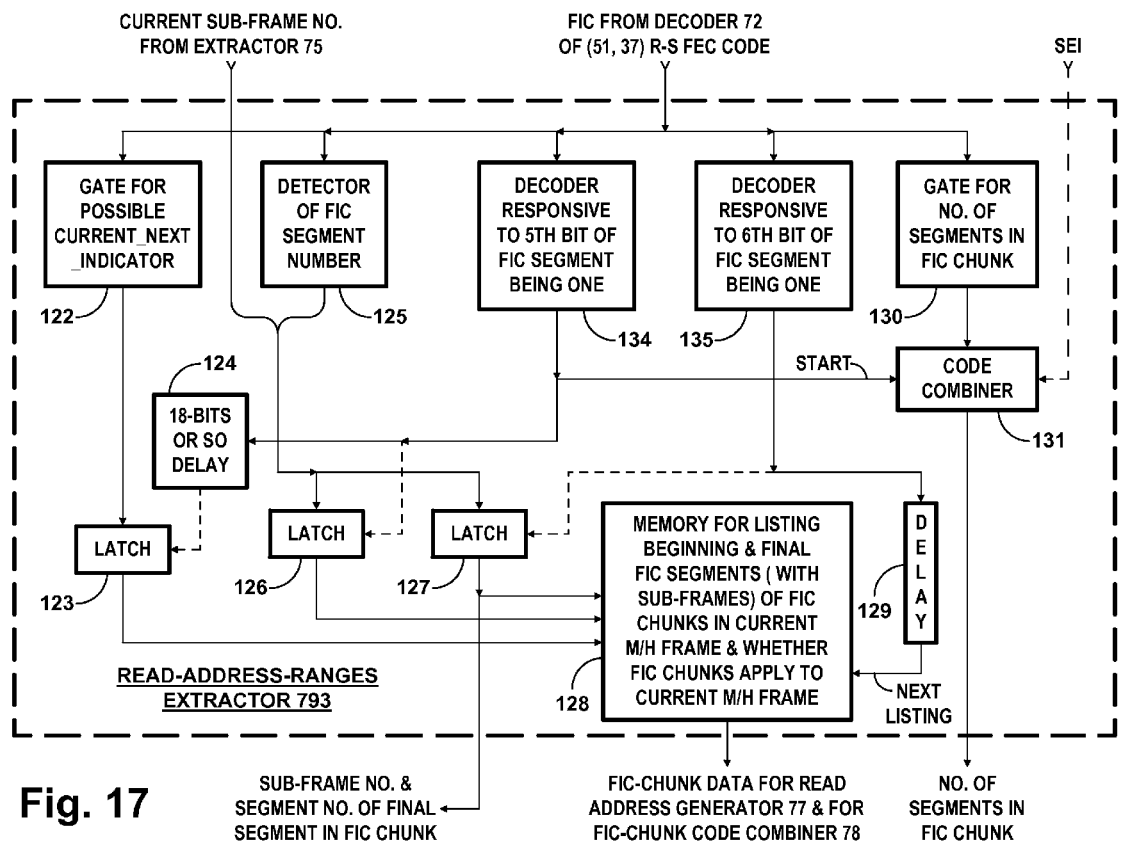

FIG. 17 shows in detail another exemplary embodiment 793 of the read-address-ranges extractor 79 used in the FIG. 12A M/H receiver apparatus for extracting information concerning extended-length FIC Chunks from the decoded Fast Information Channel. The embodiment 793 of the read-address-ranges extractor 79 depends on the bit syntax for FIC being as shown in FIGS. 6, 7 and 8. The embodiment 793 of the read-address-ranges extractor 79 differs from the embodiment 791 shown in FIG. 15 in that the detectors 117, 120 and 121 are not included, nor are the OR gates 118 and 119. The decoder 72 for (51, 37) RS FEC coding is connected for supplying an FIC input signal to a decoder 134 responsive to the first bit of the FIC Segment being a ONE and to a decoder 135 responsive to the second bit of the FIC Segment being a ONE. The decoder 134 supplants the detectors 117 and 120 and the OR gate 118, supplying a momentary ONE when the first bit of the FIC Segment header is a ONE during the initial Segment of an FIC Chunk. The decoder 134 response is delayed by the delay unit 124 for application as a control signal to the latch 123. The decoder 134 response is applied as a control signal to the latch 126. The decoder 134 is connected to supply its response to the code combiner 131 as a control signal, and the momentary ONE is used as a START signal for initiating combining procedures within the code combiner 131. The decoder 135 supplants the detectors 117 and 121 and the OR gate 119, supplying a momentary ONE when the first bit of the FIC Segment header is a ONE during the final Segment of an FIC Chunk. The decoder 135 is connected to supply its response to the latch 127 as the control signal thereof.

Figure 18:
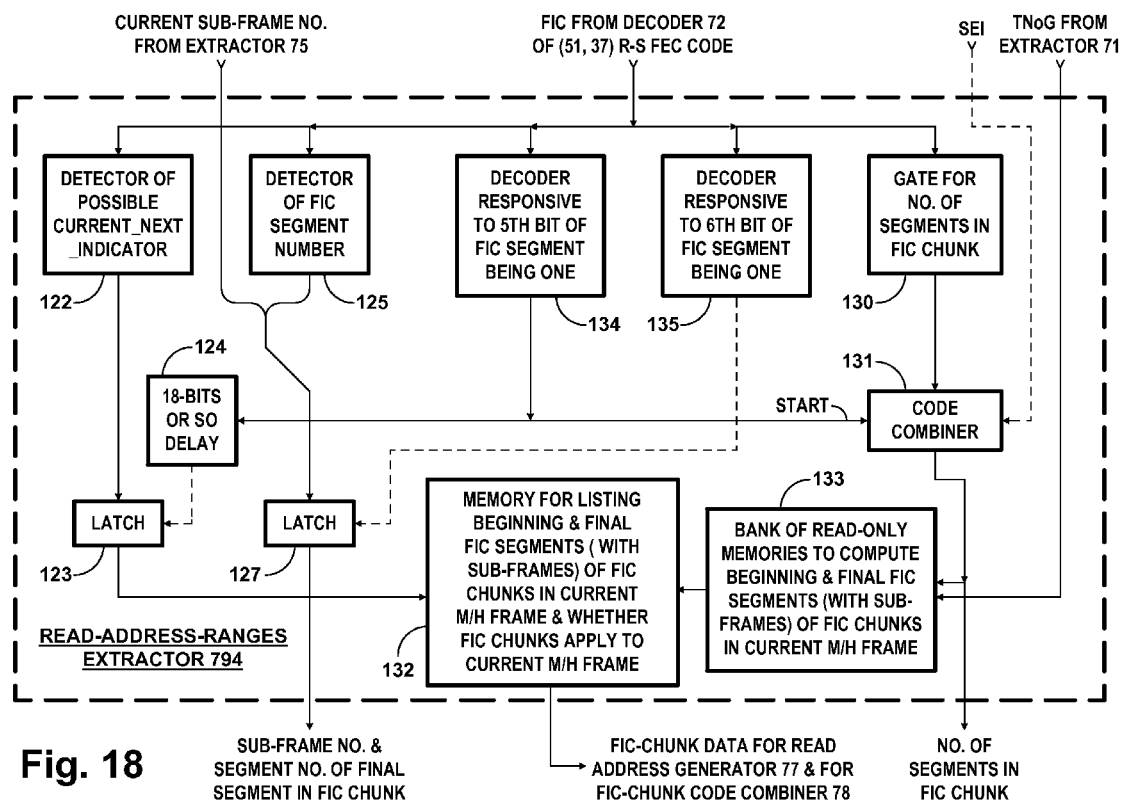

FIG. 18 shows in detail another exemplary embodiment 794 of the read-address-ranges extractor 79 used in the FIG. 12A M/H receiver apparatus for extracting information concerning extended-length FIC Chunks from the decoded Fast Information Channel. The embodiment 794 of the read-address-ranges extractor 79 depends on the bit syntax for FIC being as shown in FIGS. 6, 7 and 8. The embodiment 794 of the read-address-ranges extractor 79 differs from the embodiment 792 shown in FIG. 16 in that the detectors 117, 120 and 121 are not included, nor are the OR gates 118 and 119. The decoder 134 supplants the detectors 117 and 120 and the OR gate 118, supplying a momentary ONE when the first bit of the FIC Segment header is a ONE during the initial Segment of an FIC Chunk. The decoder 134 response is delayed by the delay unit 124 for application as a control signal to the latch 123. The decoder 134 is connected to supply its response to the code combiner 131 as a control signal, and the momentary ONE is used as a START signal for initiating combining procedures within the code combiner 131. The decoder 135 supplants the detectors 117 and 121 and the OR gate 119, supplying a momentary ONE when the first bit of the FIC Segment header is a ONE during the final Segment of an FIC Chunk. The decoder 135 is connected to supply its response to the latch 127 as the control signal thereof.

Figure 19:
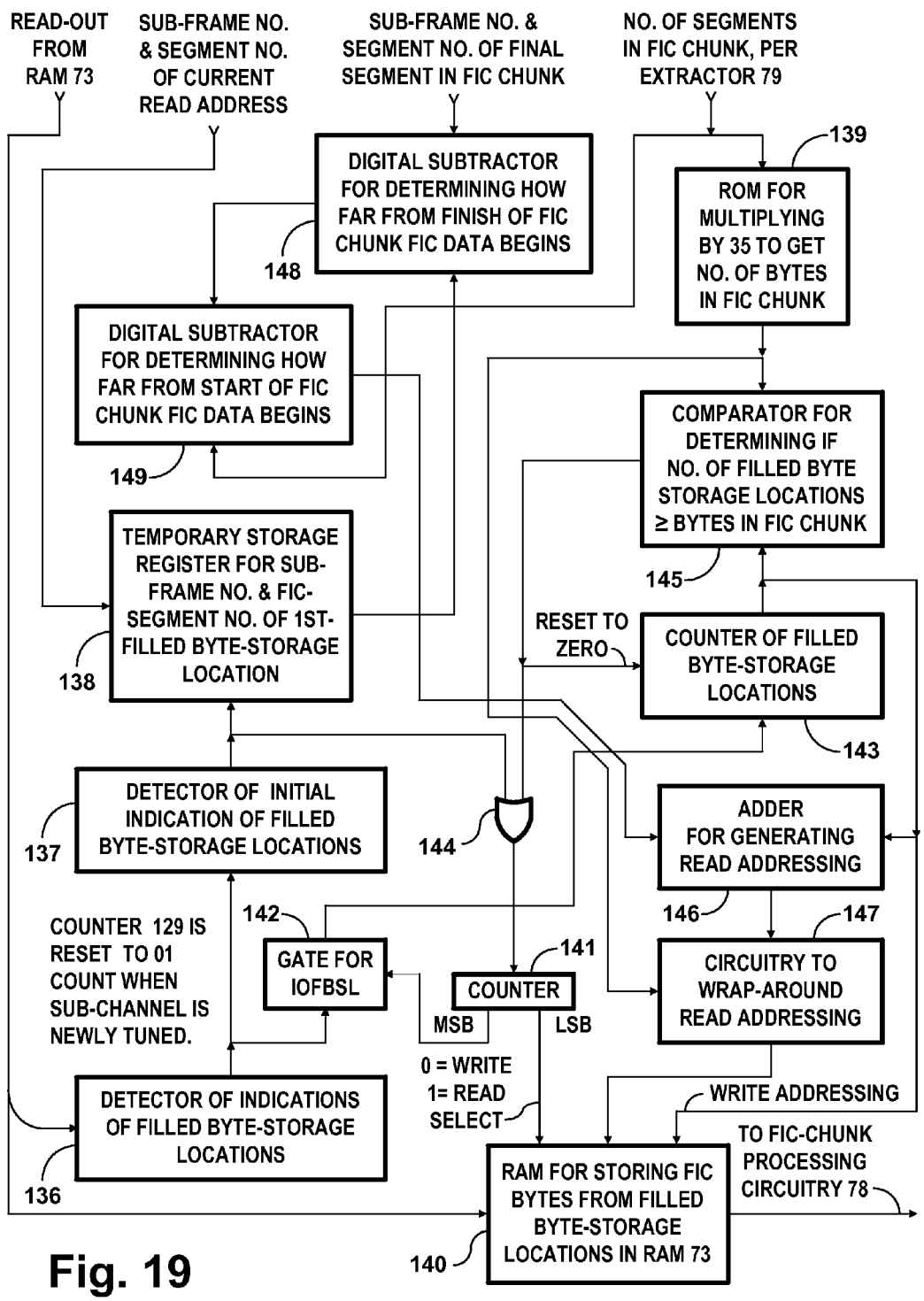

FIG. 19 shows circuitry for more rapidly recovering extended-length FIC Chunks, which circuitry supplements the FIC-Chunk code combiner 78 in some M/H receiver designs embodying the inventive concept at least in part. Connection is made to supply byte extension bits of the FIC read-out from the RAM 73 as an input signal to a detector 136 of the indications of filled byte-storage locations contained in the extended bytes of that read-out. These indications must be obtained before FIC information is available for parsing into FIC Chunks. The detector 136 is connected for supplying these indications to a detector 137 that detects when the initial one of them occurs. A temporary-storage register 138 is connected for storing the M/H sub-Frame number and FIC Segment number of the initial filled byte-storage location detected by the detector 137. These numbers are obtained from the read address of the RAM 73 at the time the initial indication of a filled byte-storage location is read from the RAM 73.

Once FIC information is available for the length of the FIC Chunk, it is possible to reconstruct the FIC Chunk in its entirety if it is repeating in nature. The bytes of an FIC Chunk can be conceived of as filling a shift register that is subsequently connected in a ring to be shifted until the beginning of the FIC Chunk is located in the read-out position. Then the FIC Chunk can be read from the ring register as its contents are shifted through a full circle. Although the register is filled haltingly, in bursts of 35 bytes per Group, once filled the register can be clocked continuously. So, the FIC Chunk can be read rather quickly from the filled register. The number of bytes in the FIC Chunk is a critical piece of information for the M/H receiver to know in order to employ such a construction. The read-address-ranges extractor 79 supplies the number of FIC Segments in the FIC Chunk to a read-only memory 139 to be multiplied by 35 to determine the number of bytes in the FIC Chunk.

The write-input port of a random-access memory (RAM) 140, which has enough byte-storage locations to store even the longest extended FIC Chunk, is connected for receiving FIC read-out from the RAM 73. A two-stage binary counter 141 is connected for supplying the less significant bit of its count output to the RAM 140 as a read/write selection signal. The less significant bit of this count output being ZERO conditions the RAM 140 to be written to ones of its byte-storage locations selected by write addressing supplied to the RAM 140. The less significant bit of this count output being ONE conditions the RAM 140 to be read from ones of its byte-storage locations selected by read addressing supplied to the RAM 140.

The counter 141 is further connected for supplying the more significant bit of its count output to a gate 142 as its control signal. The gate 142 is connected for selectively applying indications of filled byte-storage locations in RAM 73 that have been detected by the detector 134 to a counter 143 to be counted. The more significant bit of the counter 141 count output being a ZERO conditions the gate 142 to supply a ZERO at its output port. The more significant bit of the counter 141 count output being a ONE conditions the gate 142 to reproduce at its output port the ONES supplied to its input port from the detector 145 as indications of filled byte-storage locations in RAM 73. The output port of the gate 142 is connected for supplying the ONEs it reproduces to a counter 143 to be counted.

At the time that the M/H receiver is powered up, or after a change in the selection of the radio-frequency channel to be received, the counter 141 count output is reset to 01. This conditions the RAM 140 for reading (actually for not being written, since the RAM 140 is not supplied with read addressing at that time) and conditions the gate 142 to supply a ZERO at its output port. The counter 141 is connected for counting ONEs supplied from a two-input OR gate 144. One input port of the OR gate 144 is connected to the output port of the detector 137, and the other input port of the OR gate 144 is connected for receiving count reset signals applied to the counter 143.

The OR gate 144 reproduces the momentary ONE that the detector 137 emits when it detects the initial indication of filled byte-storage locations in read-out from the RAM 73. The ONE in the OR gate 144 response advances the count output from the counter 141 to 10. The less significant bit of the counter 141 count output being a ZERO conditions the RAM 140 for being written. The more significant bit of the counter 141 count output being a ONE conditions the gate 142 to reproduce at its output port the ONEs that the detector 145 generates responsive to indications of filled byte-storage locations in read-out from the RAM 73. The counter 143 counts these ONEs to generate a count output. The counter 143 is connected for supplying its count output to the RAM 140 as write addressing. The RAM 140 is conditioned to have bytes of the FIC Chunk written into its addressed byte-storage locations for temporary storage therewithin.

The counter 143 is connected for supplying its count output to one input port of a comparator 145, the other input port of which is connected to receive the number of bytes in the FIC Chunk supplied from the output port of the ROM 139. The comparator 145 is connected for supplying its response to the reset input connection of the counter 143. The comparator 145 is ZERO-valued so long as the counter 143 count output is less than the number of bytes in the FIC Chunk, and so the counter 143 is permitted to continue its counting. When the comparator 145 determines that the counter 143 count output has reached the number of bytes in the FIC Chunk, it responds with a ONE which applied to the reset input connection of the counter 143 resets the count output from the counter 143 to zero. This ONE is also applied as an input signal to the OR gate 144. The OR gate 144 reproduces the ONE in its own response supplied to the count input of the counter 141, advancing the output count from the counter 141 to '11'.

The less significant bit of the counter 141 count output being a ONE conditions the RAM 140 for being read. The more significant bit of the counter 141 count output being a ONE conditions the gate 142 to continue to reproduce at its output port the ONEs that the detector 145 generates responsive to indications of filled byte-storage locations in read-out from the RAM 73. The counter 143 counts these ONEs to generate a count output. The counter 143 is connected for supplying this count output to an input port of a digital adder 146 that augments this count to generate read addressing for the RAM 140. The output port of the adder 146 is connected for supplying the augmented count to an input port of circuitry 147 to wrap-around the read addressing so that it fits the length FIC Chunk. When the augmented count exceeds the number of bytes in the FIC Chunk, the circuitry 147 subtracts from the augmented count the number of bytes in the FIC Chunk, which number is supplied to its other input port from the ROM 139. The output port of the circuitry 147 supplies the read addressing as thus wrapped around to the RAM 140. The less significant bit of the counter 141 count output being a ZERO conditions the RAM 140 for reading to the FIC-Chunk code combiner 78, using the read addressing supplied from the output port of the circuitry 147.

The augmentation of the count in the adder 146 is such that reading from the RAM 140 proceeds from the beginning of the FIC Chunk. The computation of the augmentation proceeds in the following way. A digital subtractor 148 subtracts the sub-Frame number and FIC-Segment number of the initial filled byte storage location in the RAM 73, as temporarily stored in the register 138, from the sub-Frame number and Segment number of the final FIC Segment in the FIC Chunk, as supplied by the read-address-ranges extractor 79. This determines how far the FIC Chunk was from its conclusion when its bytes began to be written into respective storage locations in the RAM 140. This difference is expressed as a length in number of FIC segments. A digital subtractor 149 is connected for subtracting this difference from the number of FIC Segments in the FIC Chunk, as furnished by the read-address-ranges extractor 79. This determines how far the FIC Chunk was from its beginning when its bytes began to be written into respective storage locations in the RAM 140. The output port of the subtractor 148 is connected for supplying this distance expressed in number of FIC Segments to an input port of the adder 146 other than one receiving count output from the counter 143. The adder 146 sums this distance with the Segment number portion of the count output from the counter 143 to generate the read address furnished at the output port of the adder 146.

When the comparator 145 determines that the counter 143 count output has reached the number of bytes in the FIC Chunk, it responds with a ONE which applied to the reset input connection of the counter 143 resets the count output from the counter 143 to zero. This ONE is also applied as an input signal to the OR gate 144 which reproduces the ONE in its own response supplied to the count input of the counter 141, advancing the output count from the counter 141 to 00. The less significant bit of the counter 141 count output being a ZERO conditions the RAM 140 for being read. The more significant bit of the counter 141 count output being a ZERO conditions the gate 142 to supply a ZERO at its output port, so the counter 143 receives no ONEs to count and its count output stays at zero.

The FIG. 19 circuitry for more rapidly recovering extended-length FIC Chunks is most useful when the FIC Chunk extends over more than two successive M/H sub-Frames. After the one FIC Chunk is extracted, the normal parsing procedures for extracting FIC Chunks from the FIC can take over.

Figure 20:
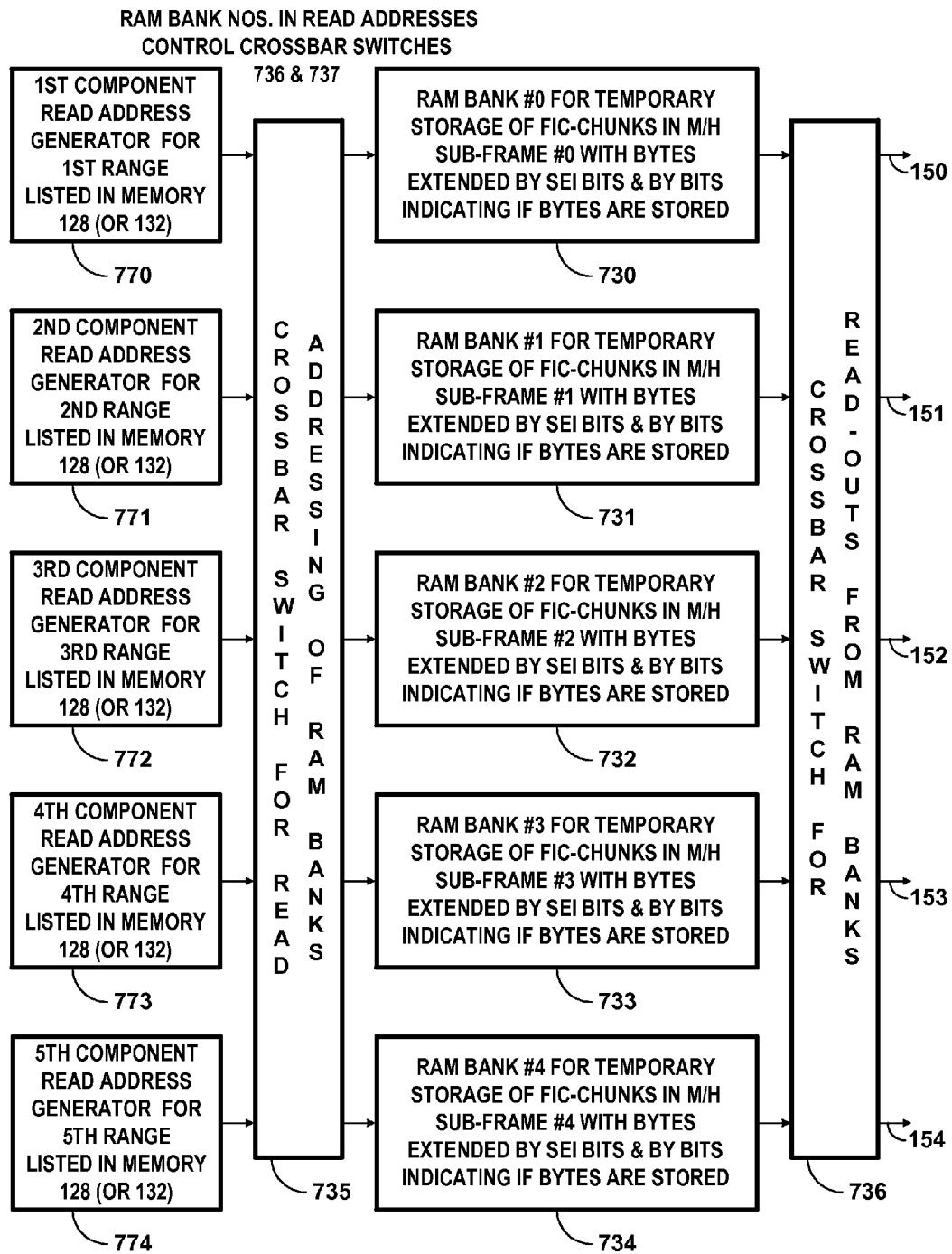
FIG. 20 is a schematic diagram of memory for temporarily storing extended-length FIC Chunks so they can be supplied in parallel to an FIC-Chunk code combiner, according to an exemplary embodiment of an aspect of the inventive concept.

FIG. 20 shows how the RAM 73 for temporarily storing FIC Chunks can be configured so successive FIC Chunks can be supplied in parallel to the FIC-Chunk code combiner 78 for implementing an aspect of the inventive concept. FIG. 20 shows the RAM 73 divided into five banks 730, 731, 732, 733 and 734 of RAM having respective address ranges spanning respective ones of the five M/H sub-Frames within an M/H Frame. Respective read addressing for each of the five banks 730, 731, 732, 733 and 734 of RAM is supplied via a first electronic crossbar switch 735. Since each of the FIC Chunks spans at least one fifth of an M/H Frame, each successive FIC Chunk in the M/H Frame will begin in a different one of the banks 730, 731, 732, 733 and 734 of RAM. When the addressing of bytes in an FIC Chunk continues into a subsequent one of the banks 730, 731, 732, 733 and 734 of RAM, the addressing of bytes in the next FIC chunk (if any) will have progressed to a later bank of RAM. The respective read-outs from each of the five banks 730, 731, 732, 733 and 734 of RAM are supplied via a second electronic crossbar switch 736 operated so as to complement operation of the first electronic crossbar switch 735.

FIG. 20 shows how the read address generator 77 is configured for reading from the five banks 730, 731, 732, 733 and 734 of RAM comprising the RAM 73. FIG. 20 shows the read address generator 77 comprising a first component read address generator 770, a second component read address generator 771, a third component read address generator 772, a fourth component read address generator 773 and a fifth component read address generator 774. The component read address generators 770, 771, 772, 773 and 774 are connected via the first electronic crossbar switch 735 for read addressing different ones of the five banks 730, 731, 732, 733 and 734 of RAM comprising the RAM 73. The M/H sub-Frame portion of the read address generated by any one of the component read address generators 770, 771, 772, 773 and 774 routes the FIC-Segment portion of the read address through the crossbar switch 735. The FIC-Segment portion of the read address is applied to the one of the five banks 730, 731, 732, 733 and 734 of RAM storing bytes of the FIC for the M/H sub-Frame specified by the M/H sub-Frame portion of the read address. The M/H sub-Frame portion of the read address also routes the read-out from the addressed one of the five banks 730, 731, 732, 733 and 734 of RAM through a second electronic crossbar switch 736. If the read-out is selected by read addressing generated by the first component read address generator 770, the crossbar switch 736 routes the read-out to be supplied from its first output connection 150. If the read-out is selected by read addressing generated by the second component read address generator 771, the crossbar switch 736 routes the read-out to be supplied from its second output connection 151. If the read-out is selected by read addressing generated by the third component read address generator 772, the crossbar switch 736 routes the read-out to be supplied from its third output connection 152. If the read-out is selected by read addressing generated by the fourth component read address generator 773, the crossbar switch 736 routes the read-out to be supplied from its fourth output connection 153. If the read-out is selected by read addressing generated by the fifth component read address generator 774, the crossbar switch 736 routes the read-out to be supplied from its fifth output connection 154.

In some exemplary embodiments of the read address generator 77, a listing in the RAM 128 of the read-address-ranges extractor 791 or 793 specifies the ranges of read addressing for successive FIC Chunks to be respectively generated by one or ones of the component read address generators 770, 771, 772, 773 and 774. In other exemplary embodiments of the read address generator 77, a listing in the RAM 132 of the read-address-ranges extractor 792 or 794 specifies the ranges of read addressing respectively generated by one or ones of the component read address generators 770, 771, 772, 773 and 774 for successive FIC Chunks.

The first component read address generator 770 generates the range of addresses that the RAM 128 (or 132) specifies for the first FIC Chunk in the M/H Frame. The second component read address generator 771 generates the range of addresses that the RAM 128 (or 132) specifies for the second FIC Chunk in the M/H Frame, if such specification has been made. If the RAM 128 (or 132) does not specify or does not yet specify a range of addresses for the second FIC Chunk in the M/H Frame, the second component read address generator 771 is not enabled to supply read addressing to the crossbar switch 735. The third component read address generator 772 generates the range of addresses that the RAM 128 (or 132) specifies for the third FIC Chunk in the M/H Frame, if such specification has been made. If the RAM 128 (or 132) does not specify or does not yet specify a range of addresses for the third FIC Chunk in the M/H Frame, the third component read address generator 772 is not enabled to supply read addressing to the crossbar switch 735. The fourth component read address generator 773 generates the range of addresses that the RAM 128 (or 132) specifies for the fourth FIC Chunk in the M/H Frame, if such specification has been made. If the RAM 128 (or 132) does not specify or does not yet specify a range of addresses for the fourth FIC Chunk in the M/H Frame, the fourth component read address generator 773 is not enabled to supply read addressing to the crossbar switch 735. The fifth component read address generator 774 generates the range of addresses that the RAM 128 (or 132) specifies for the fifth FIC Chunk in the M/H Frame, if such specification has been made. If the RAM 128 (or 132) does not specify or does not yet specify a range of addresses for the fifth FIC Chunk in the M/H Frame, the fifth component read address generator 774 is not enabled to supply read addressing to the crossbar switch 735.

Figure 21:
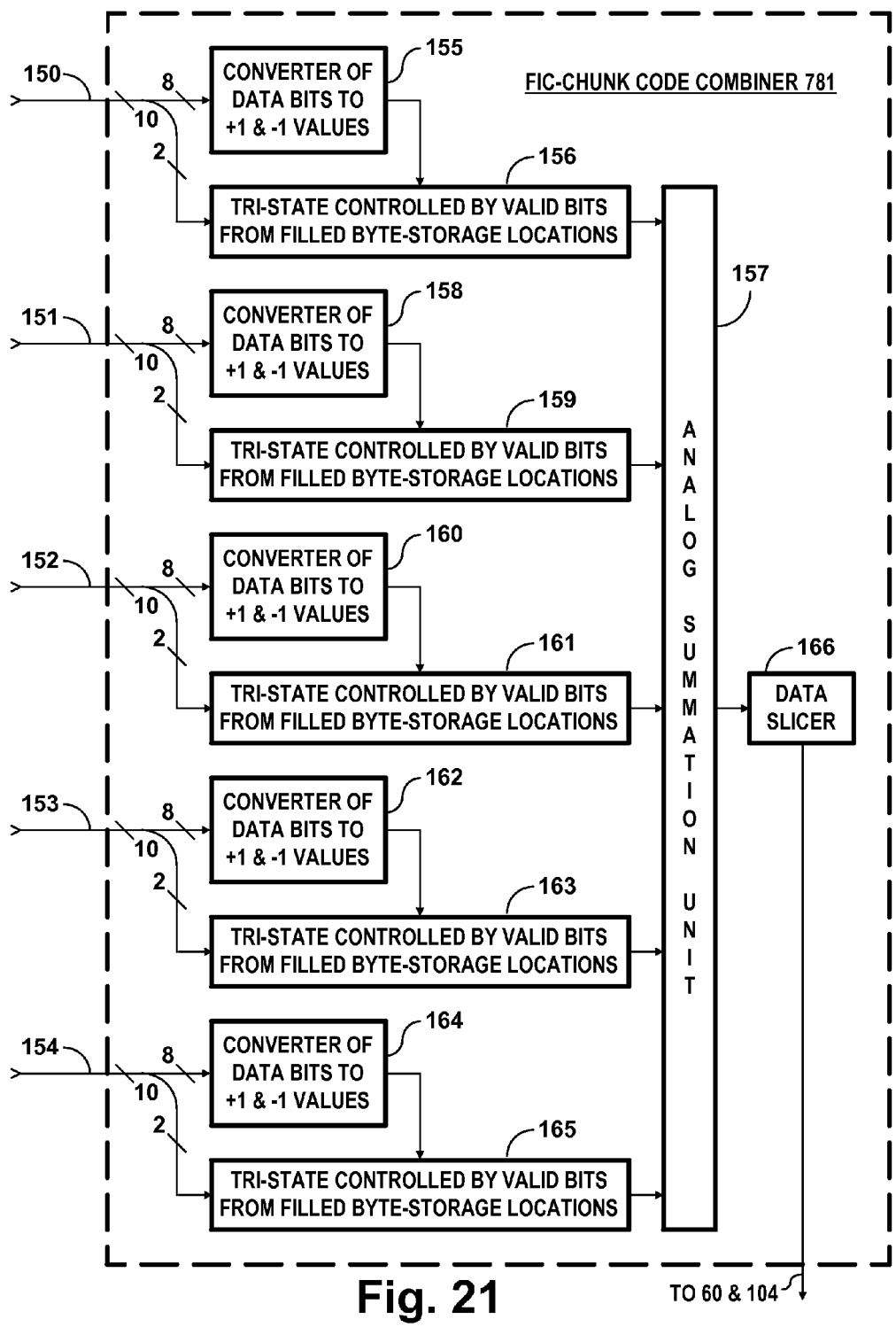
FIG. 21 is a schematic diagram of a novel FIC-Chunk code combiner for processing extended-length FIC Chunks supplied in parallel from the FIG. 20 memory, according to an exemplary embodiment of an aspect of the inventive concept.

FIG. 21 shows an exemplary embodiment 781 of the FIC-Chunk code combiner 78 suited for receiving the FIC Chunk(s) delivered from the RAM 73 configured as shown in FIG. 20. Presuming there is a plurality of FIC Chunks delivered in parallel to the FIC-Chunk code combiner 781, it converts the ONE bits of each FIC Chunk to respective shaped pulses of amplitude +V and converts the ZERO bits of each FIC Chunk to respective shaped pulses of amplitude −V. Concurrent pulses respective to bits from each of the FIC Chunks are averaged, and the results of the averaging are data slices to recover final estimates of FIC bits based on the majority of the preliminary estimates of FIC bits from individual FIC Chunks.

The bytes of the first FIC Chunk are successively supplied from the RAM 73 configured as shown in FIG. 20 via the connection 150 and applied as an input signal to a converter 155 for converting the eight data bits in each extended byte to respective shaped pulses of amplitude +V or −V, depending on whether each is a ONE or a ZERO. A tri-state buffer 156 supplies these shaped pulses as a first input signal to an analog summation unit 157. The tri-state buffer 156 supplies these shaped pulses either from a low source impedance so they substantially influence the response of the analog summation unit 157 or from high source impedance so they little influence the response of the analog summation unit 157. The tri-state buffer 156 supplies these shaped pulses from a low source impedance only provided that the extension bits appended to the byte indicate that it is read from a filled byte-storage location in the RAM 73 and that the FIC Segment was free of any byte error.

The bytes of the second FIC Chunk are successively supplied from the RAM 73 configured as shown in FIG. 20 via the connection 151 and applied as an input signal to a converter 158 for converting the eight data bits in each extended byte to respective shaped pulses of amplitude +V or −V, depending on whether each is a ONE or a ZERO. A tri-state buffer 159 supplies these shaped pulses as a second input signal to the analog summation unit 157. The tri-state buffer 159 supplies these shaped pulses either from a low source impedance so they substantially influence the response of the analog summation unit 157 or from a high source impedance so they little influence the response of the analog summation unit 157. The tri-state buffer 159 supplies these shaped pulses from a low source impedance only provided that the extension bits appended to the byte indicate that it is read from a filled byte-storage location in the RAM 73 and that the FIC Segment was free of any byte error.

The bytes of the third FIC Chunk are successively supplied from the RAM 73 configured as shown in FIG. 20 via the connection 152 and applied as an input signal to a converter 160 for converting the eight data bits in each extended byte to respective shaped pulses of amplitude +V or −V, depending on whether each is a ONE or a ZERO. A tri-state buffer 161 supplies these shaped pulses as a first input signal to the analog summation unit 157. The tri-state buffer 161 supplies these shaped pulses either from a low source impedance so they substantially influence the response of the analog summation unit 157 or from high source impedance so they little influence the response of the analog summation unit 157. The tri-state buffer 161 supplies these shaped pulses from a low source impedance only provided that the extension bits appended to the byte indicate that it is read from a filled byte-storage location in the RAM 73 and that the FIC Segment was free of any byte error.

The bytes of the fourth FIC Chunk are successively supplied from the RAM 73 configured as shown in FIG. 20 via the connection 153 and applied as an input signal to a converter 162 for converting the eight data bits in each extended byte to respective shaped pulses of amplitude +V or −V, depending on whether each is a ONE or a ZERO. A tri-state buffer 163 supplies these shaped pulses as a fourth input signal to the analog summation unit 157. The tri-state buffer 163 supplies these shaped pulses either from a low source impedance so they substantially influence the response of the analog summation unit 157 or from a high source impedance so they little influence the response of the analog summation unit 157. The tri-state buffer 163 supplies these shaped pulses from a low source impedance only provided that the extension bits appended to the byte indicate that it is read from a filled byte-storage location in the RAM 73 and that the FIC Segment was free of any byte error.

The bytes of the fifth FIC Chunk are successively supplied from the RAM 73 configured as shown in FIG. 20 via the connection 154 and applied as an input signal to a converter 164 for converting the eight data bits in each extended byte to respective shaped pulses of amplitude +V or −V, depending on whether each is a ONE or a ZERO. A tri-state buffer 165 is supplies these shaped pulses as a fifth input signal to analog summation unit 157. The tri-state buffer 165 supplies these shaped pulses either from a low source impedance so they substantially influence the response of the analog summation unit 157 or from a high source impedance so they little influence the response of the analog summation unit 157. The tri-state buffer 165 supplies these shaped pulses from a low source impedance only provided that the extension bits appended to the byte indicate that it is read from a filled byte-storage location in the RAM 73 and that the FIC Segment was free of any byte error.

The analog summation unit 157 essentially comprises resistors of equal resistance respectively resistively coupling each of its input connections to its output connection. A data slicer 166 responds with a ONE to the combined pulse appearing at the output connection of the analog summation unit 157 being positive in polarity. The data slicer 166 responds with a ZERO to the combined pulse appearing at the output connection of the analog summation unit 157 being negative in polarity. The analog summation unit 157 and the succeeding data slicer 166 operate together as a code combiner. The successive bits of the processed FIC Chunk are supplied from the data slicer 166 to the decoding control unit 60 shown in FIG. 12A and to the SMT-MH processing unit 104 shown in FIG. 12C. While the FIC-Chunk code combiner 781 operates on a serial-bit basis as described supra, other exemplary embodiments of the FIC-Chunk code combiner 78 operating on serial-byte basis are envisioned also. The modifications of the FIC-Chunk code combiner 781 required to operate on a serial-byte basis should be apparent to one of ordinary skill in the art.

Figure 22:
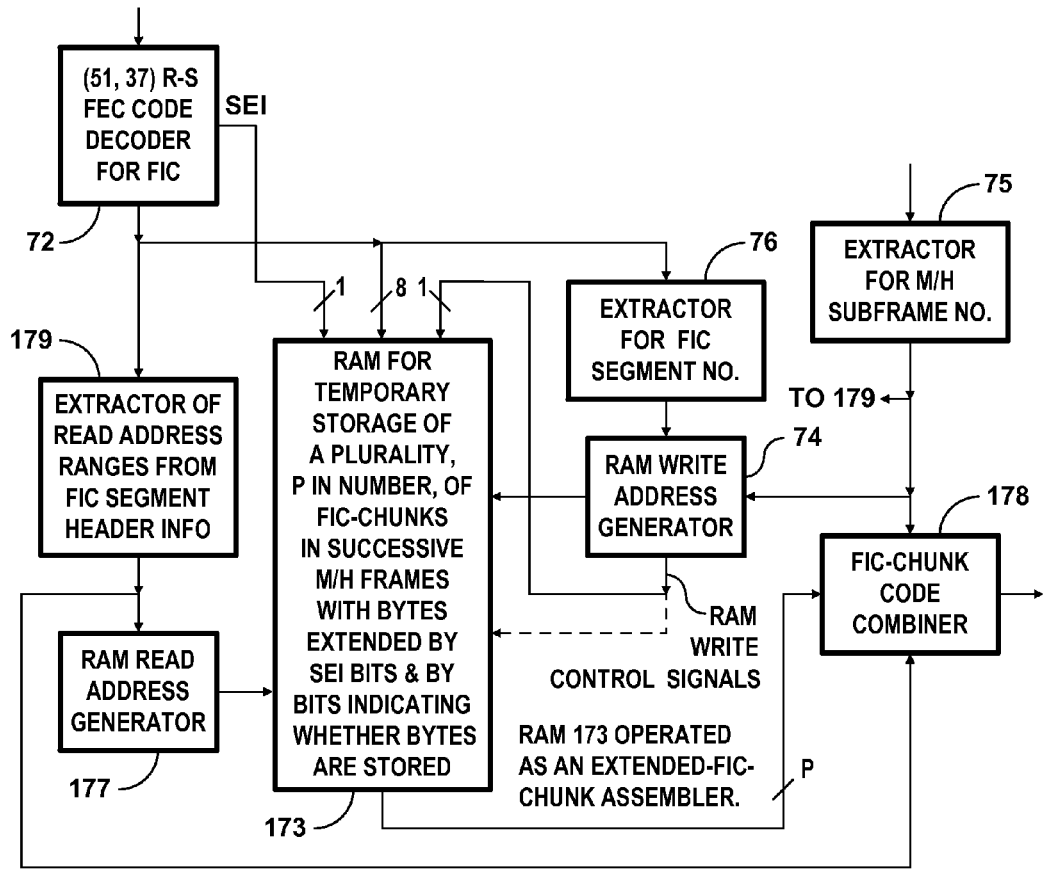
FIG. 22 is a schematic diagram of a modification of the FIG. 12A M/H receiver apparatus that permits noise reduction by combining FIC-Chunk information from more than one M/H Frame, according to an exemplary embodiment of an aspect of the inventive concept.

FIG. 22 shows a modification of the FIG. 12A M/H receiver apparatus that permits noise reduction by averaging FIC-Chunk information from more than one M/H Frame. This modification is particularly useful in reducing noise in longer extended FIC Chunks, offering noise reduction even for extended FIC Chunks that span five M/H sub-Frames. FIG. 22 shows a random-access memory (RAM) 173 for temporarily storing the FIC Chunks in a plurality, P in number, of M/H Frames replacing the RAM 73 used in the FIG. 12A M/H receiver apparatus for temporarily storing the FIC Chunks in a single M/H Frame. The RAM 173 is configured similarly to the way that FIG. 20 shows the RAM 73 to be configured, with a number 5P banks of RAM each for storing FIC Segments transmitted within a respective M/H sub-Frame. FIG. 22 shows a read address generator 177 for the RAM 173, which read address generator 177 comprises a plurality, 5P in number, of component read address generators for supplying respective ranges of read addresses. These respective ranges of read addresses are routed via a first electronic crossbar switch to the 5P banks of RAM comprising the RAM 173. Data read from those 5P banks of RAM are routed via a second electronic crossbar switch to a plurality, 5P in number, of output connections to FIC-Chunk code combiner 178. FIG. 22 shows a read-address-ranges extractor 179 replacing the read-address-ranges extractor 79 used in the FIG. 12A M/H receiver apparatus. The read-address-ranges extractor 179 differs from the read-address-ranges extractor 79 in that memory therewithin not only temporarily stores the full beginning and ending addresses for the FIC Chunks in the next M/H Frame. Memory within the read-address-ranges extractor 179 also continues temporarily storing the full beginning and ending addresses for the FIC Chunks in the current M/H Frame and for the preceding (P−1) M/H Frames if P is more than two. In its general architecture, the FIG. 22 FIC-Chunk code combiner 178 prefaced by the read address generator 177 and the 5P-banked RAM 173 is essentially an expanded version of the FIG. 21 FIC-Chunk code combiner, being expanded to be able to process P times as many FIC Chunks in parallel to generate final estimates of the bits in the repeated FIC Chunks. However, since FIC Chunks will sometimes change from one M/H Frame to the next, modifications of the general architecture are necessary to take such changes into account.

Figure 23:
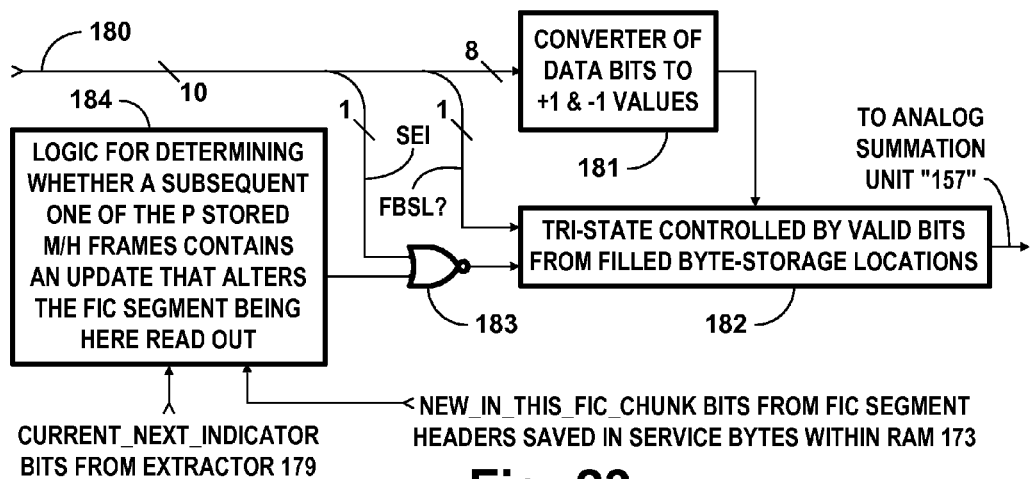
FIG. 23 is a schematic diagram of a representative one of modifications of expanded FIG. 22 FIC-Chunk code combiner that suppresses noise by code-combining FIC-Chunk information from more than one M/H Frame, according to an exemplary embodiment of an aspect of the inventive concept.

FIG. 23 shows a representative one of these modifications of expanded FIG. 21 FIC-Chunk code combiner that facilitates noise reduction by averaging FIC-Chunk information from more than one M/H Frame. A representative one 180 of the 5P input connections to the FIC-Chunk code combiner 178 is connected for receiving extended bytes of FIC signal read from a selected one of the 5P banks of the RAM 173. This read-out is applied via connection 180 as an input signal to a respective converter 181 for converting the eight data bits in each extended byte to respective shaped pulses of amplitude +V or −V, depending on whether each is a ONE or a ZERO. A tri-state buffer 182 supplies these shaped pulses as an input signal to the analog summation unit 157, which is expanded to receive 5P input signals in parallel rather than just five. The tri-state buffer 182 supplies these shaped pulses either from a low source impedance so they substantially influence the response of the expanded analog summation unit 157 or from a high source impedance so they have little influence on that response. When either of first and second control signals supplied to the tri-state buffer 182 is a ZERO, the tri-state buffer 182 is conditioned to supply these shaped pulses from a high source impedance. The first control signal is the one of the byte-extension bits that when ONE confirms that the byte currently being processed by the converter 181 and the tri-state buffer 182 is from a filled byte-storage location in the RAM 173. The response from a two-input NOR gate 183 supplies the second control signal for the tri-state buffer 182. One of the input signals supplied to the NOR gate 183 is the SEI indication, and the other input signal is supplied from logic circuitry 184.

FIG. 23 shows the SEI bit as an extension bit appended to each extended byte read from the RAM 173. The SEI bit being a ONE indicates that the byte currently being processed by the converter 181 and the tri-state buffer 182 is from an FIC Segment that the decoder 72 of (51, 37) RS FEC coding found to contain byte errors that could not be corrected. The SEI bit being a ONE causes the NOR gate 183 response to be a ZERO that conditions the tri-state buffer 182 to supply shaped output pulses from high source impedance.

The logic circuitry 184 determines whether the FIC Chunk(s) in a later one of the M/H Frames is an update so that the bytes of each FIC Chunk in an earlier M/H Frame are passé in whole or in part. The logic circuitry 184 is connected to use the current_next_indicator bits stored in the extended RAM 128 or 132 of the read-address-ranges extractor 179 to determine when an update of FIC Chunks occurs. Responsive to such determination, the logic circuitry 184 supplies a ONE indication to the NOR gate 183 in every modification per FIG. 23 that pertains to an earlier M/H Frame in simpler embodiments of the logic circuitry 184. More complex embodiments of the logic circuitry 184 take into account new_in_this_FIC_Chunk bits in the headers of the FIC Segments within the updated FIC Chunk. A ONE indication is selectively supplied to the NOR gate 183 in every modification per FIG. 23 that pertains to an earlier M/H Frame. The ONE is supplied by the logic circuitry 184 only for those FIC Segments in which the new_in_this_FIC_Chunk bit is a ONE indicating those particular FIC Segments have been changed from the corresponding segments in previous FIC Chunks.

The new_in_this_FIC_Chunk bits can be appended as extra extension bits to the extended data bytes stored in respective storage locations within the RAM 173. A more efficient way to temporarily store the new_in_this_FIC_Chunk bit and the SEI bit associated with a respective FIC Segment is to temporarily store them in a RAM ancillary to the RAM 173. A similar technique can be used in a modification of the FIC-Chunk code combiner 781 shown in FIG. 21, in which modification the SEI bits associated with respective FIC Segments are temporarily stored in a RAM ancillary to the RAM 73.

Figure 24:
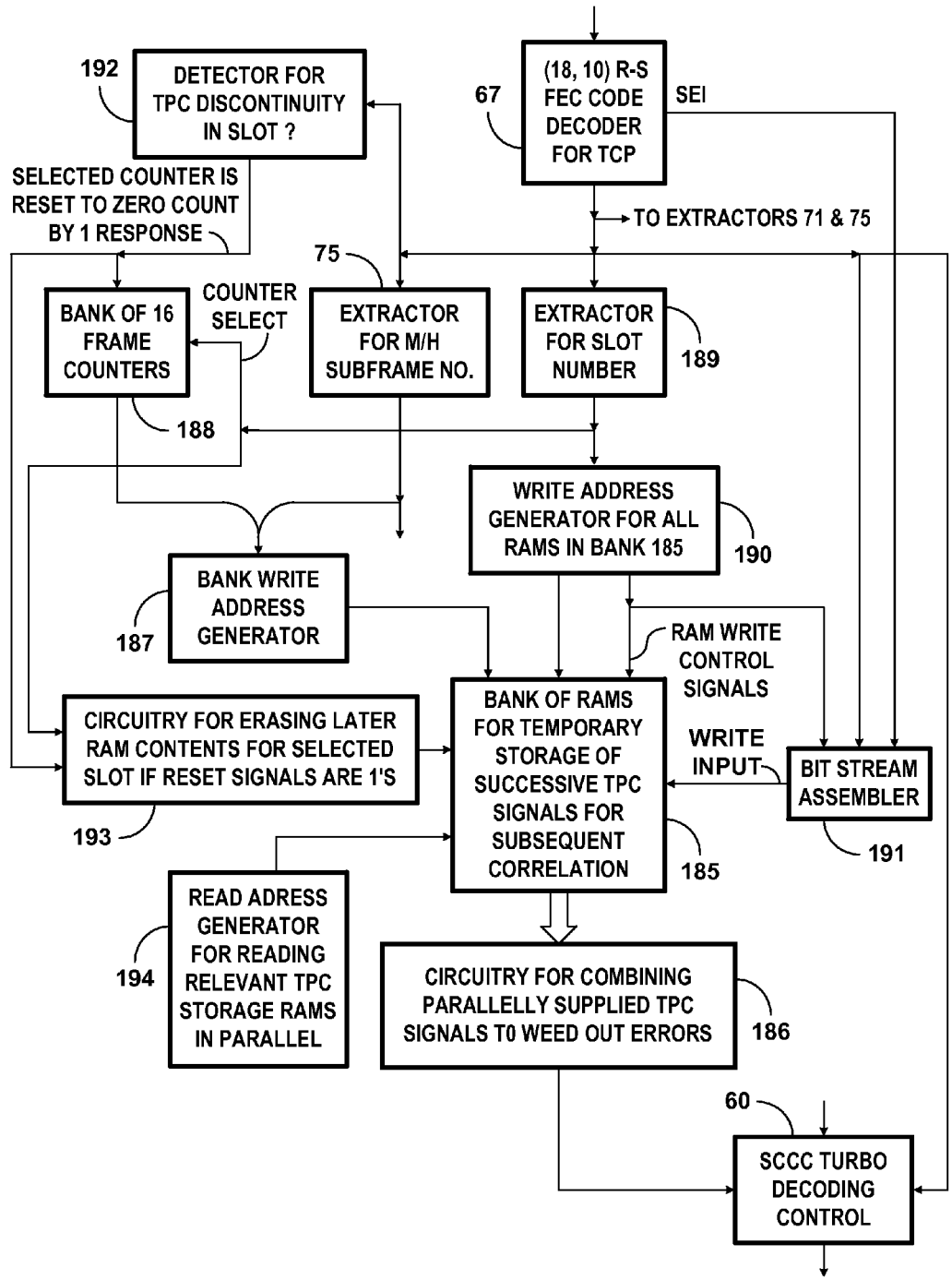
FIG. 24 is a detailed schematic diagram of novel circuitry for weeding out errors from the TPC, according to an exemplary embodiment of an aspect of the inventive concept.

FIG. 24 shows circuitry that can be used for weeding out errors from the portions of the Transmission Parameters Channel (TPC) signal from the decoder 67 for (18, 10) RS FEC code that repeat over the sub-Frames of an M/H Frame. Successive TPC signals for a particular Slot in the M/H sub-Frames that are repetitive in nature are temporarily stored in a bank 185 of random-access memories (RAMs) and reproduced parallelly for application to a code combiner 186 for weeding out errors. The construction of the code combiner 186 resembles in a general way the construction of the FIC-Chunk code combiner 781 described supra with reference to FIG. 21. The storage locations in the RAMs in the bank 185 of them are bit-organized, rather than byte-organized, so digital-to-analog conversion is simpler.

Referring back to the FIG. 5 Table of TPC Bit Syntax, the portions of the TPC signal that repeat over the sub-Frames of an M/H Frame are the Slot_number, the Parade_number, the starting_Group_number, the number_of_Groups_minus_one, the Parade_repetition_cycle_minus_one, the various FEC modes, the FIC_version, the Parade_continuity_counter, the iterative_diversity_mode, the TPC_protocol_version_major_update and the TPC_protocol_version_minor_update. The bank 185 of RAMs includes five RAMs for temporarily storing these parameters from respective ones of the sub-Frames of one M/H Frame. The Extractor 75 is connected for extracting the sub_Frame_number from the current TPC response of the decoder 67 for (18, 10) R-S FEC code and supplying the sub_Frame_number to a bank write address generator 187 as one of its control input signals. The bank write address generator 187 adjusts at least a portion of the bank write address that it supplies to the bank 185 of RAMs to comport with this sub_Frame_number control input signal.

The Parade_number, the starting_Group_number, the number_of_Groups_minus_one, the Parade_repetition_cycle_minus_one, the various FEC modes, the FIC_version, the iterative_diversity_mode, the TPC_protocol_version_major_update and the TPC_protocol_version_minor_update may repeat in more than one M/H Frame. The FIG. 24 circuitry that can be used for weeding out errors presumes the bank 185 of RAMs includes extra RAMs for temporarily storing these parameters from sub-Frames of one or more additional M/H Frames. These extra RAMs like the RAMs for temporarily storing the sub-Frames of the TPC signal from the current or most recent M/H Frame are in sets of five to an M/H Frame. The portion of the bank write address corresponding to the sub_Frame_number selects which RAM in one of the sets of five RAMs is to be written.

The selection of which set the of five RAMs will contain the RAM to be written as determined by a further portion of the bank write address corresponding to the output count from a selected one of a bank 188 of 16 M/H Frame counters. There is a respective M/H Frame counter in the bank 188 for each of the 16 Slot numbers. An extractor 189 for Slot number is connected for reproducing just the Slot_number portion of the TPC signal from the decoder 67 for (18, 10) RS FEC code. The extractor 189 is connected for supplying the reproduced Slot number to the bank 188 of 16 M/H Frame counters for selecting the one of those M/H Frame counters to supply its output count to the bank write address generator 187 as another of its control input signals. The bank write address generator 187 adjusts the further portion of the bank write address that it supplies to the bank 185 of RAMS to comport with this other control input signal.

The slot number reproduced in the response of the extractor 189 is supplied as a control input signal to a write address generator 190 that writes the same individual write addressing to each of the RAMS in the bank 185 of them. The write address generator 190 adjusts a portion of its write addressing to comport with this control input signal, which portion of its write addressing specifies the Slot from which the TPC signal to be written is taken. The remainder of the write addressing from the write address generator 190 specifies bits of the TPC signal from that Slot and information associated with that TPC signal. FIG. 24 shows a write input signal for the bank 185 of RAMs being supplied from a bit-stream assembler 191. The bit-stream assembler 191 incorporates selected bits of the TPC signal from the decoder 67 for (18, 10) RS FEC code within this write input signal that the bit-stream assembler 191 generates. The bit-stream assembler 191 also incorporates into this write input signal the SEI bit from the decoder 67 indicating whether or not the TPC signal was found to contain any error that was left uncorrected. The bit-stream assembler 191 further incorporates into the write input signal a bit responsive to the write control signal from the write address generator 190. This bit is a ONE indicating that TPC information selected from a Slot is temporarily stored in the one of bank 185 of RAMS being written to. This ONE is replaced by a ZERO when and if the contents of that RAM are erased.

A detector 192 is connected for selectively responding to the TPC_discontinuity_in_Slot bit in the TPC signal from the decoder 67 for (18, 10) R-S FEC code. So long as the Parade_number, the starting_Group_number, the number_of_Groups_minus_one, the Parade_repetition_cycle_minus_one, the various FEC modes, the FIC_version, the iterative_diversity_mode, the TPC_protocol_version_major_update and the TPC_protocol_version_minor_update is the same as it was for the corresponding Slot in the previous M/H Frame, the detector 192 output signal is a ZERO. If there is a change in one or more of these parameters in the current Slot as compared to those parameters in the corresponding Slot in the previous M/H Frame, the detector 192 output signal is a ONE. A selector network within the bank 188 of M/H Frame counters selectively applies the response of the detector 190 to the reset connection of the one of those counters selected per the slot number reproduced by the extractor 189. When the detector 192 output signal becomes a ONE, signaling a change in TPC parameters from the previous Frame, this ONE resets to arithmetic zero the output count from the one of the bank 188 of M/H Frame counters selected per the slot number reproduced by the extractor 189.

Such ONE reset should occur during all five of the sub-Frames of the Frame in which the change in TPC parameters is signaled for the particular Slot, presuming that a TPC_discontinuity_in_Slot bit that is ONE is actually transmitted in that particular Slot in all of those five sub-Frames. If that ONE reset occurs during a prescribed fraction of those five sub-Frames (e. g., three of them), circuitry 193 erases past TPC information for the selected Slot from the bank 185 of RAMs. This circuitry 193 is connected for receiving the response of the detector 192 and for also receiving the Slot number extracted by the extractor 189. The circuitry 193 uses that Slot number for selecting for possible erasure of temporarily stored contents those ones of the bank 185 of RAMs containing TPC information for the selected Slot in Frames other than the zeroeth one. The circuitry 193 includes a respective counter for each of the 16 Slots, which counts the number of ONEs it receives as the detector 192 response in regard to a respective Slot during an M/H Frame. If one of these counters reaches a count of three, the circuitry 193 decides that TPC for the associated Slot has been updated.

At the conclusion of each M/H Frame, the temporarily stored contents of those ones of the bank 185 of RAMS containing TPC information pertaining to Slots with updated TPC information, other than for the zeroeth Frame, are erased by the circuitry 193. Then, counters in the circuitry 193 are each reset to zero count. A read address generator 194 generates read addresses for the bank 185 of RAMs which are read in parallel to the code combiner 186 for weeding out errors. The code combiner 186 is connected for supplying TPC information with reduced likelihood of bit errors to the decoding control unit 60 that controls turbo decoding of SCCC and two-dimensional decoding of RS Frames in the FIG. 12 DTV receiver apparatus.

A basic concern in the design of a system for transmitting data to M/H receivers of over-the-air RF broadcasts is the time an M/H receiver takes to acquire a new program after a person using the receiver selects a RF Channel to be received. That is, after a "major" channel change. A further concern is the time an M/H receiver takes to acquire a new program after the person using the receiver selects a different sub-Channel to be received without having changed selection of the major Channel being received. That is, after a "minor" channel change. Generally, the time delay in acquiring a new program is shorter after a "minor" channel change, because the receiver already has the FIC available to it at the time a different sub-Channel is selected for reception. The time delay includes a first delay time taken to reach the conclusion of the process of writing the RS Frame storage buffer memory or memories with turbo decoding results for the selected service. The time delay further includes a second delay time taken to reach the point in the subsequent reading of the RS Frame storage buffer memory or memories when turbo decoding results become available. These first and second delay times sum to a combined time delay that can be almost a second long. The time it takes for the receiver to acquire FIC information after a "major" channel change adds to this combined time delay.

The receiver needs to know the Total Number of Groups (TNoG) being transmitted in each M/H sub-Frame in order to arrange for proper de-interleaving of the RS-coded FIC before it is supplied to the decoder 72 for the (51, 37) RS coding. So long as advanced signaling of TNoG in TPC is temporally aligned with advanced signaling of FIC, there is essentially no problem with de-interleaving FIC during each successive sub-Frame. However, advanced signaling does present the problem of knowing how to turbo decode SCCC received immediately after a "major" channel change at a time when the TPC and FIC information relates to the next M/H Frame to be received, rather than the M/H Frame being currently received. Usually the TPC information for each Slot remains the same from M/H Frame to M/H Frame in the Parade repetition cycle (PRC). The TPC_discontinuity_in_slot bit 55 in the TPC signal can confirm whether or not the TPC information in a Slot of the currently received M/H Frame applies to that Frame. Usually the FIC information seldom changes from M/H Frame to M/H Frame in the PRC. The new_in_this_FIC_Chunk bit 7 in the FIC-Segment header and the current_next_indicator bit 8 in the FIC-Chunk header can confirm whether or not the FIC information in a Slot of the currently received M/H Frame applies to that Frame. If the TPC and FIC information pertaining to a service currently selected for reception are confirmed to be applicable to the Frame being currently received, IP packets relating to that service can begin to be turbo decoded as soon as an FIC Chunk has been fully decoded. The length of this wait depends on the length of the FIC Chunk ranging from a little less than a fifth of a second to a little less than a second.

If the TPC and FIC information pertaining to a service currently selected for reception are found not to be applicable to the Frame being currently received, turbo decoding of IP packets relating to that service has to wait until the beginning of the next M/H Frame in the PRC. This wait will be from a little less than a second to almost eight seconds long. There is a likelihood that the IP packets that cannot be turbo decoded will be irrelevant anyway to the IP packets that can subsequently be turbo decoded. Indeed, careful practice by the broadcast station can assure that this will be the case.

As described supra, the FIC Chunk data not only is essential for controlling the portions of the M/H receiver apparatus used to decode IP transport stream, but information therefrom is subsequently combined with Service Map Table information extracted from special IP transport packets called "SMT-MH packets". The combined information is used for selecting the IP transport packets associated with the particular service the user selects as well as providing a basis for an Electronic Service Guide (ESG). Accordingly, the rapid acquisition of the Service Map Table information is a further concern in determining how quickly the M/H receiver apparatus is ready to provide a service newly selected by a user. This issue is described in detail in U.S. patent application Ser. No. 12/555,248 filed Sep. 8, 2009 for Allen LeRoy Limberg, titled "Sub-channel Acquisition in a Digital Television Receiver Designed to Receive Mobile/Handheld Signals" and incorporated herein by reference.

Figure 25:
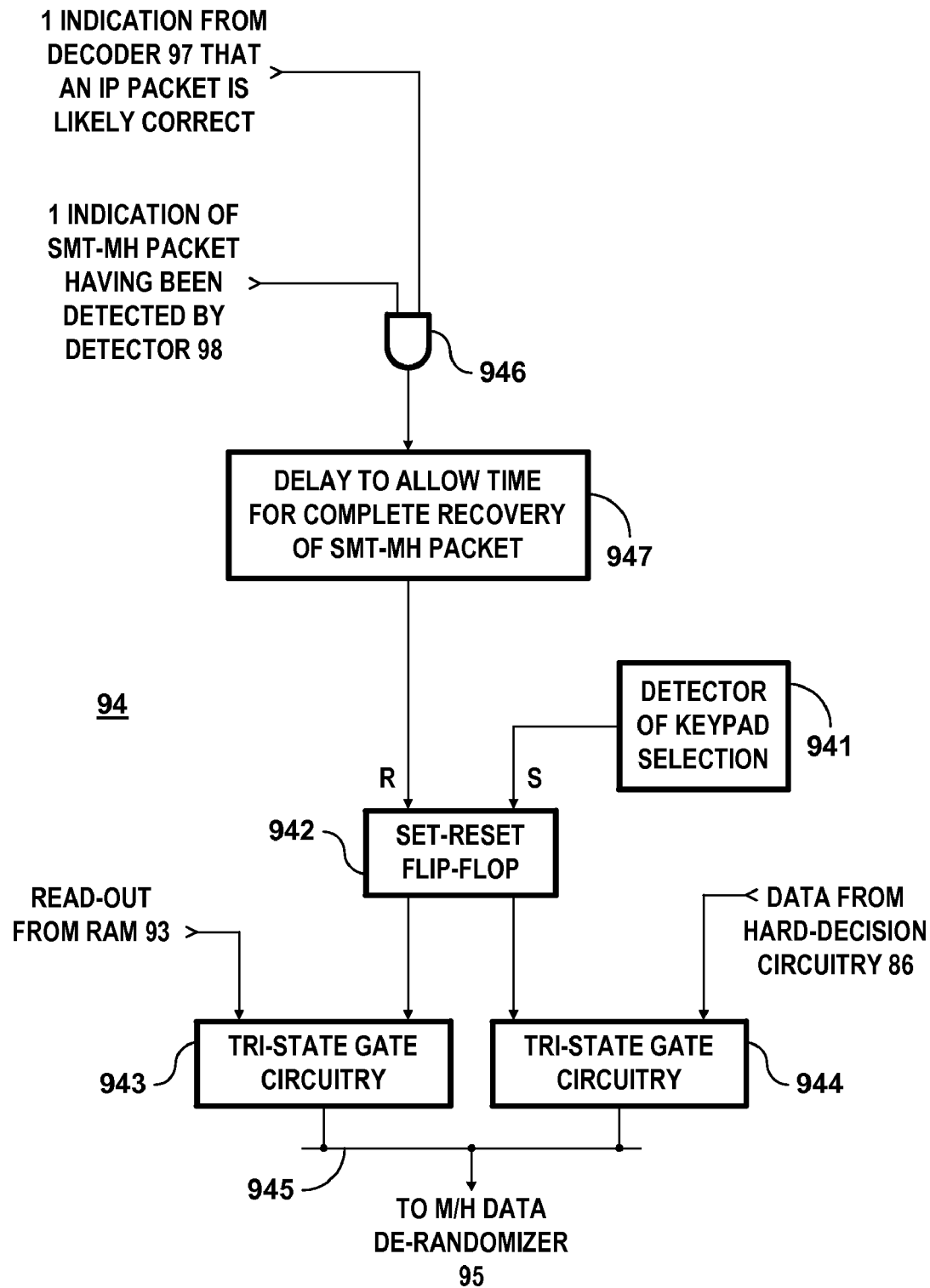
FIG. 25 is a detailed schematic diagram of circuitry used in one embodiment of the FIG. 24 receiver circuitry to by-pass TRS decoding for a time after a sub-Channel is newly selected.

FIG. 25 shows an exemplary embodiment of the bypass unit 94 in detail. A detector 941 of keypad selection of a sub-Channel generates a SET signal for a set-reset flip-flop 942, which flip-flop 942 responds to supply a logic ZERO to a tri-state buffer 943 and to supply a logic ONE to a tri-state buffer 944. The respective output ports of the tri-state buffer 943 and the tri-state buffer 944 each connect to a common bus 945 for supplying the input port of the M/H data de-randomizer 95. The logic ZERO that the flip-flop 942 supplies to the tri-state buffer 943 conditions it to reproduce from a relatively high source impedance the data read to it from the RAM 93. The logic ONE that the flip-flop 942 supplies to the tri-state buffer 944 conditions it to reproduce from a relatively low source impedance the data that it receives as an input signal from the hard-decision circuitry 86. This establishes that data as the input signal supplied via the common bus 945 to the input port of the M/H data de-randomizer 95 until such time as the flip-flop 942 is reset.

The flip-flop 942 is reset at a time when a valid SMT packet would be expected to be read from the RAM 93 to the tri-state buffer 943. Resetting is controlled by the decoder 97 for CRC in IP packets and the detector 98 of SMT-MH packets shown in FIG. 12C. FIG. 25 shows that one input of a two-input AND gate 946 receives a logic ONE indication from the decoder 97 when it finds an IP packet to be correct; otherwise a logic ZERO indication is supplied from the decoder 97 to this input of the AND gate 946. FIG. 25 shows that the other input of the AND gate 946 receives a logic ONE indication from the detector 98 when an IP packet is an SMT-MH packet; otherwise a logic ZERO indication is supplied from the detector 98 to this other input of the AND gate 946. The response of the AND gate 946 being a logic ONE indicates that a correct, or valid, SMT-MH packet has begun to be received. The logic ONE response of the AND gate 946 is delayed by a delay unit 947 to allow time for the SMT-MH packet to be received in its entirety, and the delayed logic ONE response of the AND gate 946 is applied as a RESET signal to the set-reset flip-flop 942.

Figure 26:
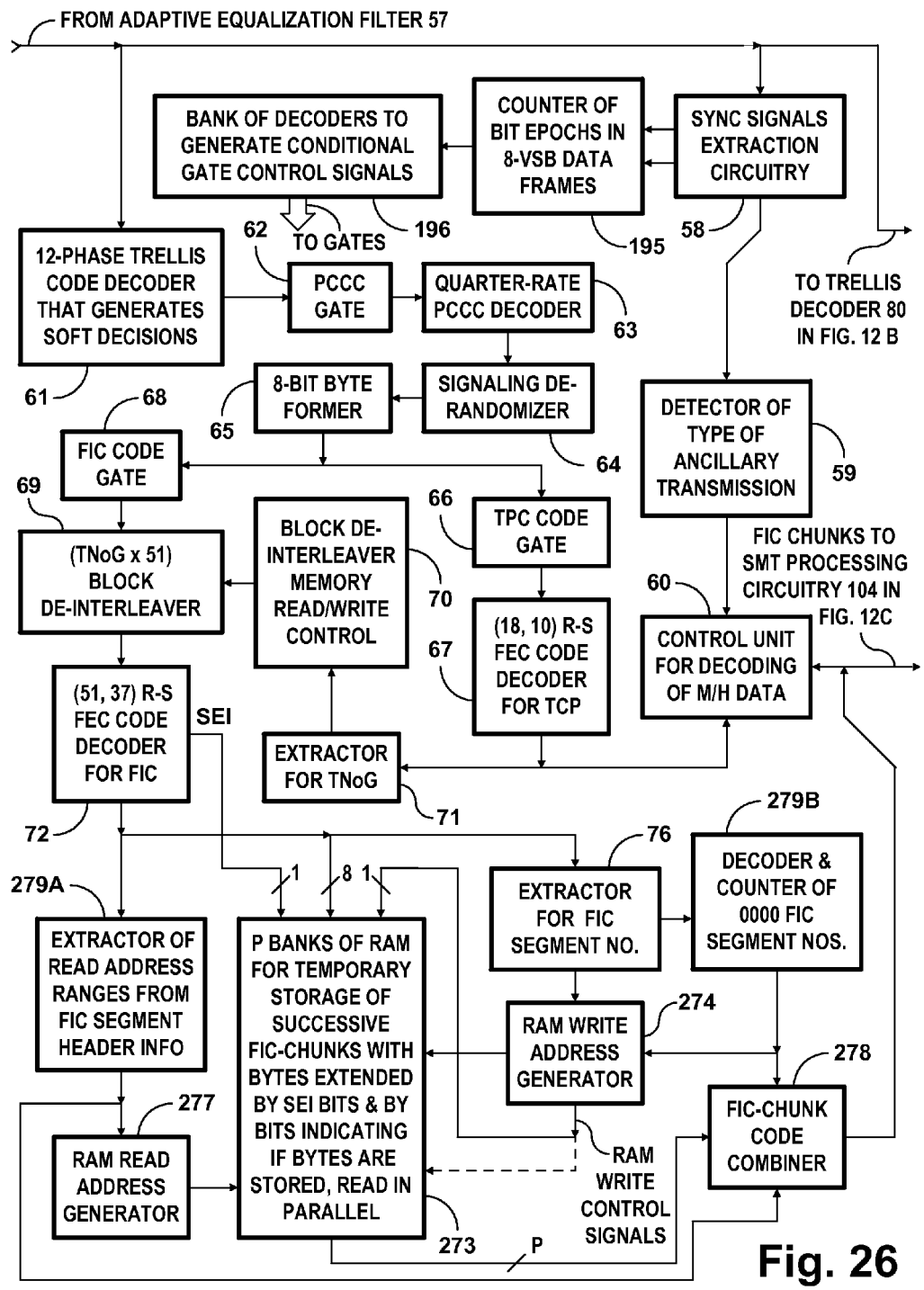
FIG. 26 is a schematic diagram of a modification of the FIG. 12A portion of M/H receiver apparatus, which modification accommodates the FIC prescribed by A/153 in another exemplary embodiment of M/H receiver apparatus constructed in accordance with aspects of the inventive concept.
Figure 27:
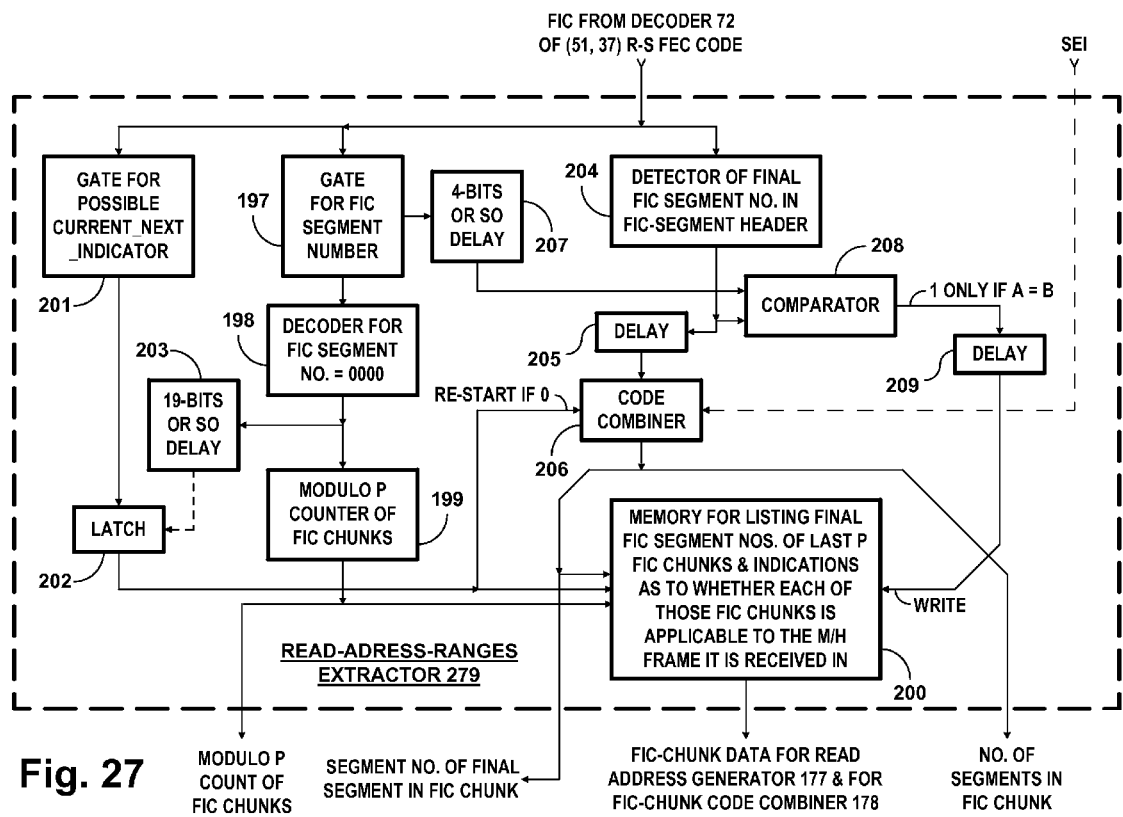
FIG. 27 is a schematic diagrams showing in more detail an exemplary embodiment of the read-address-range extractor used for extracting information concerning extended-length FIC-Chunks from the decoded FIC in the FIG. 26 portion of M/H receiver apparatus.

FIGS. 26 and 27 are directed to modifications of the FIG. 12A portion of the FIG. 12 receiver apparatus to accommodate the Fast Information Channel (FIC) specified by A/153, which specifies a syntax for bits in FIC-Segment headers different from that shown in FIG. 6. A/153 specifies the FIC-Segment number appearing in the initial four bits of the third byte of the FIC-Segment, the last byte of the FIC-Segment header. In A/153 practice FIC-Chunks may span more than an M/H sub-Frame interval, but they are constrained to consist of no more than 16 FIC-Segments. FIC-Chunks that have no more than 16 FIC-Segments but span more than an M/H sub-Frame interval are treated similarly to FIC-Chunks that span less than an M/H sub-Frame interval in the apparatus shown in FIGS. 26 and 27. So, in the description of the operation if the apparatus shown in FIGS. 26 and 27, both types of FIC-Chunks are collectively referred to simply as "FIC Chunks".

FIG. 26 shows a modification of the FIG. 12A portion of the FIG. 12 receiver apparatus, in which the RAM 73, the RAM write address generator 74, the extractor 75 of M/H sub-Frame number, the RAM read address generator 77, the FIC-Chunk code combiner 78 and the read-address-ranges extractor 79 are replaced. FIG. 26 also explicitly shows a counter 195 for counting bit epochs in 8-VSB data Frames and a bank 196 of decoders for generating conditional gate control signals. The bit-epoch counter 195 and the bank 196 of decoders are also included in the FIG. 12 receiver apparatus, although not explicitly shown in FIGS. 12A, 12B and 12C. The count from the bit-epoch counter 195 is customarily synchronized responsive to synchronizing pulses from a match filter for the PN511 sequence in the DFS interval, which match filter is included within the synch signals extraction circuitry 58. Each decoder in the bank 196 is connected for receiving at least a portion of the count from the bit-epoch counter 195 as its input signal and responds to a specific value or range of values of its respective input signal with a respective conditional gate control signal that has a first of two possible logic conditions. Otherwise, the response of that decoder has a second of the two possible logic conditions. The gate to be controlled partly by the decoder response is precluded from reproducing its input signal in its response when the second logic condition obtains in the decoder response. The gate to be controlled partly by the decoder response is conditionally allowed to reproduce its input signal in its response when the first logic condition obtains in the decoder response. The condition that must be met for the gate to be allowed to reproduce its input signal in its response is that the first logic condition obtains in the decoder response within a Slot that contains an M/H Group.

FIG. 26 shows a random-access memory (RAM) 273 having a plurality of banks, P in number, replacing the RAM 73 of FIG. 12A. A RAM write address generator 274 supplies write addressing for the P banks of the RAM 273 sequentially to provide carousel storage of successive FIC-Chunks. In full operation, each of the P banks temporarily stores a respective one of FIC-Chunks that may span more than or less than a single M/H sub-Frame interval. A RAM read address generator 275 supplies similar read addressing to at least selected ones of the P banks of the RAM 273 when reading respective FIC-Chunks in parallel from them to an FIC-Chunk code combiner 278. Electronic crossbar switches are not required for addressing the P banks of the RAM 273, nor for reading from them in parallel. The FIC-Chunk code combiner 278 is connected for supplying FIC-Chunks, processed for reducing bit errors, to the control unit 60 for decoding M/H data and to the SMT-MH processing unit 104 shown in FIG. 12C. FIG. 27 shows in detail the structure of a read-address-ranges extractor 279 that replaces the read-address-ranges extractor 79 and the extractor 75 of M/H sub-Frame numbers that were used in the FIG. 12A portion of the FIG. 12 receiver apparatus. FIG. 26 shows this read-address-ranges extractor 279 composed of a first portion 279A and a second portion 279B.

The first portion 279A of the read-address-ranges extractor 279 supplies the final segment number for payload in each successive FIC-Chunk or extended FIC-Chunk to a RAM read address generator 277. Together with the knowledge that all FIC-Chunks and extended FIC-Chunks start with zero segment number, the RAM read address generator 277 is informed as to the read address ranges to use when reading in parallel from the P banks of the RAM 273 to the FIC-Chunk code combiner 178.

FIG. 26 shows the second portion 279B of the read-address-ranges extractor 279 to be a decoder and counter of '0000' FIC-Segment numbers generating a modulo-P count of FIC-Chunks supplied to a RAM write address generator 274 that replaces the RAM write address generator 74 of the FIG. 12A portion of the FIG. 12 receiver apparatus. The RAM write address generator 274 supplies write addressing for the RAM 173 that operates the banks of the RAM 173 to provide carousel storage of FIC-Chunks or extended FIC-Chunks. The RAM write address generator 274 generates write addressing that is independent of M/H sub-Frame number. The RAM write address generator 274 generates write addressing that depends on the modulo-P count of FIC-Chunks, on FIC-Segment numbers, and on bit count in each FIC-Segment.

FIG. 27 shows the read-address-ranges extractor 279 in detail. The decoder 72 for (51, 37) RS FEC coding is connected for supplying an FIC input signal to a gate 197 that selectively reproduces the FIC_Segment_number appearing in the 9th through 12th bits of the A/153 FIC-Segment header. A decoder 198 is connected for responding with a ONE to the FIC-Segment number being '0000' and otherwise responding with a ZERO. The response of the decoder 198 is applied to the count input connection of a modulo-P counter 199 that counts the ONEs in the decoder 198 response to generate a modulo-P count of successive FIC-Chunks in the response of the decoder 72 (51, 37) RS FEC coding. This modulo-P count of successive FIC-Chunks is supplied to the RAM write address generator 274 and, if needed, to the FIC-Chunk code combiner 178. The counter 199 also supplies the modulo-P count of successive FIC-Chunks for addressing respective listings in a memory 200 that temporarily stores the final FIC-Segment numbers of the payloads of those FIC-Chunks together with indications as to whether those FIC-Chunks are applicable to the current M/H Frame.

The decoder 72 for (51, 37) RS FEC coding is connected for supplying an FIC input signal to a gate 201 for reproducing the final bit of the fifth byte of each initial FIC-Segment with FIC-Segment number equal to '0000', which bit will be the current_next_indicator of an FIC-Chunk header. The gate 201 is connected for supplying the reproduced final bit of the fifth byte of each first FIC Segment to the input port of a latch 202. A delay unit 203 is connected for generating a delayed response to the momentary ONE that the decoder 198 generates responsive to detecting the initial segment of an FIC Chunk. The delay unit 203 is connected for applying this delayed response to the latch 202 as a control signal. This control signal conditions the latch 202 to temporarily store the current_next_indicator that occurs some 19 bits later than the decoder 198 decodes a '0000' FIC-Segment number. The latch 202 reproduces that temporarily stored current_next_indicator at its output port, thereafter to be written into the memory 200 to be listed together with the final FIC-Segment number for the FIC-Chunk from which the current_next_indicator bit is extracted.

The decoder 72 for (51, 37) RS FEC coding is connected for supplying an FIC input signal to a detector 204 of the final FIC-Segment number of the FIC-Chunk. This FIC_last_segment_num appears in the last four bits of the third byte of each FIC-Segment header, immediately after the four bits of the FIC_segment_num. The detector 204 could be connected to supply the final FIC-Segment number of the FIC-Chunk directly to the memory 200 for being written therein. However, FIG. 27 shows the detector 204 connected via a delay unit 205 for supplying a code combiner 206 with the final FIC-Segment number of the FIC-Chunk that successively appears in each FIC-Segment. The code combiner 206 is connected to receive the current_next_indicator bit from the latch 202 as a control signal. The delay unit 205 delays the final FIC-Segment number of the FIC-Chunk supplied as the detector 204 response sufficiently that its first occurrence in an FIC-Chunk is supplied to the code combiner 206 as an input signal thereto a little later than the code combiner 206 receives the current_next_indicator bit from that FIC-Chunk as a control signal. When the current_next_indicator bit is ZERO indicating that the FIC-Chunk is changing, past final FIC-Segment numbers temporarily stored in respective memories within the code combiner 206 are erased, and code combining final FIC-Segment numbers begins over. The decoder 72 for (51, 37) RS FEC code is connected for supplying Signaling Error Indication (SEI) signals to the code combiner 206, permitting it to exclude final FIC-Segment numbers from FIC-Segments with detected byte errors from the code combining procedures. If this is done, the code combiner 206 operates to correct errors in final FIC-Segment numbers that have gone undetected by the decoder 72. The final FIC-Segment number supplied as the code combiner 206 response is supplied to the memory 200 as a write input signal. The final FIC-Segment number supplied as the code combiner 206 is also an indication of the number of segments in the FIC-Chunk.

Sometime after the final FIC-Segment in an FIC-Chunk is received, but before the initial FIC-Segment in the next FIC-Chunk is received, a WRITE command is supplied to the memory 200. Responsive to this WRITE command, the final FIC-Segment number supplied from the code combiner 206 and the current_next_indicator bit supplied from the latch 202 are written into selected storage locations within the memory 200 in accordance with addressing supplied by the modulo-P count of FIC-Chunks from the counter 199. FIG. 27 illustrates the WRITE command being generated in the following manner. The FIC-Segment number selected by the gate 197, as delayed four bit epochs or so by a delay unit 207, is supplied to a comparator 208 to be compared with the final FIC-Segment number supplied from the detector 204 thereof to the comparator 208. The comparator 208 is constructed to supply a ONE in its response only when the delayed FIC-Segment number corresponds to the final FIC-Segment number; otherwise the response of the comparator 208 is a ZERO. The ONE response from the comparator 208 as delayed by a delay unit 209 provides the WRITE command to the memory 200. The delay unit 209 delays the WRITE command sufficiently to compensate for the latent delays of the delay unit 205 and the code combiner 206. The memory 200 is read at appropriate times to the RAM read address generator 275 to determine the range of similar read addressing supplied to at least selected ones of the P banks of the RAM 273. This occurs when reading respective FIC-Chunks in parallel from banks of the RAM 273 to the FIC-Chunk code combiner 278.

In the claims which follow, the term "FIC-Chunks" generally includes "extended FIC-Chunks" unless clearly indicated otherwise.

What is claimed is:

1. A method for a television transmitter of an amplitude-modulated single radio-frequency (RF) carrier wave employing an 8-VSB digital modulation signal to broadcast data for reception by mobile receivers and handheld receivers referred to collectively as "M/H" receivers, the data for reception by the M/H receivers being denominated "M/H data" and concerning a number of M/H services, the number of M/H services being at least one, the method comprising:

coding the M/H data to generate M/H Groups of coded M/H data;

time-division multiplexing the M/H Groups of the coded M/H data within the 8-VSB digital modulation signal such that the M/H Groups are disposed in respective Slots within sub-Frames of each one of successive M/H Frames, each one of the successive M/H Frames being divided into five successive sub-Frames respectively, each of the sub-Frames having a respective duration corresponding to four frames of 8-VSB symbols and containing a respective set of sixteen of the Slots;

generating a Transmission Parameter Channel (TPC) signal comprising successive 10-byte sections, each descriptive of the coding of the M/H data within a respective one of the M/H Groups;

(18, 10) Reed-Solomon coding each of the successive 10-byte sections of the TPC signal to generate a respective one of successive (18, 10) Reed-Solomon codewords;

generating a Fast Information Channel (FIC) signal with successive FIC-Chunks of FIC data descriptive of how each said M/H service relates to any of the M/H Groups within each of the successive M/H Frames;

(51, 37) Reed-Solomon coding successive 37-byte segments of each of the successive FIC-Chunks of FIC data to generate respective (51, 37) Reed-Solomon codewords;

matrix block interleaving successive ones of the (51, 37) Reed-Solomon codewords to be transmitted within each of the sub-Frames to generate successive 51-byte portions of matrix block interleaving results;

time-division multiplexing respective ones of the successive (18, 10) Reed-Solomon codewords and respective ones of the successive 51-byte portions of matrix block interleaving results within a signaling sequence;

randomizing the signaling sequence to generate a randomized signaling sequence; and parallel concatenated convolutional coding the randomized signaling sequence to generate quarter-rate-PCCC signaling within each currently broadcast one of the M/H Frames, a successive 276-byte portion of which the quarter-rate-PCCC signaling is included within each successive one of the M/H Groups;

wherein the quarter-rate-PCCC signaling included within each currently broadcast one of the M/H Frames encodes only a single respective one of the FIC-Chunks that describes how each said M/H service relates to any of the M/H Groups within one of the M/H Frames subsequently to be broadcast, the single respective one of the FIC-Chunks including more bytes than 37 times the total number of M/H Groups within the currently broadcast M/H Frame, and the encoding of which said single respective one of the FIC-Chunks is complete within the currently broadcast one of the M/H Frames.

2. The claim 1 method, wherein the quarter-rate-PCCC signaling included within the currently broadcast one of the M/H Frames concludes after encoding only the single respective FIC-Chunk descriptive of how each said M/H service relates to any of the M/H Groups within one of the M/H Frame subsequently to be broadcast.

3. The claim 1 method, wherein a header of each of the successive FIC-Chunks includes a bit indicative of whether that said FIC-Chunk is applicable to the M/H Groups of the coded M/H data within the currently broadcast one of the successive M/H Frames, as well as to one of the successive M/H Frames subsequently to be broadcast, or is only applicable to the one of the successive M/H Frames subsequently to be broadcast.

4. The claim 1 method, wherein every one of the successive 10-byte sections of the TPC signal specifies a total number of M/H Groups included in the M/H sub-Frame that the 10-byte section of the TPC signal is transmitted within for broadcast.

5. The claim 1 method, wherein a bit within a header of each of the FIC-Segments specifies whether or not that said FIC-Segment is a final FIC-Segment of an FIC-Chunk.

6. A receiver apparatus for receiving a selected one of amplitude-modulated radio-frequency (RF) carrier waves using 8-VSB digital modulation signals, each one of the 8VSB digital modulation signals including M/H Groups of coded M/H data disposed in respective Slots within sub-Frames of each one of successive M/H Frames, each of the successive M/H Frames divided into a respective five successive M/H sub-Frames, each of the sub-Frames having a duration equal to that of four frames of 8-VSB symbols and containing a respective set of sixteen of the Slots, each of the M/H Groups including therewithin a respective signaling sequence resulting from quarter-rate parallel-concatenated-convolutional-coding (PCCC) of an (18, 10) Reed-Solomon codeword followed by a respective one of successive 51-byte portions of matrix block interleaving results, each said (18, 10) Reed-Solomon codeword generated by Reed-Solomon coding a 10-byte section of a Transmission Parameter Channel (TPC) descriptive of the coding of the M/H data within a respective one of the M/H Groups, each said respective one of successive 51-byte portions of matrix block interleaving results generated by matrix block interleaving a respective succession of (51, 37) Reed-Solomon codewords one for each M/H Group within a respective one of said sub-Frames of said successive M/H Frames, each of said (51, 37) Reed-Solomon codewords generated by Reed-Solomon coding a 37-byte portion of one of a number of FIC-Chunks from a Fast Information Channel (FIC), each of the FIC-Chunks comprising FIC payload data descriptive of how each of a number at least one of M/H service relate to any of the M/H Groups within each of said successive M/H Frames, the FIC-Chunks descriptive of each next one of the M/H Frames to be transmitted being completely within ones of the M/H Frames as currently transmitted even when some of the FIC-Chunks each extend over more than one of the M/H sub-Frames, the receiver apparatus comprising:

a tuner for selectively receiving the selected one of amplitude-modulated RF carrier waves using 8-VSB digital modulation and reproducing the 8-VSB digital modulation signal therefrom;

a trellis decoder for decoding ⅔ trellis coding of the 8-VSB digital modulation signal reproduced by the tuner, thereby to generate a trellis decoder response;

a PCCC decoder for decoding the respective signaling sequences included within the M/H Groups in the trellis decoder response, thereby to recover (18, 10) Reed-Solomon codewords alternated with the 51-byte portions of matrix block-interleaved (51, 37) Reed-Solomon codewords;

a de-interleaver for de-interleaving the matrix block-interleaved (51, 37) Reed-Solomon codewords, thereby to recover the (51, 37) Reed-Solomon codewords in de-interleaved form;

a decoder for decoding the (51, 37) Reed-Solomon codewords in de-interleaved form to reproduce at least a portion of each of the FIC-Chunks, including ones of the FIC-Chunks that are completely within ones of the M/H Frames as currently received but are descriptive of next ones of the M/H Frames to be received;

an extended-FIC-Chunk re-assembler for re-assembling each of the FIC Chunks that describes the one of the M/H Frames next to be received and that is received in portions during more than one M/H sub-Frame of any currently received one of the M/H Frames; and a turbo decoder for decoding the coded M/H data contained within selected ones of the M/H Groups in the 8-VSB digital modulation signal that a user of the receiver apparatus selects to be received, the turbo decoder capable of commencing performance of decoding procedures for the selected ones of the M/H Groups in each currently received one of the M/H Frames as soon as each of the selected ones of the M/H Groups is received, the performance of the decoding procedures being controlled during each currently received one of the M/H Frames responsive to the FIC-Chunks received during a respective preceding one of the M/H Frames and re-assembled by said extended-FIC-Chunk re-assembler when received in portions during more than one M/H sub-Frame.

7. The receiver apparatus of claim 6, wherein the turbo decoder is configured to commence, less than a sub-Frame interval after the beginning of one of the M/H Frames being received, the turbo decoding of the M/H Groups in the trellis decoder response selected responsive to FIC information contained in the ones of the FIC-Chunks or the extended FIC-Chunks recovered during the one of the M/H Frames received immediately before.

8. The receiver apparatus of claim 6, further comprising:
a match filter connected for generating a pulse response to a selected portion of a prescribed training signal included in each of the M/H Groups prior to the signaling sequence therein; and
a counter for counting a number of pulse responses occurring during each currently received M/H sub-Frame to determine a total number of the M/H Groups therewithin, the total number of the M/H Groups within each of the currently received M/H sub-Frames being used to control de-interleaving of the matrix block-interleaved (51, 37) Reed-Solomon codewords received in each of the currently received M/H sub-Frame by the de-interleaver for de-interleaving the matrix block-interleaved (51, 37) Reed-Solomon codewords.

9. The receiver apparatus of claim 6, further comprising:
a decoder for decoding the (18, 10) Reed-Solomon codewords to recover the 10-byte sections of the TPC signal respectively descriptive of the M/H Groups in which the TPC signal is transmitted; and
an extractor connected for extracting information concerning a total number of M/H Groups within a currently received sub_Frame, the total number of the M/H Groups within the currently received M/H sub-Frame being used to control de-interleaving of the matrix block-interleaved (51, 37) Reed-Solomon codewords received in the currently received M/H sub-Frame by the de-interleaver for de-interleaving the matrix block-interleaved (51, 37) Reed-Solomon codewords.

10. A receiver apparatus for receiving a selected one of amplitude-modulated radio-frequency (RF) carrier waves using 8-VSB digital modulation signals, each one of the 8VSB digital modulation signals including M/H Groups of coded M/H data disposed in respective Slots within sub-Frames of each one of successive M/H Frames, each of the successive M/H Frames divided into a respective five successive sub-Frame, each of the sub-Frames having a duration equal to that of four frames of 8-VSB symbols and containing a respective set of sixteen of the Slots, each of the M/H Groups including therewithin a respective signaling sequence resulting from quarter-rate parallel-concatenated-convolutional-coding (PCCC) of an (18, 10) Reed-Solomon codeword followed by a respective one of successive 51-byte portions of matrix block interleaving results, each said (18, 10) Reed-Solomon codeword generated by Reed-Solomon coding a 10-byte section of a Transmission Parameter Channel (TPC) descriptive of the coding of the M/H data within a respective one of the M/H Groups, each said respective one of successive 51-byte portions of matrix block interleaving results generated by matrix block interleaving a respective succession of (51, 37) Reed-Solomon codewords one for each M/H Group within a respective one of said sub-Frames of said successive M/H Frames, each of said (51, 37) Reed-Solomon codewords generated by Reed-Solomon coding a 37-byte portion of one of a number of FIC-Chunks from a Fast Information Channel (FIC), each of the FIC-Chunks comprising FIC payload data descriptive of how each of a number at least one of M/H services relates to any of the M/H Groups within each of said successive M/H Frames, the FIC-Chunks descriptive of each next one of the M/H Frames to be transmitted being completed within ones of the M/H Frame as currently transmitted, a respective header of each FIC-Chunk including a respective current_next_indicator bit, the receiver apparatus comprising:
a tuner for selectively receiving the selected one of the amplitude-modulated RF carrier waves using 8-VSB digital modulation and reproducing the 8-VSB digital modulation signal therefrom;
a trellis decoder for decoding ⅔ trellis coding of the 8-VSB digital modulation signal reproduced by the tuner, thereby to generate a trellis decoder response;
a PCCC decoder for decoding the respective signaling sequences included within the M/H Groups in the trellis decoder response, thereby to recover (18, 10) Reed-Solomon codewords alternated with 51-byte portions of matrix block-interleaved (51, 37) Reed-Solomon codewords;
a de-interleaver for de-interleaving the matrix block-interleaved (51, 37) Reed-Solomon codewords, thereby to recover the (51, 37) Reed-Solomon codewords in de-interleaved form;
a decoder for decoding the (51, 37) Reed-Solomon codewords in de-interleaved form to recover ones of the FIC-Chunks; and
a turbo decoder for decoding the coded M/H data contained within ones the M/H Groups in the 8-VSB digital modulation signal, as selected responsive to FIC information contained in the recovered ones of the FIC-Chunks with regard to one of the M/H services that a user of the receiver apparatus selects to be received, the turbo decoder being configured to respond to the FIC information received within each M/H Frame interval with a response that takes place during a succeeding M/H Frame interval, and the turbo decoder being configured to respond selectively to the information received within the each M/H Frame interval during a same M/H Frame interval, which selective response is controlled by the current_next_indicator bit contained in the currently recovered one of the FIC-Chunks or the extended FIC-Chunks.

11. The receiver apparatus of claim 10, further comprising:
a match filter connected for generating a pulse response to a selected portion of a prescribed training signal included in each the M/H Group prior to the signaling sequence therein; and
a counter for counting a number of pulse responses occurring during each currently received M/H sub-Frame to determine a total number of the M/H Groups therewithin, the total number of the M/H Groups within the currently received M/H sub-Frame being used to control de-interleaving of the matrix block-interleaved (51, 37) Reed-Solomon codewords received in the currently received M/H sub-Frame by the de-interleaver for de-interleaving the matrix block-interleaved (51, 37) Reed-Solomon codewords.

12. The receiver apparatus of claim 10, further comprising:
a decoder for decoding the (18, 10) Reed-Solomon codewords to recover the 10-byte sections of TPC signal respectively descriptive of the M/H Groups in which the TPC signal is transmitted; and
an extractor connected for extracting information concerning a total number of M/H Groups within a currently received sub_Frame, the total number of the M/H Groups within the currently received M/H sub-Frame being used to control de-interleaving of the matrix block-interleaved (51, 37) Reed-Solomon codewords received in the currently received M/H sub-Frame by the de-interleaver for de-interleaving the matrix block-interleaved (51, 37) Reed-Solomon codewords.

13. A receiver apparatus for receiving a selected one of amplitude-modulated radio-frequency (RF) carrier waves using 8-VSB digital modulation signals, each one of said 8VSB digital modulation signals including M/H Groups of coded M/H data disposed in respective Slots within sub-Frames of each one of successive M/H Frames, each of the successive M/H Frames divided into a respective five successive sub-Frames, each of the sub-Frames having a duration equal to that of four frames of 8-VSB symbols and containing a respective set of sixteen of the Slots, each of the M/H Groups including therewithin a respective signaling sequence resulting from quarter-rate parallel-concatenated-convolutional-coding (PCCC) of an (18, 10) Reed-Solomon codeword followed by a respective one of successive 51-byte portions of matrix block interleaving results, each said (18, 10) Reed-Solomon codeword generated by Reed-Solomon coding a 10-byte section of a Transmission Parameter Channel (TPC) descriptive of the coding of the M/H data within a respective one of said M/H Groups, each said respective one of the successive 51-byte portions of matrix block interleaving results generated by matrix block interleaving a respective succession of (51, 37) Reed-Solomon codewords one for each of the M/H Groups within a respective one of the sub-Frames of the successive M/H Frames, each of said (51, 37) Reed-Solomon codewords generated by Reed-Solomon coding a 37-byte portion of one of a number of FIC-Chunks from a Fast Information Channel (FIC), each of the FIC-Chunks comprising FIC payload data descriptive of how each of a number at least one of M/H services relates to any of the M/H Groups within each of said successive M/H Frames, the FIC-Chunks descriptive of each next one of the M/H Frames to be transmitted being completed within ones of the M/H Frame as currently transmitted, the receiver apparatus comprising:

a tuner for selectively receiving the selected one of amplitude-modulated RF carrier waves using 8-VSB digital modulation and reproducing the 8-VSB digital modulation signal therefrom;

a trellis decoder for decoding ⅔ trellis coding of the 8-VSB digital modulation signal reproduced by the tuner, thereby to generate a trellis decoder response;

a PCCC decoder for decoding the respective signaling sequences included within the M/H Groups in the trellis decoder response, thereby to recover (18, 10) Reed-Solomon codewords alternated with the 51-byte portions of matrix block-interleaved (51, 37) Reed-Solomon codewords;

a match filter connected for generating a pulse response to a selected portion of a prescribed training signal included in each of the M/H Groups prior to the signaling sequence therein the pulse response being supplied to the PCCC decoder for selectively enabling the decoding of just the respective signaling sequences included within the M/H Groups in the trellis decoder response and for leaving the PCCC decoder disabled at all other times;

a de-interleaver for de-interleaving the matrix block-interleaved (51, 37) Reed-Solomon codewords, thereby to recover the (51, 37) Reed-Solomon codewords in de-interleaved form;

a decoder for decoding the (51, 37) Reed-Solomon codewords in de-interleaved form to recover FIC-Segments of the FIC-Chunks and the extended FIC-Chunks, depending on what is transmitted; and a turbo decoder for decoding the coded M/H data contained within ones of the M/H Groups in the 8-VSB digital modulation signal, as selected responsive to FIC information contained in the recovered ones of the FIC-Chunks with regard to one of the M/H services that a user of the receiver apparatus selects to be received.

14. The receiver apparatus of claim 13, further comprising:
a counter for counting a number of pulse responses occurring during each currently received M/H sub-Frame to determine a total number of the M/H Groups therewithin, the total number of the M/H Groups within the currently received M/H sub-Frame being used to control de-interleaving of the matrix block-interleaved (51, 37) Reed-Solomon codewords received in the currently received M/H sub-Frame by the de-interleaver for de-interleaving the matrix block-interleaved (51, 37) Reed-Solomon codewords.

15. The receiver apparatus of claim 14, further comprising:
an FIC-Chunk code combiner connected for combining ones of the FIC-Chunks recovered by the decoder for decoding the (51, 37) Reed-Solomon codewords, to generate FIC information less likely to contain erroneous data bits.

16. The receiver apparatus of claim 15, wherein connections from the decoder for decoding the (51, 37) Reed-Solomon codewords to the FIC-Chunk code combiner comprise:
random-access memory (RAM) having a plurality of banks operable as a carousel memory for temporarily storing successive ones the FIC-Chunks recovered by the decoder for decoding the (51, 37) Reed-Solomon codewords, the banks of the RAM addressed by a Chunk number, a Segment number and a bit number during writing to a random-access port of a cyclically selected one of the banks of the RAM from the decoder for decoding the (51, 37) Reed-Solomon codewords;

a read-address-range extractor connected for temporarily storing the Segment number at which each of the FIC-Chunks concludes, as extracted from headers of FIC-Segments; and a read address generator connected for generating read addresses for the banks of the RAM during times of reading from the banks in parallel to the FIC-Chunk code combiner, the read address generator operable for generating read addresses within successive ranges determined by the respective Segment numbers at which the FIC-Chunks respectively conclude, as supplied by the read-address-range extractor.

17. The receiver apparatus of claim 13, further comprising:
a decoder for decoding the (18, 10) Reed-Solomon codewords to recover the 10-byte sections of the TPC signal respectively descriptive of the M/H Groups in which the TPC signal is transmitted; and an extractor connected for extracting information concerning a total number of M/H Groups within a currently received sub_Frame, the total number of the M/H Groups within the currently received M/H sub-Frame being used to control de-interleaving of the matrix block-interleaved (51, 37) Reed-Solomon codewords received in the currently received M/H sub-Frame by the de-interleaver for de-interleaving the matrix block-interleaved (51, 37) Reed-Solomon codewords.

18. The receiver apparatus of claim 17, further comprising:
an FIC-Chunk code combiner connected for combining ones of the FIC-Chunks recovered by the decoder for decoding the (51, 37) Reed-Solomon codewords, to generate FIC information less likely to contain erroneous data bits.

19. The receiver apparatus of claim 18, wherein connections from the decoder for decoding the (51, 37) Reed-Solomon codewords to the FIC-Chunk code combiner comprise:
random-access memory (RAM) having a plurality of banks operable as a carousel memory for temporarily storing successive ones the FIC-Chunks recovered by the decoder for decoding the (51, 37) Reed-Solomon codewords, the banks of the RAM addressed by a Chunk number, a Segment number and a bit number during writing to a random-access port of a cyclically selected one of the banks of the RAM from the decoder for decoding the (51, 37) Reed-Solomon codewords;

a read-address-range extractor connected for temporarily storing the Segment number at which each of the FIC-Chunks concludes, as extracted from headers of FIC-Segments; and a read address generator connected for generating read addresses for the banks of the RAM during times of reading from the banks in parallel to the FIC-Chunk code combiner, the read address generator operable for generating read addresses within successive ranges determined by the respective Segment numbers at which the FIC-Chunks respectively conclude, as supplied by the read-address-range extractor.

20. The receiver apparatus of claim 17, further comprising:

a TPC code combiner connected for combining similar recurring portions of ones of the 10-byte sections of the TPC signal, to generate recurring TPC information less likely to contain erroneous data bits.

* * * * *